United States Patent
Couch

(10) Patent No.: US 11,148,575 B2
(45) Date of Patent: Oct. 19, 2021

(54) TRAILER SYSTEM

(71) Applicant: Jason Couch, Commerce City, CO (US)

(72) Inventor: Jason Couch, Commerce City, CO (US)

( * ) Notice: Subject to any disclaimer, the term of this patent is extended or adjusted under 35 U.S.C. 154(b) by 171 days.

(21) Appl. No.: 16/545,487

(22) Filed: Aug. 20, 2019

(65) Prior Publication Data

US 2020/0055438 A1    Feb. 20, 2020

Related U.S. Application Data

(60) Provisional application No. 62/719,791, filed on Aug. 20, 2018.

(51) Int. Cl.
*B60P 3/075* (2006.01)
*B62D 63/06* (2006.01)

(52) U.S. Cl.
CPC ............ *B60P 3/075* (2013.01); *B62D 63/061* (2013.01)

(58) Field of Classification Search
CPC ......... B60P 3/075; B60P 3/077; B62D 63/061
USPC ............................................................ 410/7
See application file for complete search history.

(56) References Cited

U.S. PATENT DOCUMENTS

| | | | |
|---|---|---|---|
| 3,913,934 A * | 10/1975 | Koehn | B62D 21/14 280/656 |
| 4,032,167 A | 6/1977 | Chereda | |
| 5,387,001 A * | 2/1995 | Hull | B60P 3/127 280/402 |
| 5,727,920 A * | 3/1998 | Hull | B60P 3/127 280/402 |
| 5,924,836 A * | 7/1999 | Kelly | B62D 63/061 414/482 |
| 6,428,035 B1 | 8/2002 | Maxwell et al. | |
| 6,902,179 B1 * | 6/2005 | Jolly | B62D 63/061 280/414.1 |
| 7,513,725 B1 * | 4/2009 | Bullock | B60P 3/075 410/10 |

(Continued)

FOREIGN PATENT DOCUMENTS

| | | | |
|---|---|---|---|
| CA | 2721811 A1 * | 10/2009 | ............... B60P 3/08 |
| CA | 2914753 A1 * | 12/2014 | ............. B60P 3/077 |

(Continued)

OTHER PUBLICATIONS

International Search Report for International Application No. PCT/US2019/047199, dated Nov. 1, 2019.

(Continued)

*Primary Examiner* — Hilary L Gutman
(74) *Attorney, Agent, or Firm* — Jason H. Vick; Sheridan Ross, PC

(57) ABSTRACT

A trailer system and method of using the same are described herein where the trailer system allows for storage in a compact space and reduction of weight of the trailer system. The trailer system in some embodiments may have a center rail with a hinge so that the trailer can fold in half and be positioned against a vertical wall for storage. The trailer system can also have a sliding basket system for receiving the wheels of a vehicle to allow for the storage of the trailer system in a compact space, to allow the trailer system to receive vehicles with different wheelbases, and to reduce the weight of the trailer system.

20 Claims, 63 Drawing Sheets

(56) References Cited

U.S. PATENT DOCUMENTS

| | | | | |
|---|---|---|---|---|
| 2006/0104738 A1* | 5/2006 | Nolasco | ............... | B60P 3/077 |
| | | | | 410/2 |
| 2007/0001432 A1* | 1/2007 | Thurm | ............... | B62D 63/061 |
| | | | | 280/656 |
| 2007/0170701 A1 | 7/2007 | Dugal | | |
| 2007/0235985 A1* | 10/2007 | Thompson | ............ | B60P 3/127 |
| | | | | 280/656 |
| 2009/0026736 A1 | 1/2009 | Koch | | |
| 2009/0072518 A1 | 3/2009 | Roll et al. | | |
| 2010/0084839 A1* | 4/2010 | Mayfield | ............ | B62D 63/061 |
| | | | | 280/656 |
| 2014/0212239 A1* | 7/2014 | Cencer | ............... | B60P 7/0846 |
| | | | | 410/20 |
| 2016/0207436 A1* | 7/2016 | Thomas | ............... | B60P 3/064 |
| 2017/0217355 A1* | 8/2017 | Willis | ............... | B62D 63/062 |
| 2020/0231233 A1* | 7/2020 | Linkletter | ............ | B62D 63/061 |
| 2020/0346700 A1* | 11/2020 | Nordstrom | ............ | B62D 63/08 |
| 2020/0353855 A1* | 11/2020 | Gastrich | ............... | B60D 1/14 |

FOREIGN PATENT DOCUMENTS

| | | | | | |
|---|---|---|---|---|---|
| DE | 102007027475 | A1 * | 12/2008 | ............... | B60P 3/07 |
| EP | 2765054 | A1 * | 8/2014 | ............ | B62D 7/026 |
| FR | 2864010 | B1 | 2/2007 | | |
| WO | WO-2006037147 | A1 * | 4/2006 | ............ | B62D 21/20 |

OTHER PUBLICATIONS

Written Opinion for International Application No. PCT/US2019/047199, dated Nov. 1, 2019.
International Preliminary Report on Patentability for International Application No. PCT/US2019/047199, dated Mar. 4, 2021.

* cited by examiner

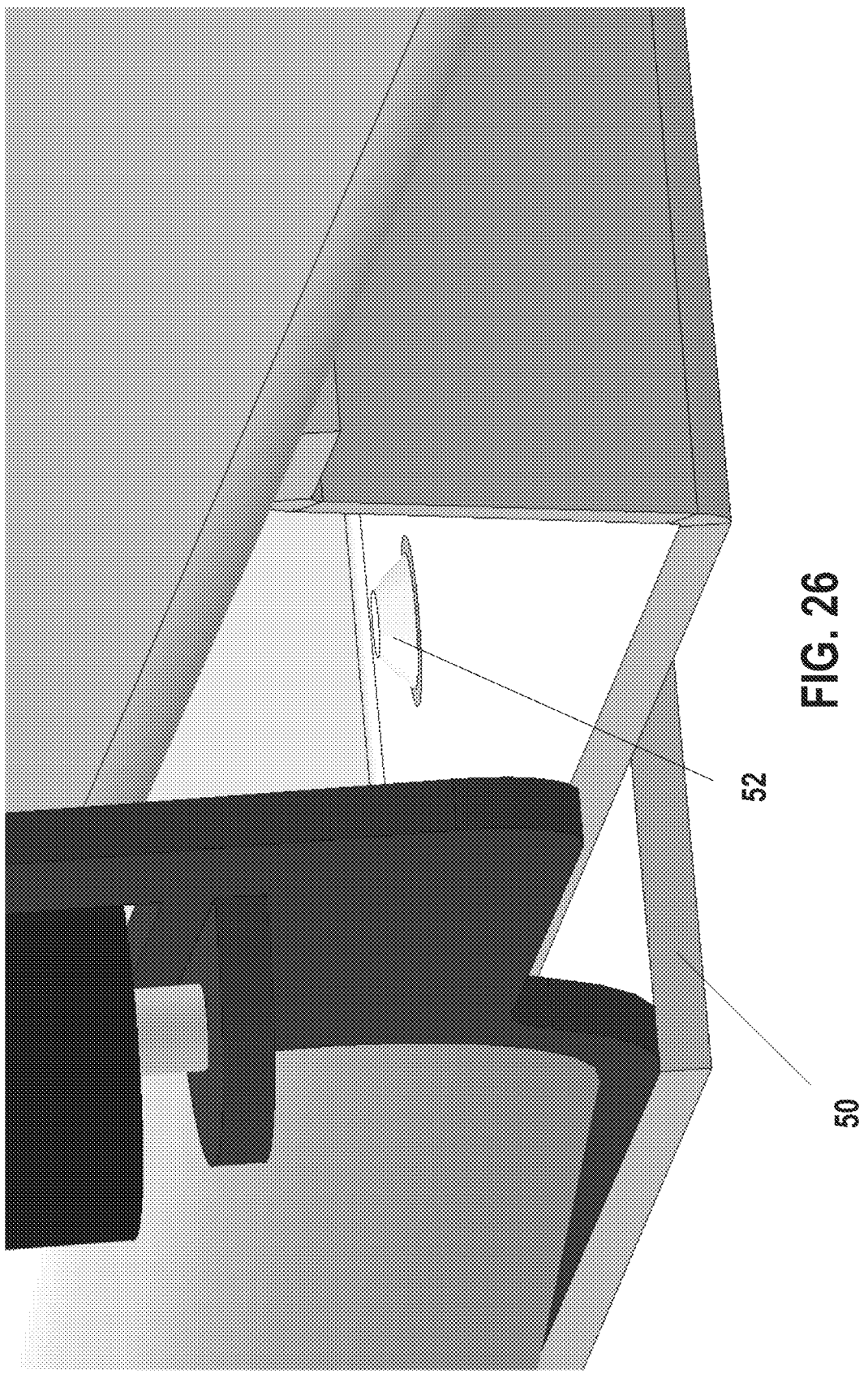

| ITEM # | SUB-ASM | DRAWING # |
|---|---|---|
| 1 | FRONT SLIDER | 020 |
| 2 | RAIL | 030 |
| 3 | AXLE | 040 |
| 4 | REAR SLIDER | 050 |
| 5 | RAMPS | 060 |

DRAWING # 001 Scale: 1:48 Dimensions in inches

SECTION C-C

SECTION D-D

DRAWING #025 Dimensions in inches

SECTION D-D

SECTION C-C

DRAWING # 026 Dimensions in inches

| ITEM # | DESCRIPTION | QTY | DRAWING # |
|---|---|---|---|
| 1 | RECEIVER TUBE | 1 | 031 |
| 2 | RECEIVER GUSSET | 1 | 031 |
| 3 | FRONT RAIL | 1 | 031 |
| 4 | HINGE | 1 | 032 |
| 5 | REAR RAIL | 1 | 031 |
| 6 | REAR RAIL CAP | 1 | 031 |

DRAWING # 030 Scale: 1:32 Dimensions in inches

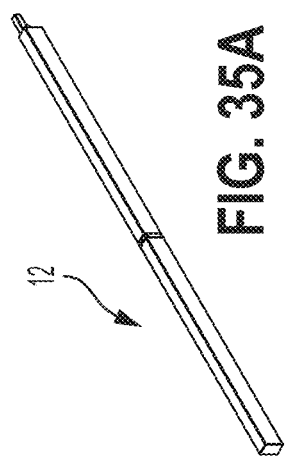
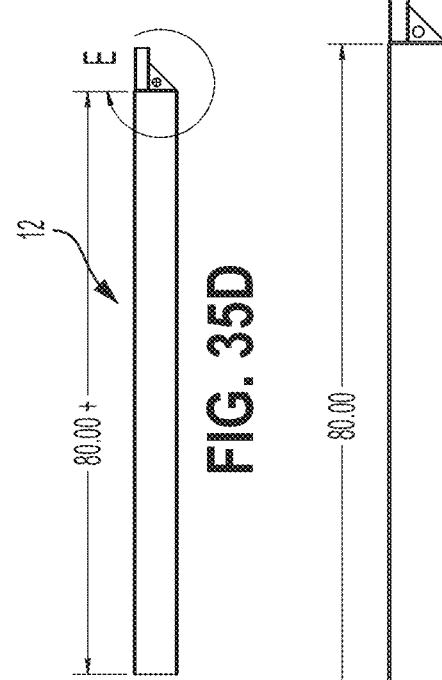
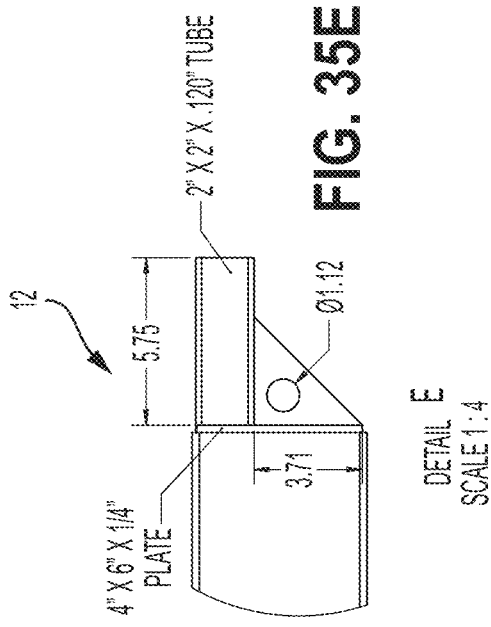
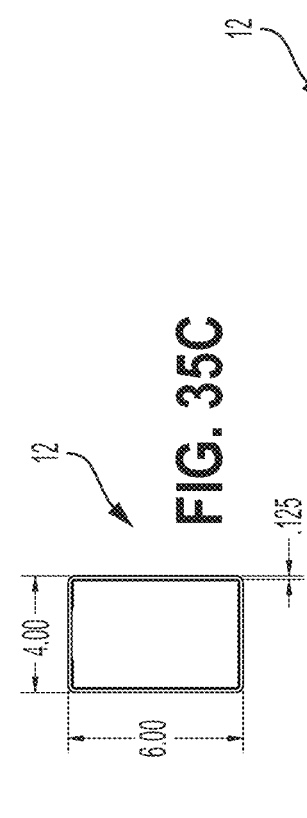
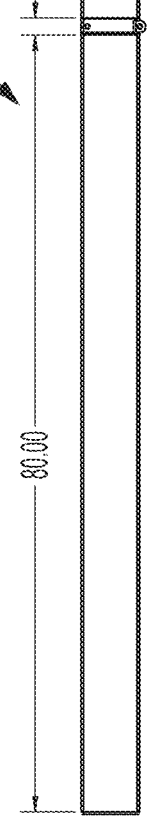

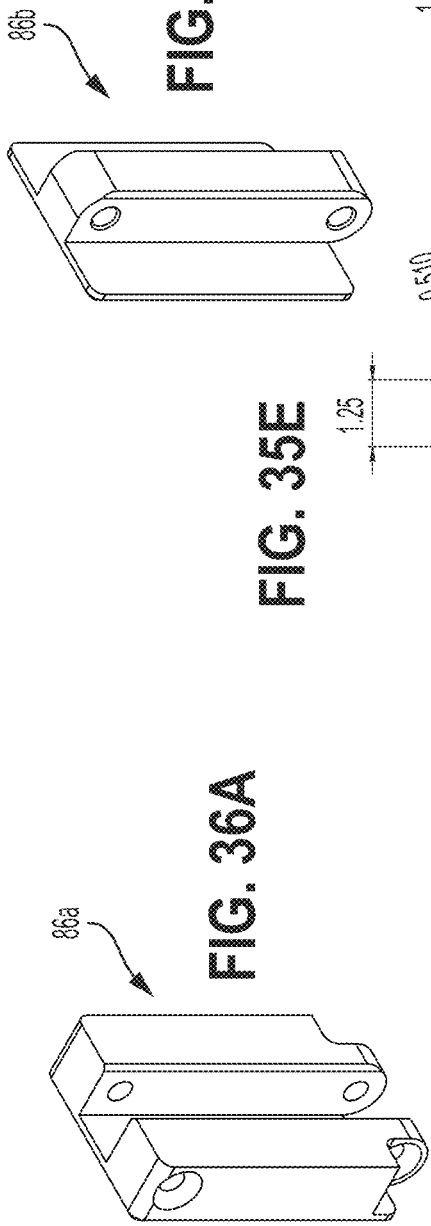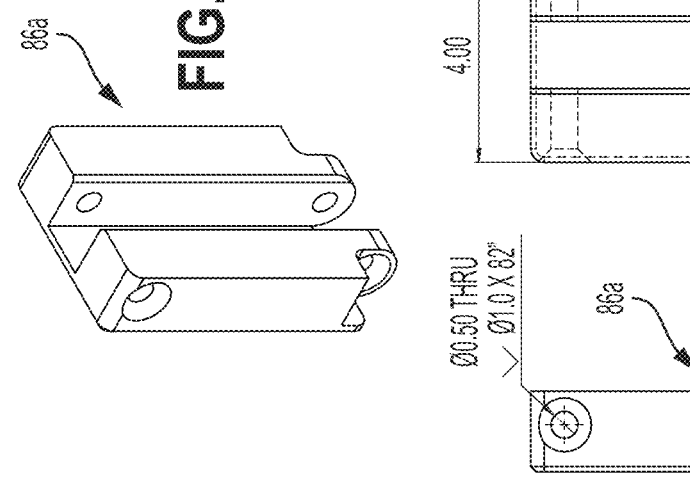
FIG. 36D
FIG. 36F
FIG. 35E
FIG. 36A
FIG. 36C
FIG. 36B

| ITEM | DESCRIPTION | QTY | DWG # |
|---|---|---|---|
| 1 | FENDER BRACKET | 2 | 041 |
| 2 | AXLE TUBE | 2 | 042 |
| 3 | GUSSET PLATE | 1 | 042 |
| 4 | AXLE SIDE PLATE | 2 | 042 |

DRAWING # 040 Scale: 1:16 Dimensions in inches

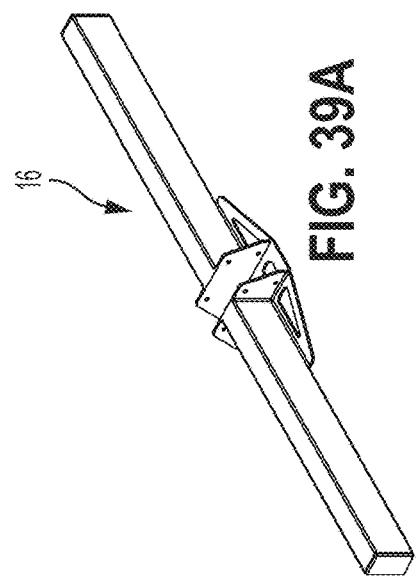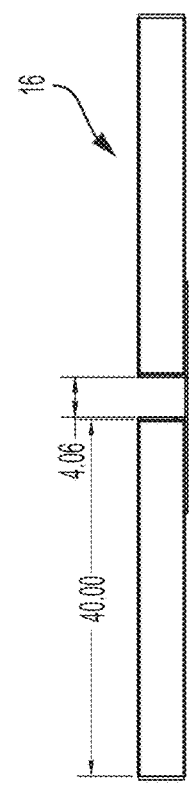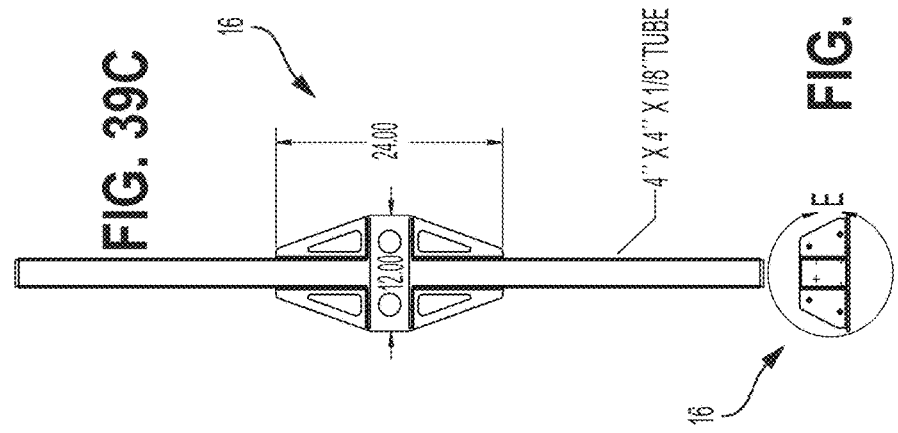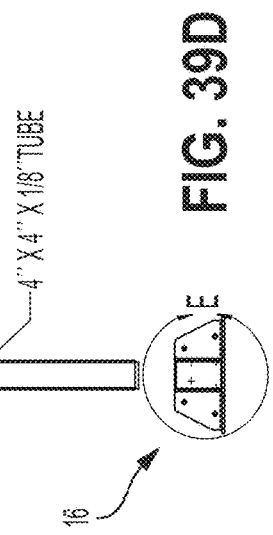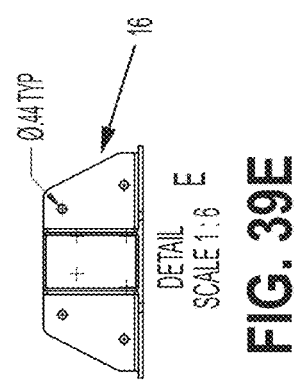

| ITEM # | DESCRIPTION | QTY | DWG # |
|---|---|---|---|
| 1 | REAR SIDE PLATE | 2 | 051 |
| 2 | TUBE | 8 | 021 |
| 3 | TUBE FLANGE | 16 | 021 |
| 4 | INNER PLATE | 2 | 052 |
| 5 | CENTER TUBE | 3 | 052 |

DRAWING # 050 Scale: 1:16 Dimensions in inches

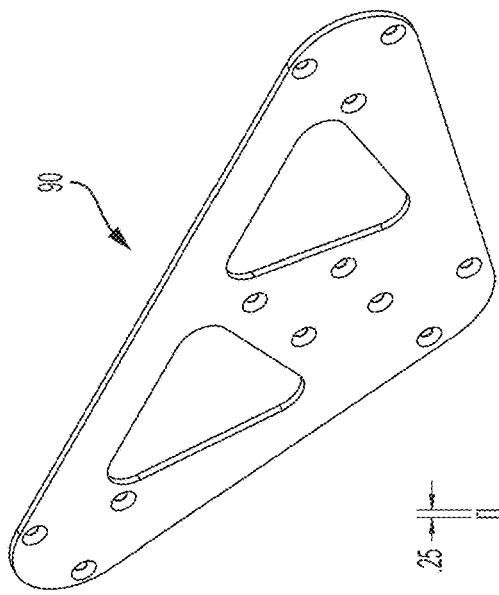
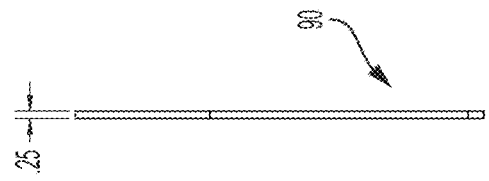
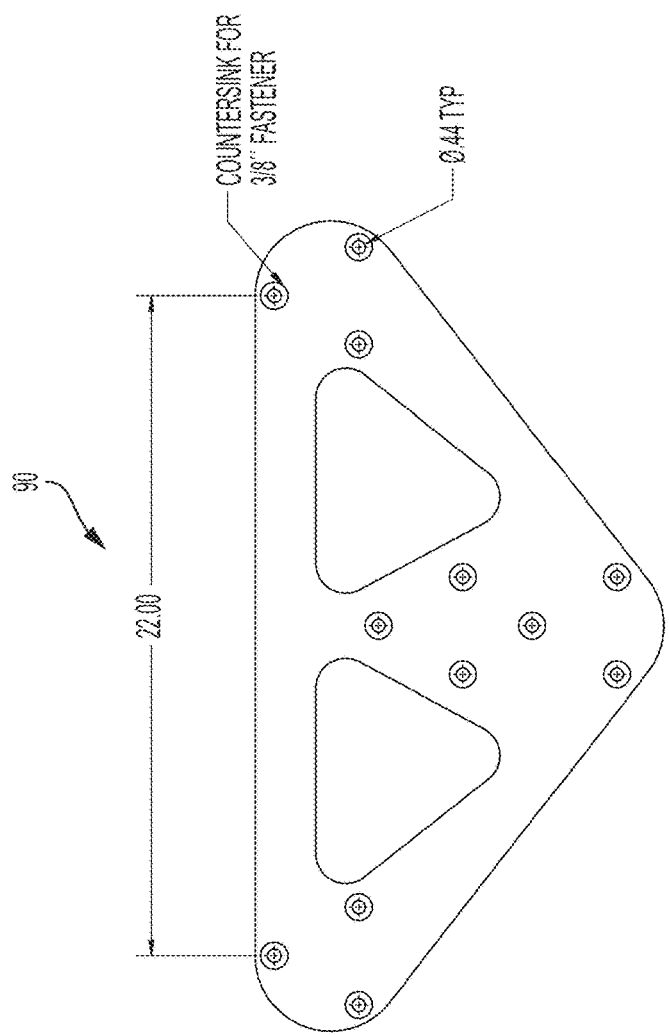

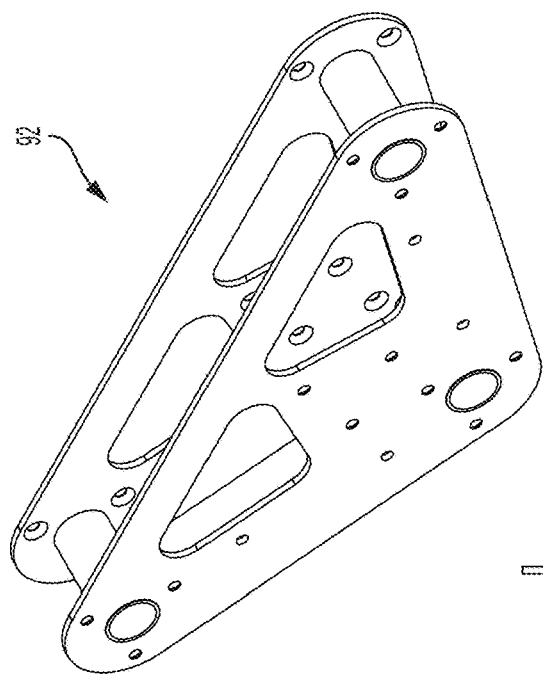
FIG. 42A
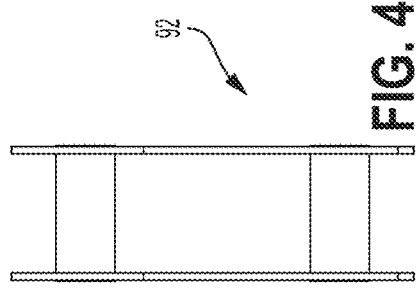
FIG. 42B
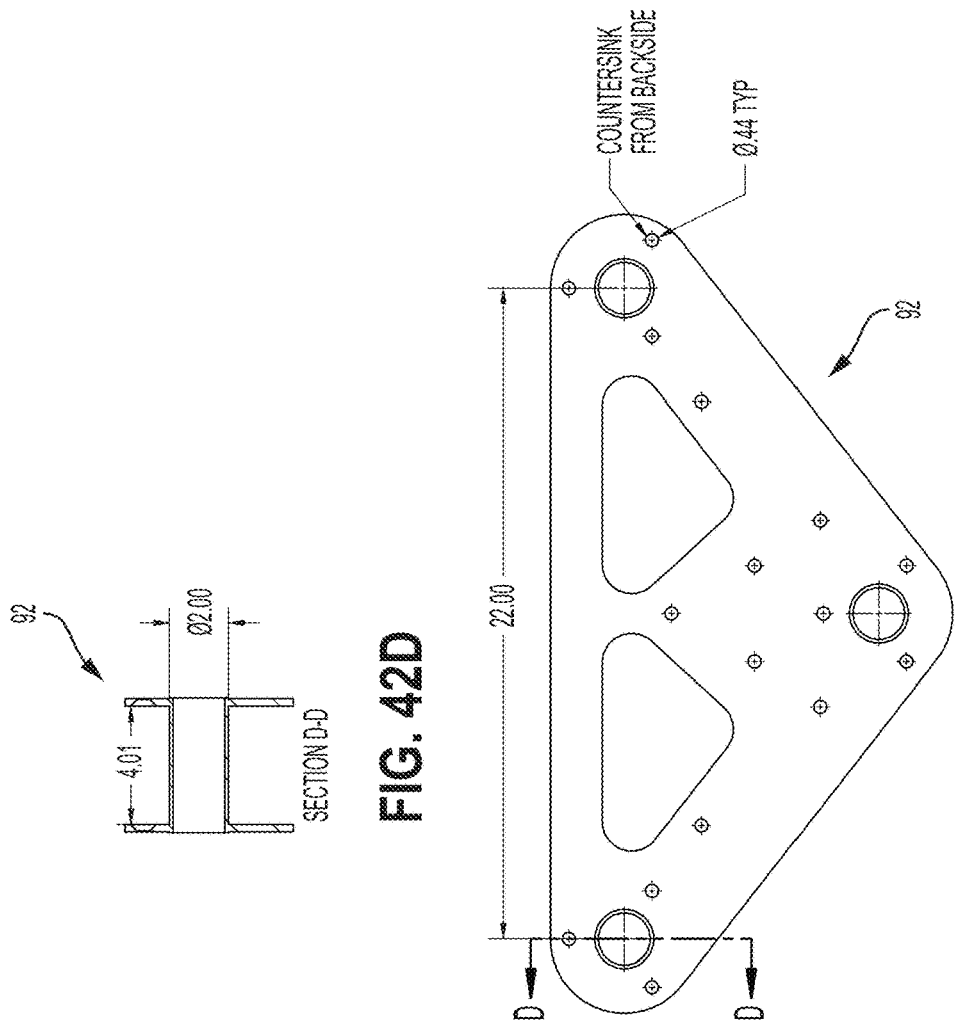
FIG. 42C
FIG. 42D

| ITEM # | DESCRIPTION | QTY | DWG # |
|---|---|---|---|
| 1 | LOCK | 4 | NA |
| 2 | UPPER RAMP | 2 | 061 |
| 3 | LOWER RAMP | 2 | 062 |

DRAWING # 060 Scale: 1:8 Dimensions in inches

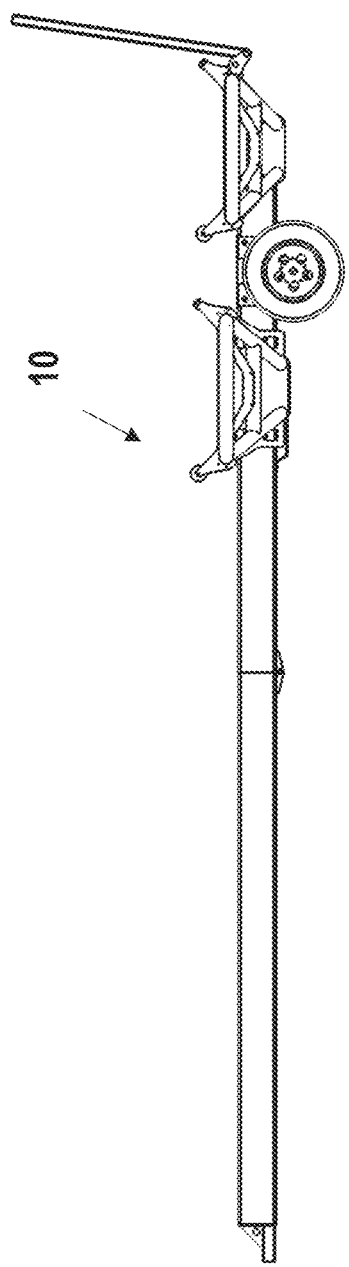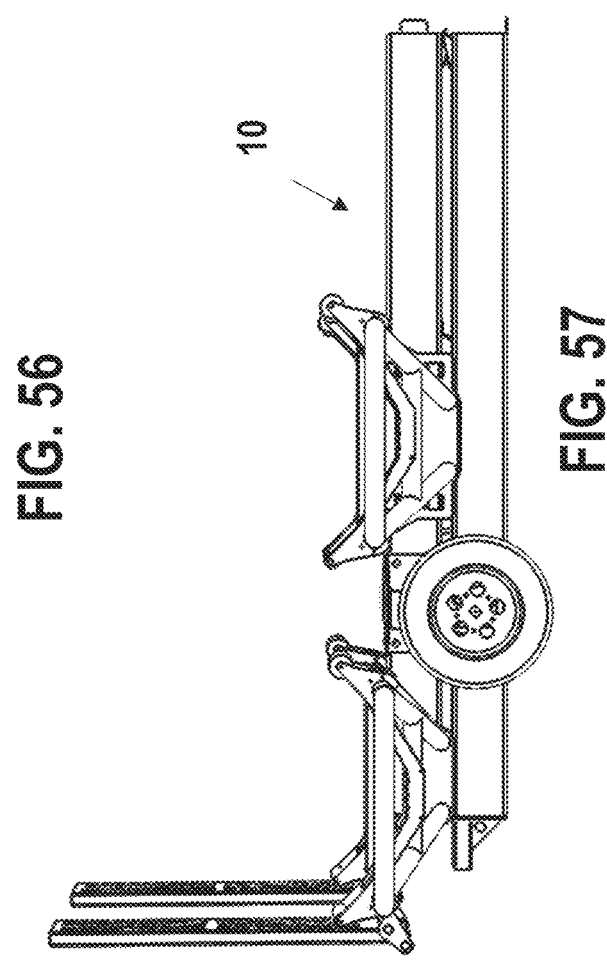

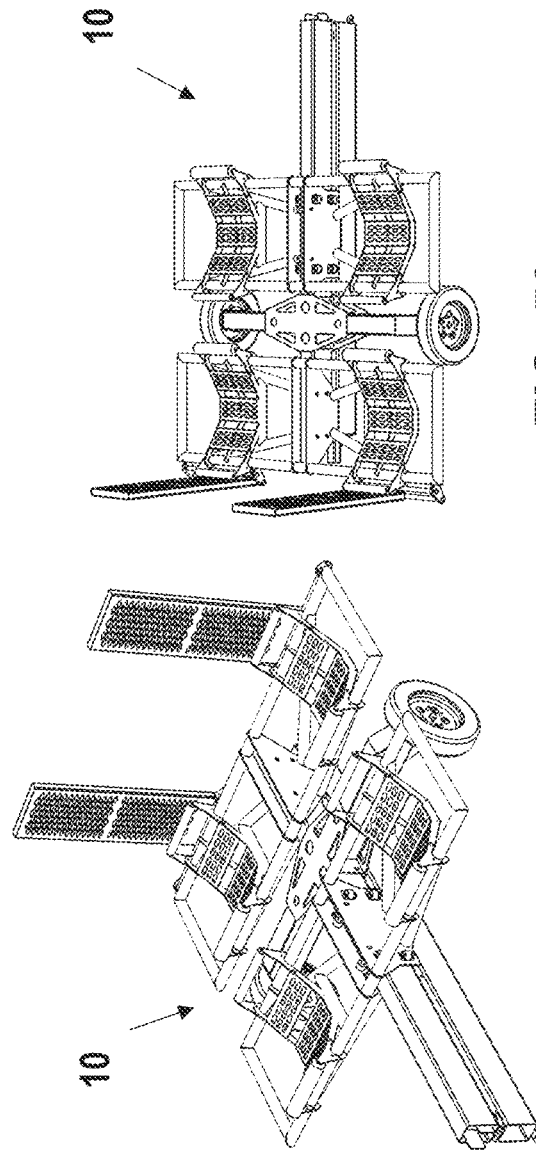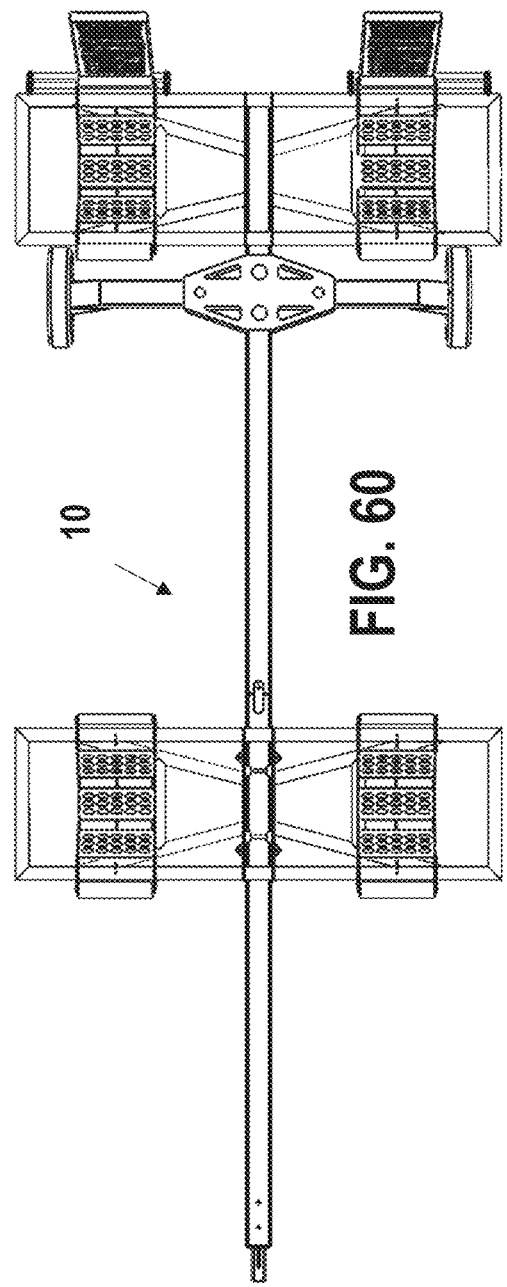

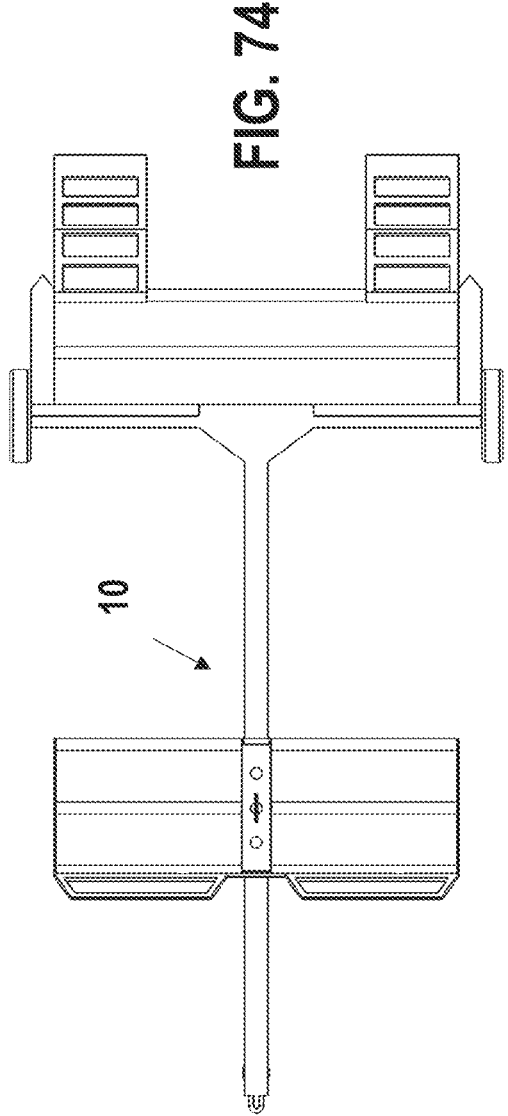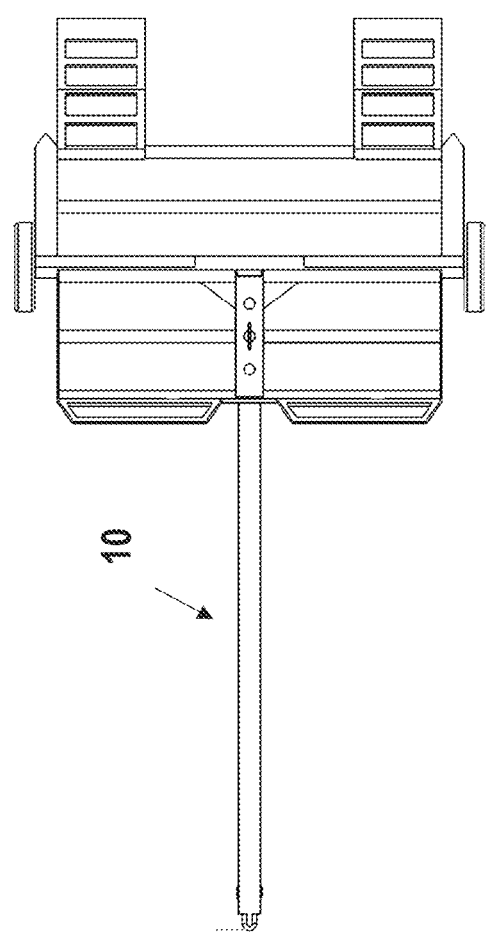

TRAILER SYSTEM

CROSS REFERENCE TO RELATED APPLICATION

The present application claims the benefits of and priority, under 35 U.S.C. § 119(e), to U.S. Provisional Application No. 62/719,791 filed Aug. 20, 2018 by Couch and entitled "Trailer System", the entire disclosure of which is incorporated herein by reference, in its entirety, for all that it teaches and for all purposes.

FIELD

Embodiments of the present disclosure are related to trailer systems that have features that allow for the compact storage of the trailer system.

BACKGROUND

Trailers are commonly towed by powered vehicles to transport loads, and trailers have many configurations for a variety of purposes. For instance, a closed trailer can be used to transport animals, a trailer with a flat surface can be used to transport uniquely-shaped loads, and further still, trailers can transport other vehicles such as boats, all-terrain vehicles, side-by-side vehicles, cars, tractors, etc. Regardless of the configuration of the trailer, one issue with trailers is the storage of trailers. Often a car space in a garage or separate outdoor area is needed to store a trailer when the trailer is not in use. Thus, storage of the trailer reduces the overall utility of the trailer. In addition, general purpose trailers have much more structure than necessary and as a result are heavy. For instance, a trailer used to transport a side-by-side has a larger, flat rectangular surface for the side-by-side to drive onto. When the side-by-side is secured to the trailer, there are only four small contact points between the side-by-side and the trailer. Therefore, the remaining area of the rectangular surface is not utilized and increases the weight of the trailer.

SUMMARY

The above shortcomings and other needs are addressed by the various embodiments and configurations described herein. Various aspects of the trailer system described herein allow for the disassembly and storage of the trailer system in a compact area. Another objective of the trailer system is to provide a lighter trailer with a sliding platform or basket that maximizes the useable area of the trailer and reduces weight.

One aspect of embodiments is to provide a trailer system with a center rail that has a hinge or other mechanical connection to fold or disassemble the center rail for storage. The hinge rotatably connects a first section of the center rail to a second section of the center rail, and during use of the trailer, a securing pin or other locking device prevents any rotational movement of the hinge. To fold the trailer system, the securing pin is removed or disengaged, and the hinge allows the second section to rotate under the first section such that the center rail is essentially folded in half. Other features and components of the trailer system can be removed or repositioned, and the folded trailer can be, for example, pushed up against a vertical wall in a garage to reduce the footprint of the trailer within the garage. Thus, a person can regain the use of a car space or avoid the need for a separate outdoor space to store a trailer.

Another aspect of embodiments is to provide a trailer system with a rear basket and a sliding front basket to allow the folding of the center rail and to reduce the weight of the trailer system. The rear basket is configured to receive the rear wheels of a vehicle, and the sliding front basket is configured to receive the front wheels of the vehicle when the trailer system is transporting the vehicle. The front basket can slide along the center rail between a first position substantially adjacent to the rear basket and a second position on the center rail where the baskets are separated by a distance that is substantially equal to the wheelbase of the vehicle loaded onto the trailer system. When the trailer system is folded for storage, the sliding ability of the front basket allows the front basket to be positioned substantially adjacent to the rear basket and allow the center rail to fold. During operation, the front basket is initially in the first position, and a vehicle's front wheels first roll into the rear basket. The vehicle continues to move forward until the vehicles front wheels move from the rear basket into the front basket. Now as the vehicle moves forward, the front basket slides along the center rail, past the hinge and onto the second section of the center rail, until the vehicle's rear wheels are positioned in the rear basket. A user can, if desired, secure one or more of the vehicle's wheels to the baskets and/or other components of the trailer system for transportation.

A further aspect of embodiments is to provide a trailer system with a sliding front basket that selectively locks into at least one position along the center rail to secure the front basket for storage in a reduced footprint. In some embodiments, the front basket is arranged around the center rail with a top roller configured to engage a top surface of the center rail and a detent configured to selectively enter an aperture on a bottom surface of the center rail. The top roller is biased in a downward direction, and the front basket is configured to move between two positions relative to the center rail. In a first position, the top roller is biased downward, which raises the front basket relative to the center rail. This also causes the detent to at least partially enter the aperture in the center rail and prevent the front basket from sliding along the center rail. In a second position, a predetermined weight, such as a vehicle, overcomes the biased top roller and presses the front basket downward relative to the center rail. Now the detent is removed from the aperture in the center rail, and the front basket can move along the length of the center rail. This prevents a premature sliding of the front basket along the center rail until the front wheels of the vehicle are received into the receiving volumes of the front basket.

One embodiment of the present disclosure is a trailer system for receiving a vehicle, comprising a center rail having a first section rotatably connected to a second section; a first basket connected to the first section of the center rail, the first basket defining a first receiving volume; a second basket slidably connected to the center rail, the second basket defining a second receiving volume; wherein, in a first position, the second basket is positioned on the first section of the center rail between the first basket and the second section; and wherein, in a second position, the second basket is positioned on the second section of the center rail.

In various embodiments, the system further comprises a lock plate connected to the second section of the center rail; and a pin that extends through the lock plate and into the first section of the center rail to secure the first and second sections along a common longitudinal axis. In some embodiments, the system further comprises an insert that is positioned in the second basket and that at least partially defines the second receiving volume, wherein the insert is configured receive a wheel and is positionable in a plurality of locations in the second basket. In various embodiments, the system further comprises a roller located at a front end of the insert, wherein the roller is configured to rotate against a spinning wheel.

In some embodiments, the system further comprises an aperture in the center rail; and a detent that extends from the second basket and into the aperture to selectively lock the second basket in the first position, wherein second basket deflects relative to the center rail to remove the detent from the aperture and allow the second basket to move to the second position. In various embodiments, the system further comprises a first center plate of the second basket positioned on one side of the center rail; a second center plate of the second basket positioned on an opposing side of the center rail; and a top roller that extends between the first and second center plates and that contacts a top surface of the center rail, wherein the top roller has a downward bias so the second basket deflects relative to the center rail when a force overcomes the downward bias of the top roller and remove the detent from the aperture. In some embodiments, the system further comprises a bottom plate extending between the first and second center plates, wherein the detent extends from the bottom plate. In various embodiments, the system further comprises at least one side roller that is positioned in the first center plate and that contacts a first side surface of the center rail; and at least one side roller that is positioned in the second center plate and that contacts a second side surface the center rail. In some embodiments, the system further comprises a hinge connected to an end of the first section and connected to an end of the second section to provide the rotatable connection between the first and second sections.

Another embodiment of the disclosure is a trailer system for receiving a vehicle, comprising: a center rail extending along a longitudinal axis, the center rail having an aperture; a rear basket connected to the center rail, the rear basket defining a rear receiving volume; a front basket slidably connected to the center rail, the front basket defining a front receiving volume, wherein the front basket has a detent configured to extend into the aperture of the center rail, and the front basket is deflectable in a downward direction that is substantially perpendicular to the longitudinal axis of the center rail; wherein, in a first position along the center rail, the front basket is fixed in position on the center rail and the detent extends into the aperture; and wherein, in a second position along the center rail, the front basket is deflected in the downward direction and the detent is removed from the aperture.

In some embodiments, the front basket further comprises a first center plate positioned on one side of the center rail; a second center plate positioned on an opposing side of the center rail; and a top roller that extends between the first and second center plates and that contacts a top surface of the rail, wherein the top roller has a bias in the downward direction and is deflectable so that the front basket is deflectable in the downward direction. In various embodiments, the front basket comprises a first elongated slot in the first center plate, wherein one end of the top roller is positioned in the first elongated slot; and a second elongated slot in the second center plate, wherein an opposing end of the top roller is positioned in the second elongated slot.

In some embodiments, the front basket further comprises a bottom plate extending between the first and second center plates, wherein the detent extends from the bottom plate. In various embodiments, the system further comprises a hinge that rotatably connects an end of a first section of the center rail to an end of a second section of the center rail, wherein the front basket passes the hinge between the first position and the second position. In some embodiments, the front basket further comprises a first plurality of side rollers of the first center plate, wherein each roller of the first plurality of rollers rotates in a direction substantially perpendicular to both a rotational direction of the top roller and the longitudinal axis of the center rail; and a second plurality of side rollers of the second center plate, wherein each roller of the second plurality of rollers rotates in a direction substantially perpendicular to both a rotational direction of the top roller and the longitudinal axis of the center rail.

A further embodiment is a method for receiving a vehicle on a trailer, comprising (i) providing a trailer having a center rail, a first basket connected to the center rail, and a second basket slidably connected to the center rail; (ii) moving a first wheel of a vehicle into a first receiving volume of the first basket; (iii) moving the first wheel of the vehicle into a second receiving volume of the second basket; and (iv) sliding the second basket along the center rail from a first position to a second position where a second wheel of the vehicle moves into the first receiving volume of the first basket.

In various embodiments, the method further comprises (v) removing a detent of the second basket from an aperture in the center rail to allow the second basket to slide along the center rail from the first position to the second position. In some embodiments, the method further comprises (vi) providing a top roller of the second basket that contacts a top surface of the center rail, wherein the top roller has a bias in a downward direction; and (vii) deflecting the second basket relative to the center rail in the downward direction to overcome of the bias of the top roller and remove the detent from the aperture.

In some embodiments, the method further comprises (viii) providing a hinge connected to first and second sections of the center rail, wherein the hinge allows the first and second section to fold against each other; and (ix) sliding the second basket past the hinge as the second basket slides from the first position to the second position. In various embodiments, the method further comprises (x) rotating, by the first wheel, a roller of the second basket as the second basket slides from the first position to the second position. In some embodiments, the method further comprises (xi) rotating a ramp connected to the first basket; and (xii) securing the ramp against the second wheel in the first receiving volume of the first basket.

The Summary is neither intended nor should it be construed as being representative of the full extent and scope of the present disclosure. Embodiments are set forth in various levels of detail in the Summary as well as in the attached drawings and the Detailed Description and no limitation as to the scope of the present disclosure is intended by either the inclusion or non-inclusion of elements or components. Additional aspects of the trailer system and methods of use will become more readily apparent from the Detailed Description, particularly when taken together with the drawings.

The above-described embodiments, objectives, and configurations are neither complete nor exhaustive. As will be appreciated, other embodiments are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary, brief description of the drawings, detailed description, abstract, and claims themselves.

BRIEF DESCRIPTION OF THE DRAWINGS

The accompanying drawings, which are incorporated in and constitute a part of the specification, illustrate embodiments of the trailer system and together with the Summary given above and the Detailed Description of the drawings given below, serve to explain the principles of these embodiments. In certain instances, details that are not necessary for an understanding of the trailer system or that render other details difficult to perceive may have been omitted. It should be understood, of course, that the trailer system is not necessarily limited to the particular embodiments illustrated herein. Additionally, it should be understood that the drawings are not necessarily to scale.

FIG. 26 is another perspective view of the bottom plate in FIG. 24 and a detent in accordance with one embodiment;

FIGS. 35A-35E are various views of the center rail in FIG. 34 in accordance with one embodiment;

FIGS. 36A-36F are various views of hinge parts in accordance with one embodiment;

FIGS. 39A-39E are various views of an axle in accordance with one embodiment;

FIGS. 41-41C are various views of a rear side plate in accordance with one embodiment;

FIGS. 42A-42D are various views of a rear inner plate in accordance with one embodiment;

FIG. 56 is a side elevation view of the trailer system in FIG. 55 in accordance with one embodiment;

FIG. 57 is a side elevation view of the trailer system in FIG. 55 with the center rail folded in accordance with one embodiment;

FIG. 58 is a perspective view of the trailer system in FIG. 57 in accordance with one embodiment;

FIG. 59 is a further perspective view of the trailer system in FIG. 57 in accordance with one embodiment;

FIG. 60 is a top plan view of the trailer system in FIG. 54 with the front basket in a second position in accordance with one embodiment;

FIG. 74 is a top plan view of a trailer system with a front basket in a second position in accordance with one embodiment;

FIG. 75 is a top plan view of the trailer system in FIG. 74 with the front basket in a first position in accordance with one embodiment;

Figure 1:
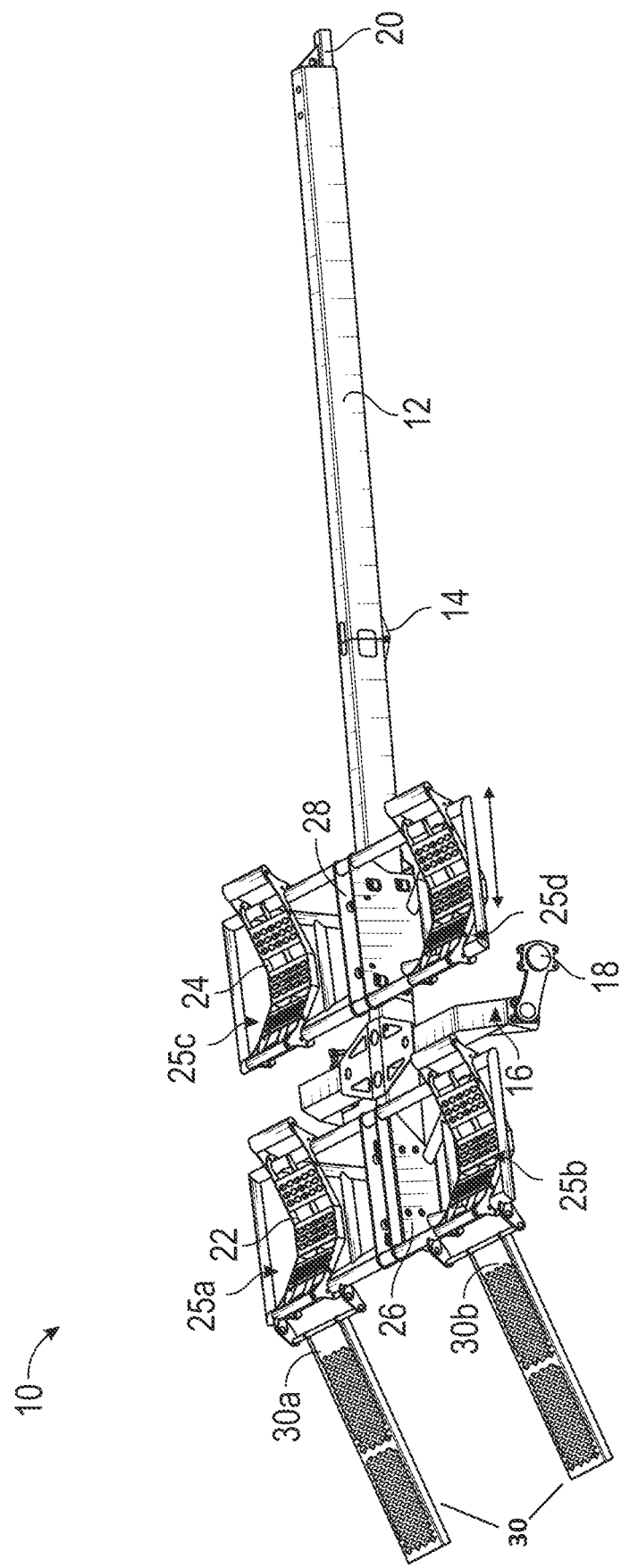
FIG. 1 is a perspective view of a trailer system in accordance with one embodiment.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Number | Component |
| --- | --- |
| 10 | Trailer System |
| 12 | Center Rail |
| 14 | Hinge |
| 16 | Axle |
| 18 | Wheel |
| 20 | Hitch |
| 22 | Rear Insert |
| 24 | Front Insert |
| 25 (a-d) | Receiving Volume |
| 26 | Rear Basket |
| 27 | Roller |
| 28 | Front Basket |
| 30 | Ramp |
| 32 | Basket Frame |
| 34 (a-b) | Center Plate |
| 36 | Insert Frame |
| 38 | Wheel Plate |
| 40 | Extension |
| 42 | Side Roller |
| 44 | Top Roller |
| 46 | Elongated Slot |
| 48 | Rail Plate |
| 50 | Bottom Plate |
| 52 | Detent |
| 54 | First Section |
| 56 | Second Section |
| 58 | Hinge Finger |
| 60 | Lock |
| 62 (a-b) | Channel |
| 64 | Torsion Axle |
| 66 | Tube |
| 68 | Beam |
| 70 | Hub |
| 72 | Dampeners |
| 74 | Arm |
| 76 | Front End Plate |
| 78 | Front Tube |
| 80 | Front Center Portion |
| 82 | Front Bottom Roller |
| 84 | Front Top Roller |
| 86 | Hinge Part |
| 88 | Axle Bracket |
| 90 | Rear Side Plate |
| 92 | Rear Inner Plate |

DETAILED DESCRIPTION

The trailer system has significant benefits across a broad spectrum of endeavors. It is the Applicant's intent that this specification and the claims appended hereto be accorded a breadth in keeping with the scope and spirit of the disclosure despite what might appear to be limiting language imposed by the requirements of referring to the specific examples disclosed. To acquaint persons skilled in the pertinent arts, a preferred embodiment that illustrates the best mode now contemplated for putting the trailer system into practice is described herein by, and with reference to, the annexed drawings that form a part of the specification. The exemplary embodiment is described in detail without attempting to describe all of the various forms and modifications in which the trailer system might be embodied. As such, the embodiments described herein are illustrative, and as will become apparent to those skilled in the arts, may be modified in numerous ways within the scope and spirit of the disclosure.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments are described herein and as depicted in the drawings. It is expressly understood that although the figures depict trailer systems, sliding baskets, and methods and systems for using the same, the present disclosure is not limited to these embodiments.

Referring now to FIG. 1, a perspective view of a trailer system 10 is provided. The trailer system 10 has a center rail 12 to which other components can be connected. As described in further detail below, the center rail 12 can include a hinge 14 that allows the center rail 12 of the trailer system 10 to fold over, and thus, permit the storage of the trailer system 10 in a compact space. An axle 16 is connected to the center rail 12 toward a rear end of the center rail 12, and apertures 18 at ends of the axle 16 receive wheels that bear the weight of the trailer system 10. In the depicted embodiment, the axle 16 comprises two torsion axles that provide independent suspension to the wheels and the trailer system 10. It will be appreciated that embodiments of the disclosure can include a single, continuous axle 16 such that both wheels rotate on the common axle 16. In addition, it will be appreciated that the center rail 12 can have a plurality of apertures such that the axle 16 can be repositioned along the length of the center rail 12. Varying the position of the axle 16 along the length of the center rail 12 can adjust the weight distribution of a load on the trailer system 10. A hitch 20 is positioned at a front end of the center rail 12 to selectively connect the trailer system 10 to a vehicle that tows the trailer system 10.

It will be appreciated that features such as a double-sided gas can that straddles the center rail 12, and/or a jack can be positioned on or near the front end of the center rail 12. Further still, the front end of the center rail 12, which can be described as the second section of the center rail 12, can comprise two sub sections that are joined by a linear actuator, which moves one subsection within the other subsection to change the length of the center rail 12.

Two baskets 26, 28 are connected to the center rail 12 to receive, for example, the wheels of a vehicle. In this embodiment, a rear or first basket 26 is connected to the center rail 12, and a front or second basket 28 is slidably connected to the center rail 12 such that the front basket 28 can move along a length or longitudinal axis of the center rail 12. The rear basket 26 can be directly connected or slidably connected to the center rail in various embodiments. Further still, the rear basket 26 and the axle 16 can be integrated with each other. For instance, in various embodiments, the axle 16 can serve to define part of the rear basket 26 and/or part of the receiving volume of the rear basket 26 that receives a wheel of a vehicle. See, for example, Appendix C.

Each basket 26, 28 in the depicted embodiment comprises center plates, tubes, and respective inserts 22, 24 that define receiving volumes 25a-25d configured to receive wheels of a vehicle. As shown in FIG. 1, the two baskets 26, 28 provide four receiving volumes 25a-25d to receive four wheels of a two-axle vehicle. The term "receiving volume" as used herein can refer to a single receiving volume 25a or, for example, a combination of receiving volumes 25a, 25b in one basket. It will be appreciated that embodiments can include more or fewer baskets that provide more or fewer volumes to receive, for example, six wheeled vehicles, two wheeled vehicles, tracked vehicles, etc.

As discussed herein, the front basket 28 moves during loading of a vehicle. In a first or initial position, the front basket 28 is positioned substantially adjacent to the rear basket 26 and axle 16. A vehicle moves toward the rear end of the trailer system 10, and the vehicle's front wheels move up a pair of ramps 30a, 30b and into the receiving volumes 25a, 25b defined by the rear basket 26 and onto rear inserts 22. The vehicle continues to move forward, and the vehicle's front wheels move out of the receiving volumes 25a, 25b of the rear basket 26 and into the receiving volumes 25c, 25d of the front basket 28 and onto the front inserts 24. The vehicle continues to move forward, and the front basket 28 slides along the center rail 12 and past the hinge 14. The vehicle's rear wheels move up the ramp and into the receiving volumes 25a, 25b defined by the rear basket 26. The vehicle is stopped, and now the front basket 28 is in a second or final position where the distance between the baskets 26, 28 is substantially the same as the wheelbase of the vehicle loaded onto the trailer system 10.

Once in the final position, the vehicle can be secured to the trailer system 10. In some embodiments, the ramps 30a, 30b that allow the vehicle to move into the baskets 26, 28 is hinged about one or more axes of rotation such that when the vehicle is positioned on the trailer system 10, the ramps 30a, 30b fold back over the rear wheels of the vehicle. Straps or other securing means can extend from a distal end of the folded ramps 30a, 30b to another connection point on the trailer system 10 to secure the vehicle to the trailer system 10. In addition, the front basket 28 can be secured to the center rail 12 using, for example, a thumb screw on the front basket 28 that impinges upon the center rail 12.

Figure 2:
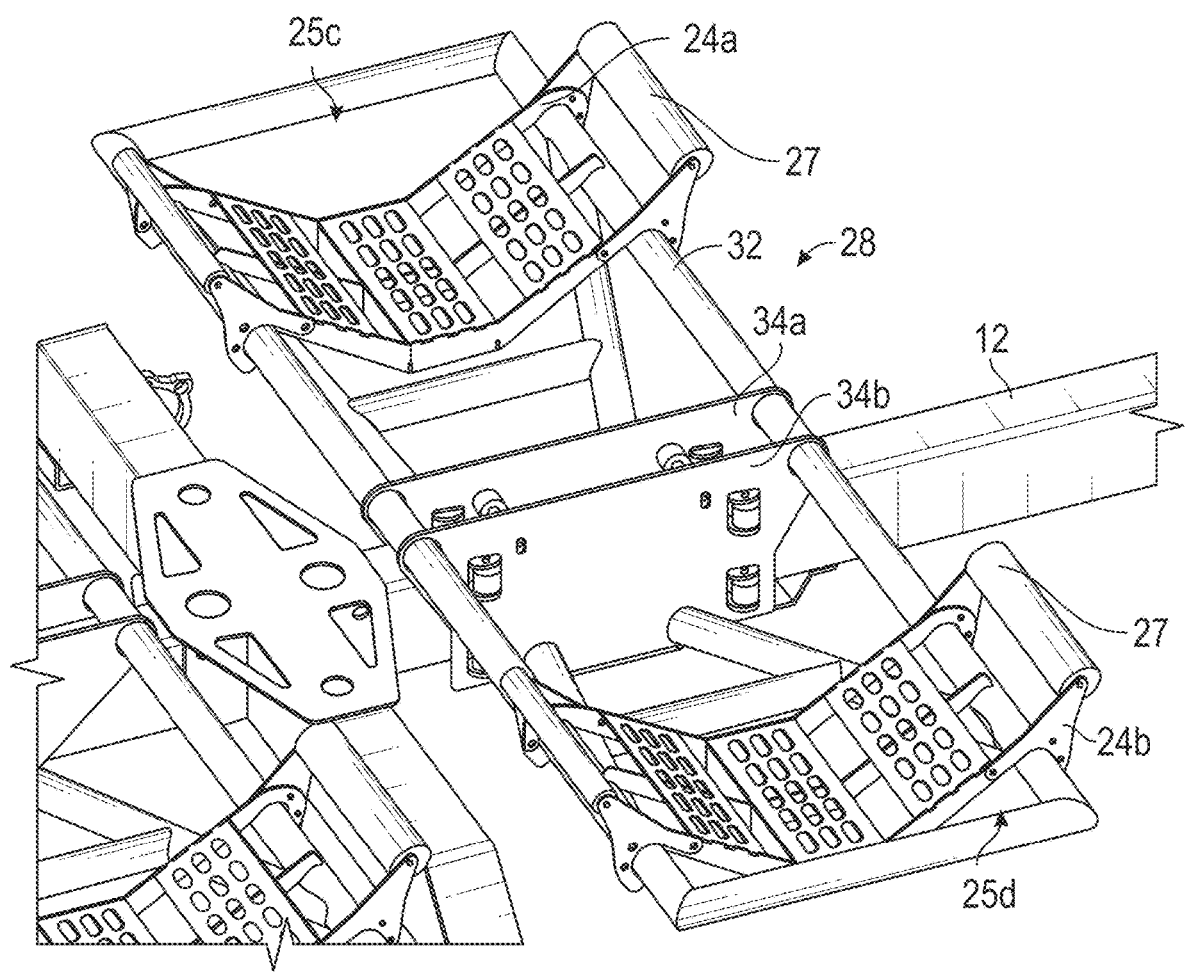
FIG. 2 is a perspective view of a sliding front basket of the trailer system in FIG. 1 in accordance with one embodiment.

Referring now to FIG. 2, a perspective view of the front basket 28 is provided. In this embodiment, the front basket 28 has a first center plate 34a positioned on one side of the center rail 12 and a second center plate 34b positioned on an opposing side of the center rail 12. A basket frame 32 extends between the center plates 34a, 34b and outside of the center plates 34a, 34b to at least partially define the receiving volumes 25c, 25d configured to receive the wheels of a vehicle. In this embodiment, a first insert 24a and a second insert 24b are positioned on the basket frame 32 to receive the front left wheel and the front right wheel of a vehicle, respectively. The inserts 24a, 24b receive the wheels of the vehicle and transfer the weight of the vehicle to the basket frame 32, which then transfers the weight to the center plates 34a, 34b and the center rail 12.

A roller 27 is positioned at the front, upper ends of each insert 24a, 24b to allow a wheel to rotate within the inserts 24a, 24b. Some vehicles are four-wheel drive, and when such a vehicle enters the trailer system 10, the placement of one or more rollers 27 can keep the vehicle on the trailer system 10 and ensure the normal operation of the trailer system 10. As the four-wheel drive vehicle enters the trailer system 10, the front wheels enter the rear basket and then the front, sliding basket 28. Next, with all four wheels turning, the front wheels may tend to pull up and out of the front basket 28. However, prior to this, the front wheels will rotate against the rollers 27 to keep the front wheels in the receiving volumes 25c, 25d of the front basket 28. Similarly, the rear basket can have rollers positioned at a front end to keep the rear wheels in the rear basket. When the vehicle reverses out of the trailer system 10 and the front basket 28 slides to its original position, the front basket 28 may have rollers position at the rear ends of the inserts 24a, 24b to prevent the front wheels from prematurely exiting out of the receiving volumes 25c, 25d as the front basket 28 slides to its original position. Various configurations of rollers, rollers do not completely freely rotate, non-rotating bars, or the absence of any of these components are contemplated to accommodate four-wheel drive vehicles, two-wheel drive vehicles such as front wheel drive or rear wheel drive, or any other type of vehicle drivetrain.

It will be appreciated that in some embodiments, the front basket 28 does not have any rollers. Instead, a surface of the front basket 28 contacts and moves along a surface of the center rail 12. A feature such as a leaf spring or deflectable arm can be positioned between the front basket 28 and the center rail 12 so that the basket 28 can deflect relative to the center rail 12 and provide the selective locking capability described herein.

Next, the inserts 24a, 24b can be selectively connected to the basket frame 32 so that the inserts 24a, 24b can also move in a lateral direction away and toward the center plates 34a, 34b. Vehicles have a variety of track widths, and embodiments of the trailer system 10 can accommodate different track widths. In some embodiments, the inserts 24a, 24b simply rest on the tubular frame 32. In other embodiments, the inserts 24a, 24b are received into one or more recesses along the tubular frame 32, which limits lateral movement of the inserts 24a, 24b. Further still, the inserts 24a, 24b can be selectively fastened at various points along the frame 32 with, for example, a bolt into a threaded aperture in the frame 32. In some embodiments, the inserts 24a, 24b can be fixed to the frame 32 with a more permanent connection such as a weld. In yet further embodiments, inserts 24a, 24b are integrated and merged with the frame 32 itself.

Figure 3:
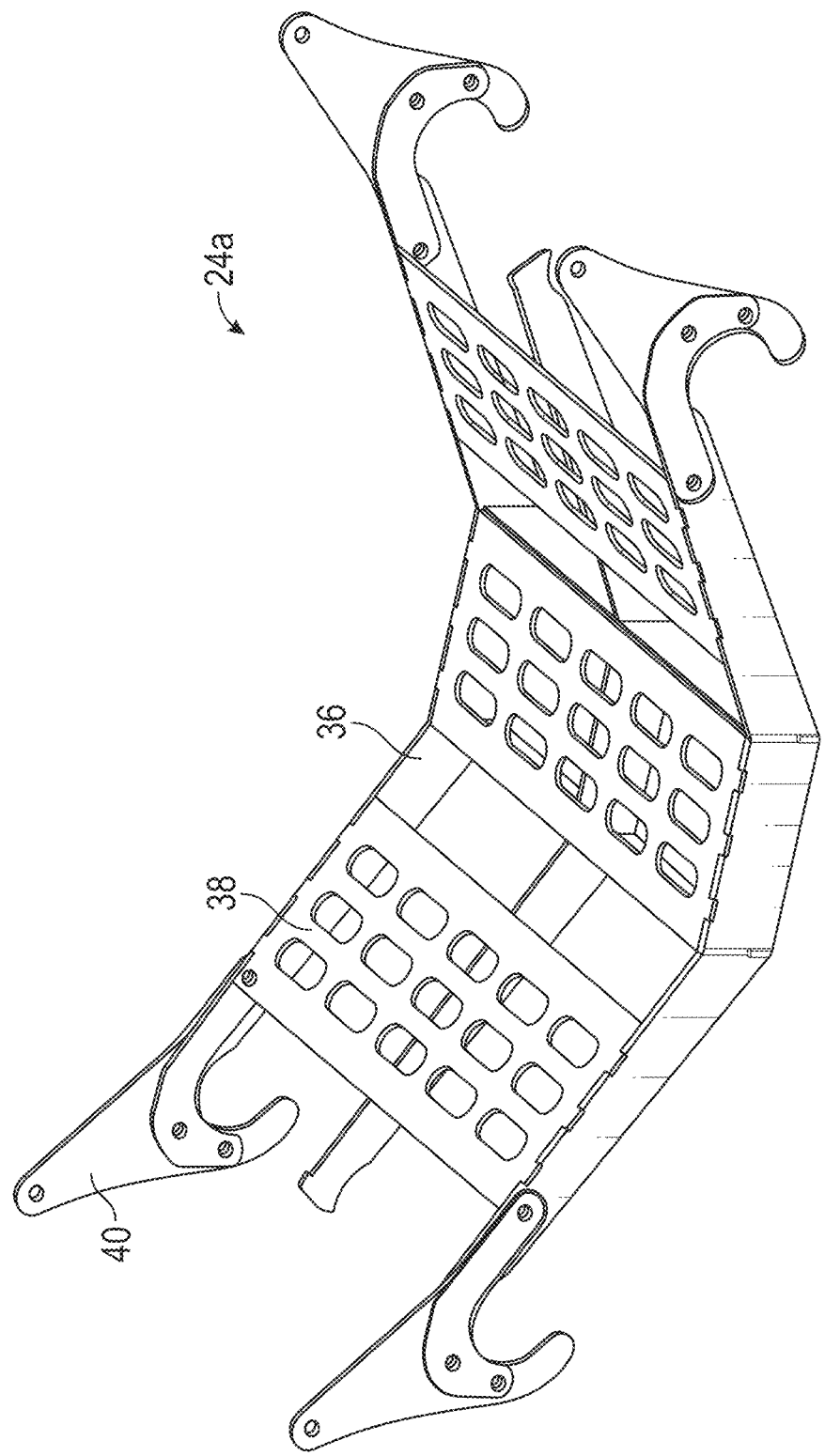
FIG. 3 is a perspective view of an insert of the trailer system in FIG. 1 in accordance with one embodiment.

Referring now to FIG. 3, a perspective view of an insert 24a is provided. The insert 24a has a frame 36, plates 38 that extend laterally to receive a wheel, and extensions 40 that are connected to the frame 36. The plates 38 can receive the wheel and transfer the weight of the vehicle to the frame 36, which transfers the weight of the vehicle to the basket frame. The extensions 40 define a circular recess that receives the circular cross-section of the tubular basket frame. The extensions 40 also provide a location for a roller to freely rotate. It will be appreciated that any combination of these parts 36, 38, 40 can be fully integrated with each other, fixedly connected to each other, or selectively connected to each other.

Figure 4:
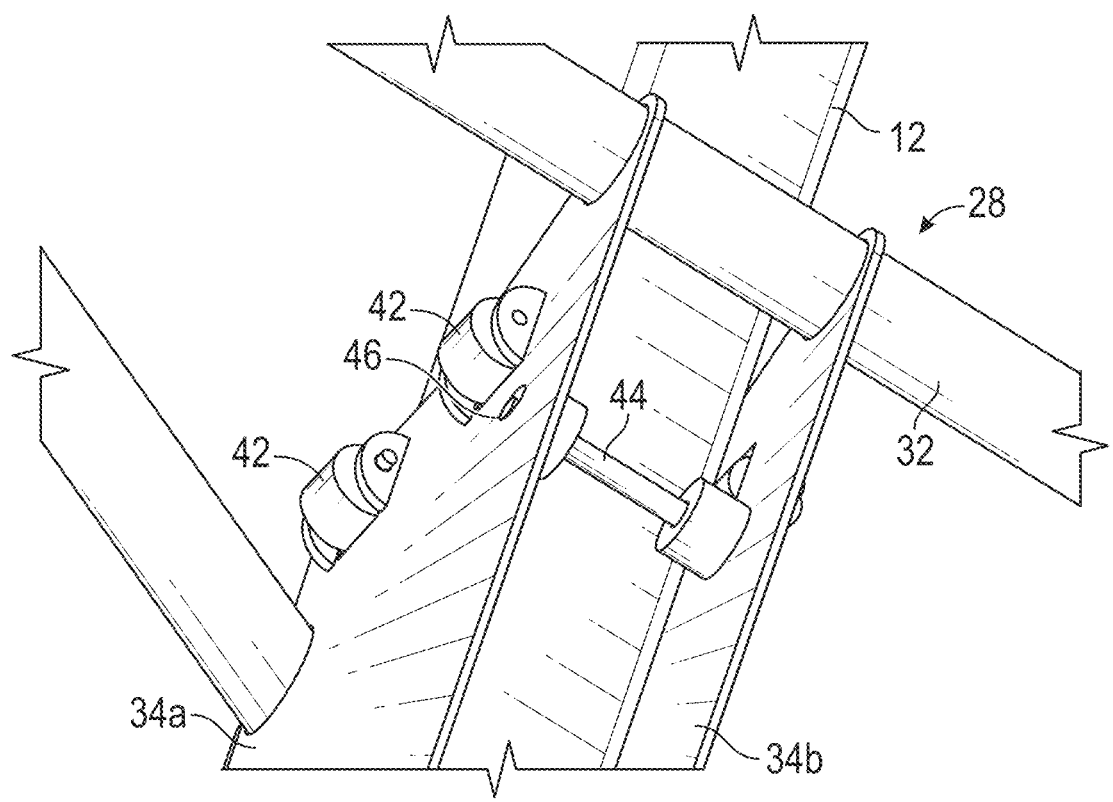
FIG. 4 is a top perspective view of a top roller of the front basket of the trailer system in FIG. 1 in accordance with one embodiment.
Figure 5:
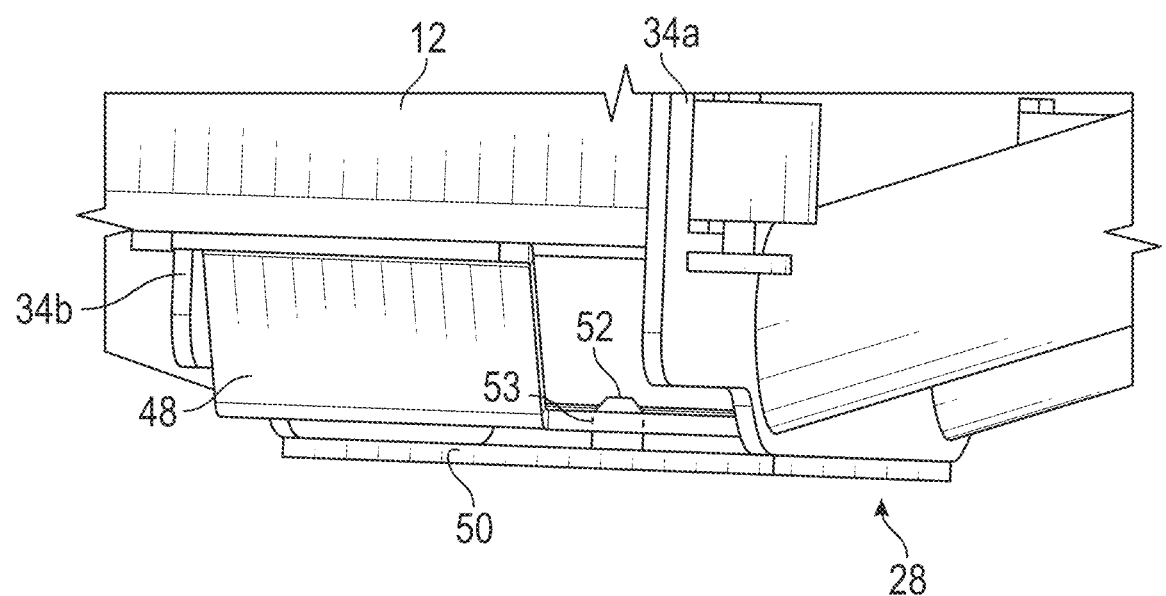
FIG. 5 is a bottom perspective view of a detent of the front basket of the trailer system in FIG. 1 in accordance with one embodiment.

Now referring to FIGS. 4 and 5, a top perspective view and a bottom perspective view of the center plates 34a, 34b of the sliding, front basket 28 are provided, respectively. The center plates 34a, 34b transfer the weight of the vehicle to the center rail 12 and also slidably engage the center rail 12. In the depicted embodiment, rollers 42, 44 allow the center plates 34a, 34b to slide along the length of the center rail 12. The side rollers 42 in this embodiment are cylindrically-shaped rollers 42 that rotate about an axis that is oriented substantially perpendicular to the center rail 12. Each side roller 42 rotates between two flanges that allow a portion of each rollers 42 to extend into the space between the center plates 34a, 34b and contact a side surface of the center rail 12. Two side rollers 42 are shown in FIG. 4, but as shown in FIGS. 1 and 2, each center plate 34a, 34b can have four side rollers 42. This number of side rollers 42 secures the front basket 28 to the center rail 12 and generally limits movement of the front basket 28 along the center rail 12 to linear movement.

In some embodiments, the front basket 28 can move both along the length of the center rail 12 and vertically or downwardly relative to the rail 12. A top roller 44 is shown in FIG. 4 that extends between the center plates 34a, 34b and can serve as part of a selective locking system for the front basket 28. Ends of the top roller 44 are positioned in elongated slots 46 where the longer dimension of the slot 46 is oriented vertically. A spring can be positioned between the end of the top roller 44 and the top side of the elongated slot 46 to bias the top roller 44 downwardly. It will be appreciated that other biasing features can bias the top roller 44 such as a leaf spring, rubber material, etc. FIG. 4 shows one top roller 44, but as shown in FIGS. 1 and 2, the front basket 28 may have two top rollers 44.

The biased top roller 44 serves as part of a selective locking system along with the detent 52 and aperture 53 combination shown in FIG. 5. Generally, the front basket 28 can move vertically between a first or locked position and a second or unlocked position, and FIGS. 4 and 5 depict the first position. In this position, the full weight of the wheels and vehicle are not yet borne by the front basket 28, and the biased top roller 44 pushes the front basket 28 upward relative to the center rail 12. In FIG. 5, a detent 52 from the front basket 28 extends into an aperture 53 of the center rail 12 to prevent the front basket 28 from sliding along the center rail 12. In this embodiment, a bottom plate 50 extends between the center plates 34a, 34b, and the detent 52 extends upward from a top surface of the plate 50. The aperture 53 extends through a plate 48, which is connected to the center rail 12.

In the second position of the selective locking system, the weight of the wheels and the vehicle in the front basket 28 causes the front basket 28 to unlock from the center rail 12. Referring to FIG. 4, the weight of the wheels in the front basket 28 overcomes the bias of the top roller 44, and the top roller 44 moves toward the top end of the elongated slot 46. Referring to FIG. 5, with the front basket 28 moving downward relative to the center rail 12, the detent 52 moves out of engagement with the aperture 53. As a result, the front basket 28 can slide along the center rail 12. Though a detent 52 and aperture 53 are shown and described, other embodiments of a selective locking system are contemplated. For example, the term aperture may encompass a recess in the plate 48 or main body of the center rail 12.

Figure 6:
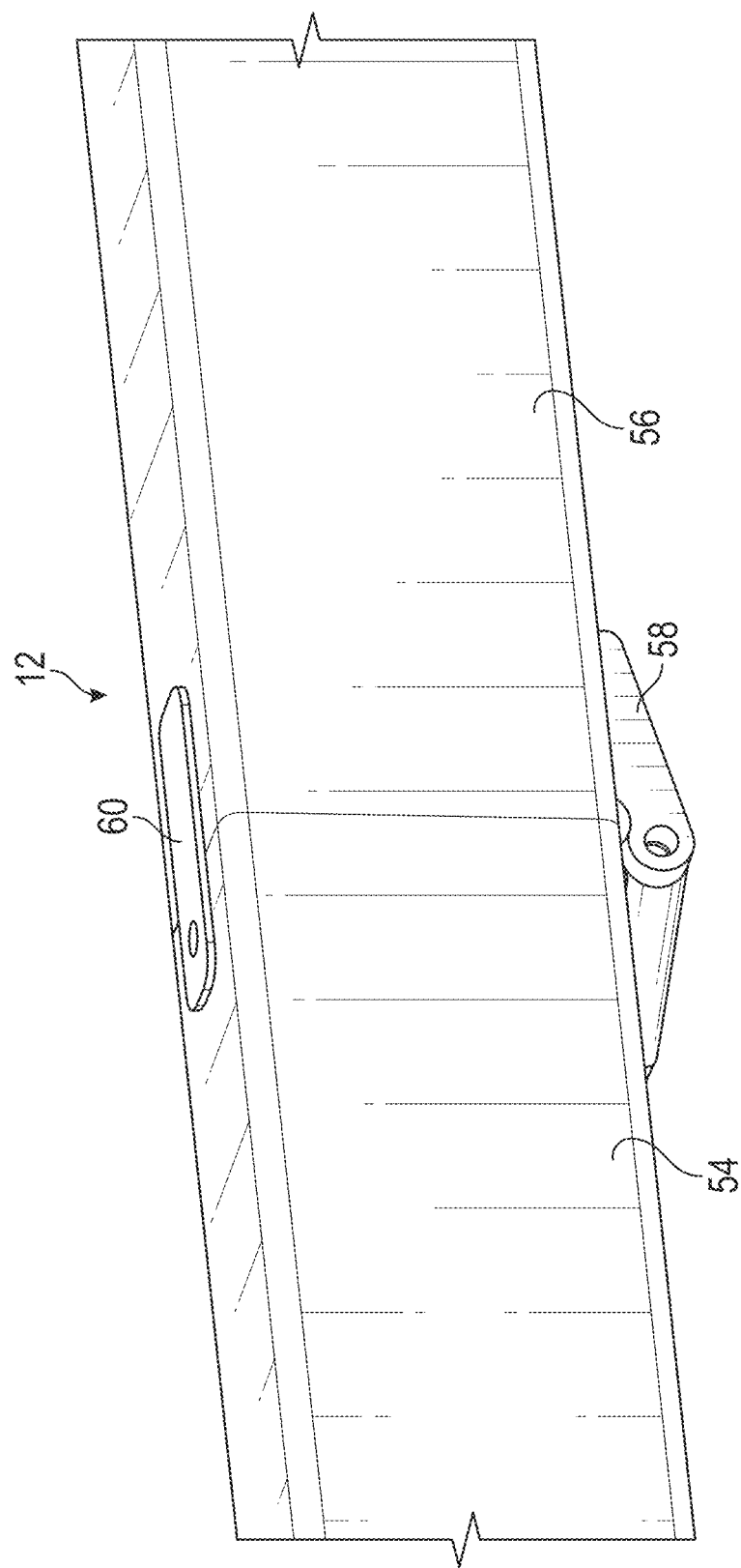
FIG. 6 is a perspective view of a joint between two sections of a center rail of the trailer system in FIG. 1 in accordance with one embodiment.

Referring now to FIG. 6, a perspective view of a hinge 14 and the center rail 12 is provided. The hinge 14 can be part of the center rail 12 or a separate component that connects to the center rail 12. In this embodiment, the hinge 14 connects a first section 54 of the center rail 12 to a second section 56 of the center rail 12. A lock plate 60 can secure the sections 54, 56 during use. For instance, the lock plate 60 can be connected to the second section 56, and then a pin can extend through an aperture in the plate 60 and into the first section 54 to secure the sections 54, 56 in the depicted position. To fold the center rail 12, the pin is removed or disengaged, and the second section 56 is rotated about the hinge 14 to fold underneath the first section 54, and the trailer system can be stored on a reduced footprint. Of note, the hinge 14 can be shaped to not impede or inhibit the front basket sliding along the center rail 12 from the first section 54 to the second section 56, or vice versa. In some embodiments, portions of the hinge 14 do not extend beyond a cross-sectional dimension of the center rail 12. In other embodiments, the hinge 14 may extend beyond this dimension, but the front basket has enough clearance to accommodate the hinge. Further still, it will be appreciated that embodiments can include a single, continuous center rail. In various embodiment, two sections of a center rail are bolted or otherwise mechanically joined together rather than rotatable joined together.

Figure 7:
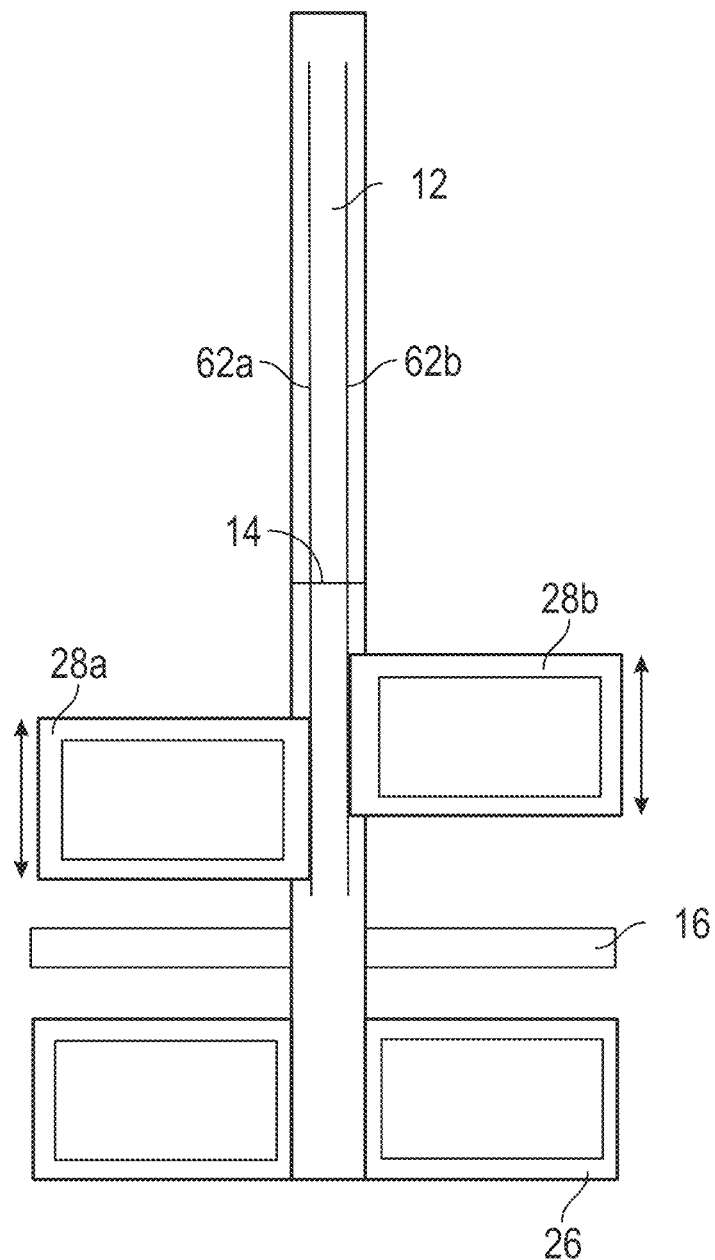
FIG. 7 is a top plan view of another trailer system in accordance with one embodiment.

Now referring to FIG. 7, a perspective view of an alternative embodiment of the trailer system 10 is provided. In this embodiment, the front basket is separated into two front baskets 28a, 28b that move independently. Therefore, two vehicles, such as an all-terrain vehicle or four-wheeler, can be positioned on the same trailer system 10. Two slots or channels 62a, 62b extend along part of the length of the center rail 12, and a center plate of one of the front baskets can extend into or through one of the slots or channels 62a, 62b.

Figure 8:
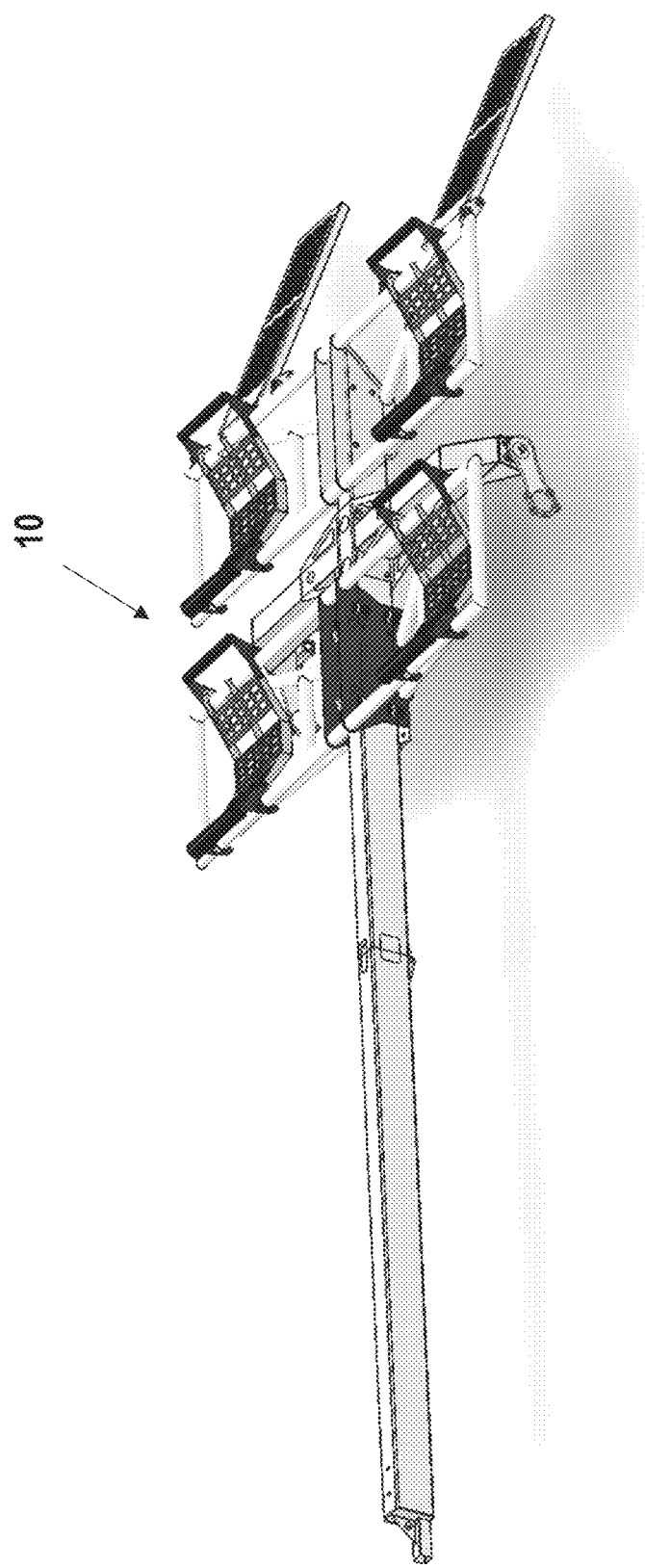
FIG. 8 is a top perspective view of a trailer system in accordance with one embodiment.
Figure 9:
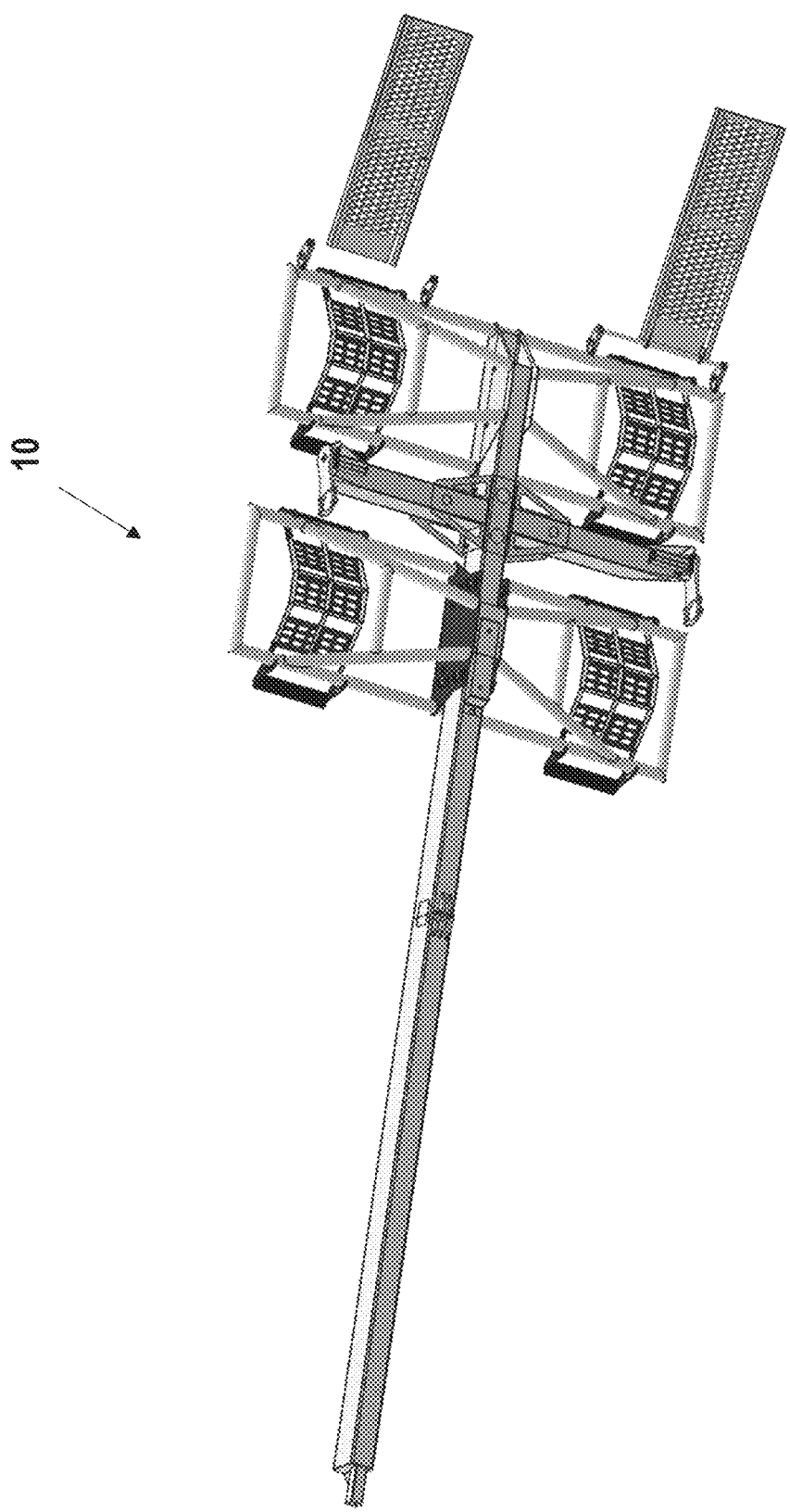
FIG. 9 is a bottom perspective view of the trailer system in FIG. 8 in accordance with one embodiment.
Figure 10:
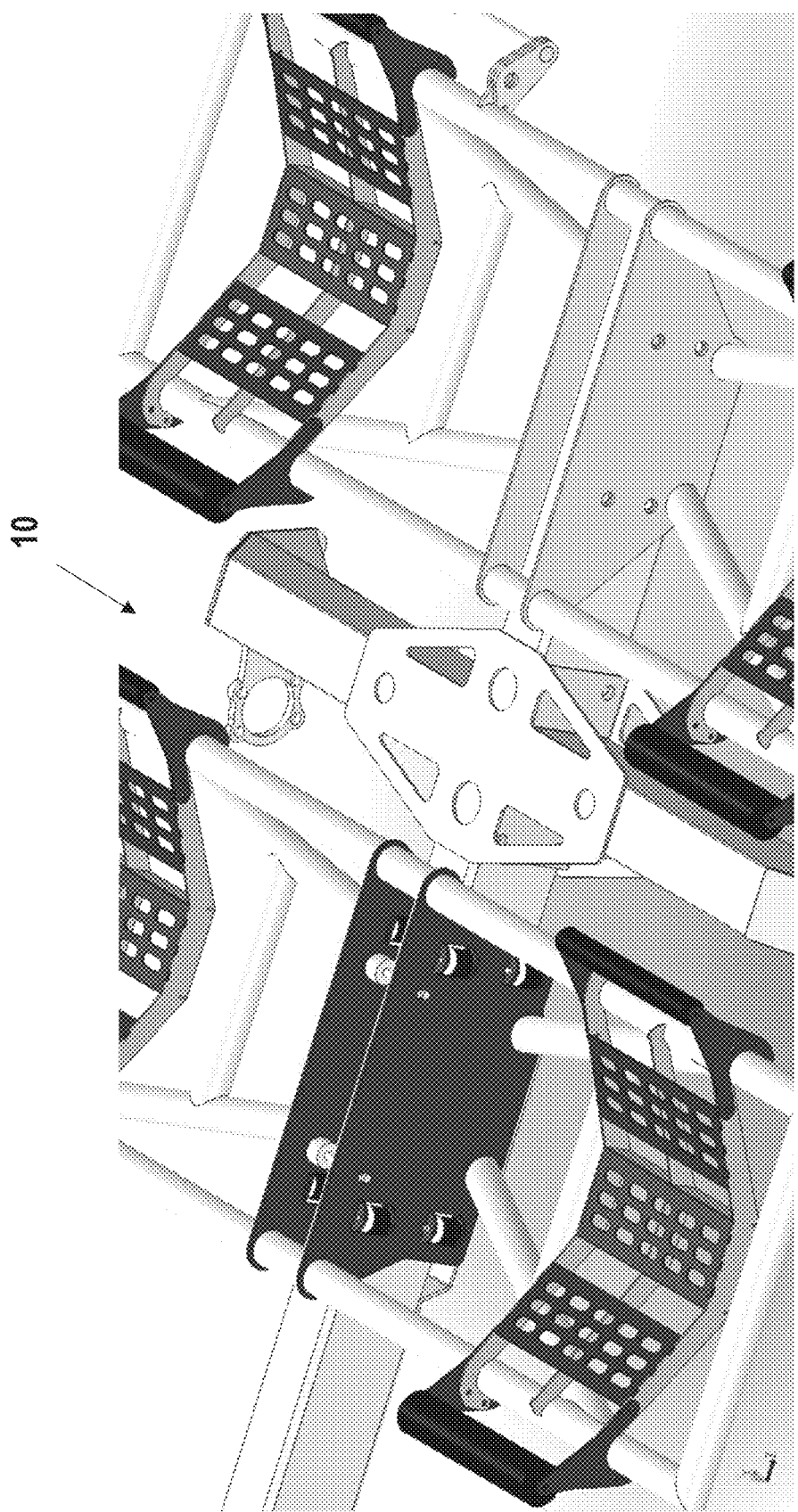
FIG. 10 is a further top perspective view of the trailer system in FIG. 8 in accordance with one embodiment.
Figure 11:
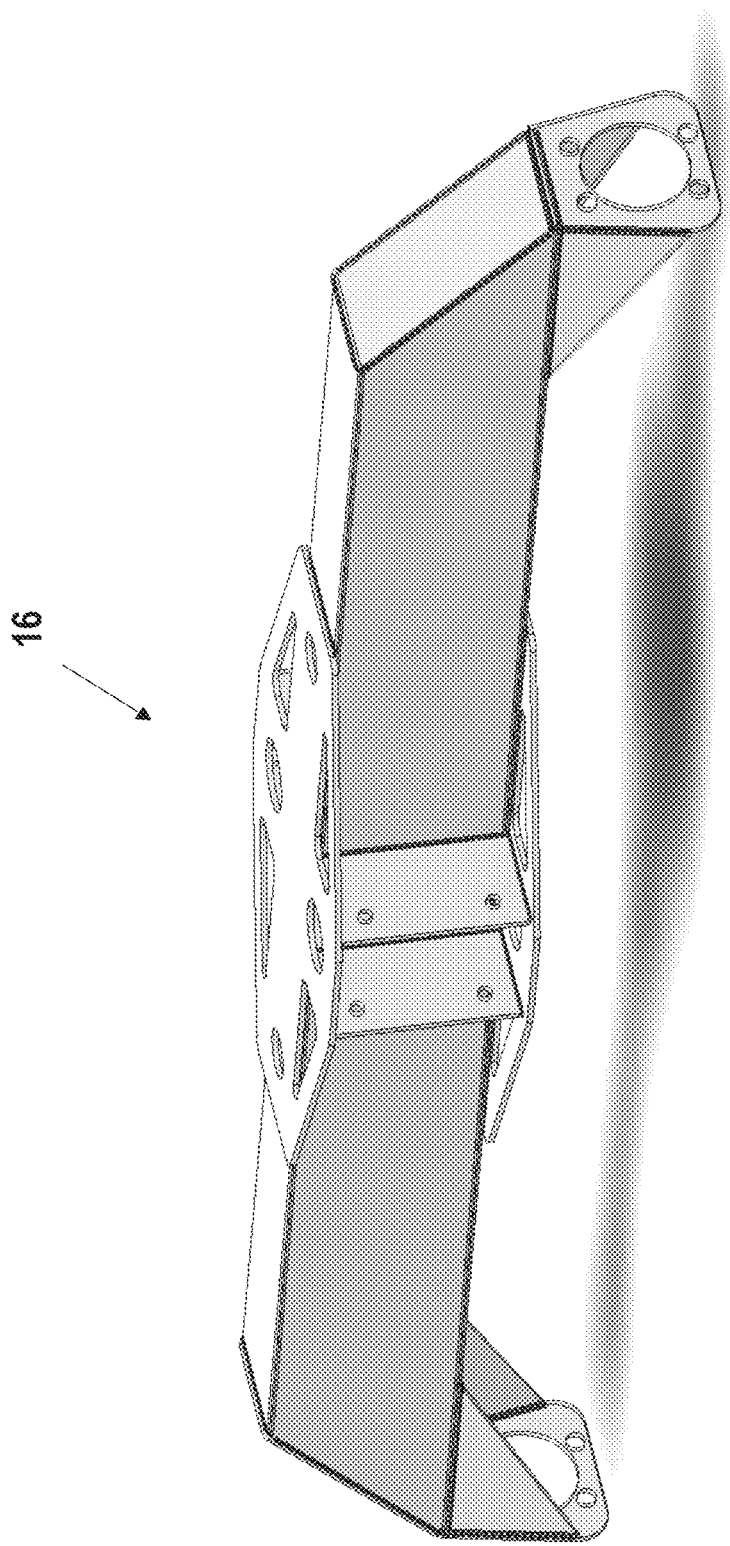
FIG. 11 is a top perspective view of an axle in accordance with one embodiment.
Figure 12:
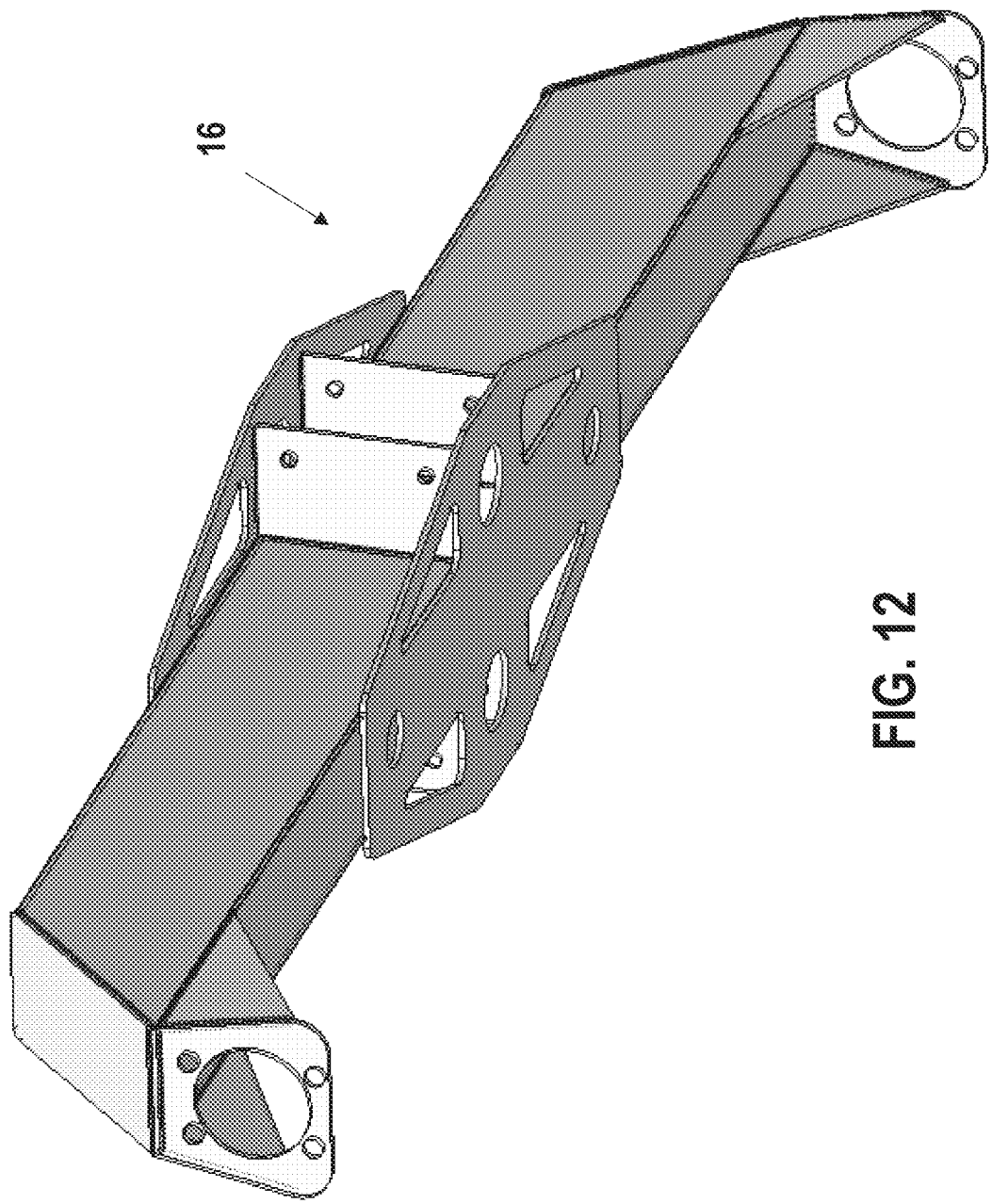
FIG. 12 is a bottom perspective view of the axle in FIG. 11 in accordance with one embodiment.
Figure 13:
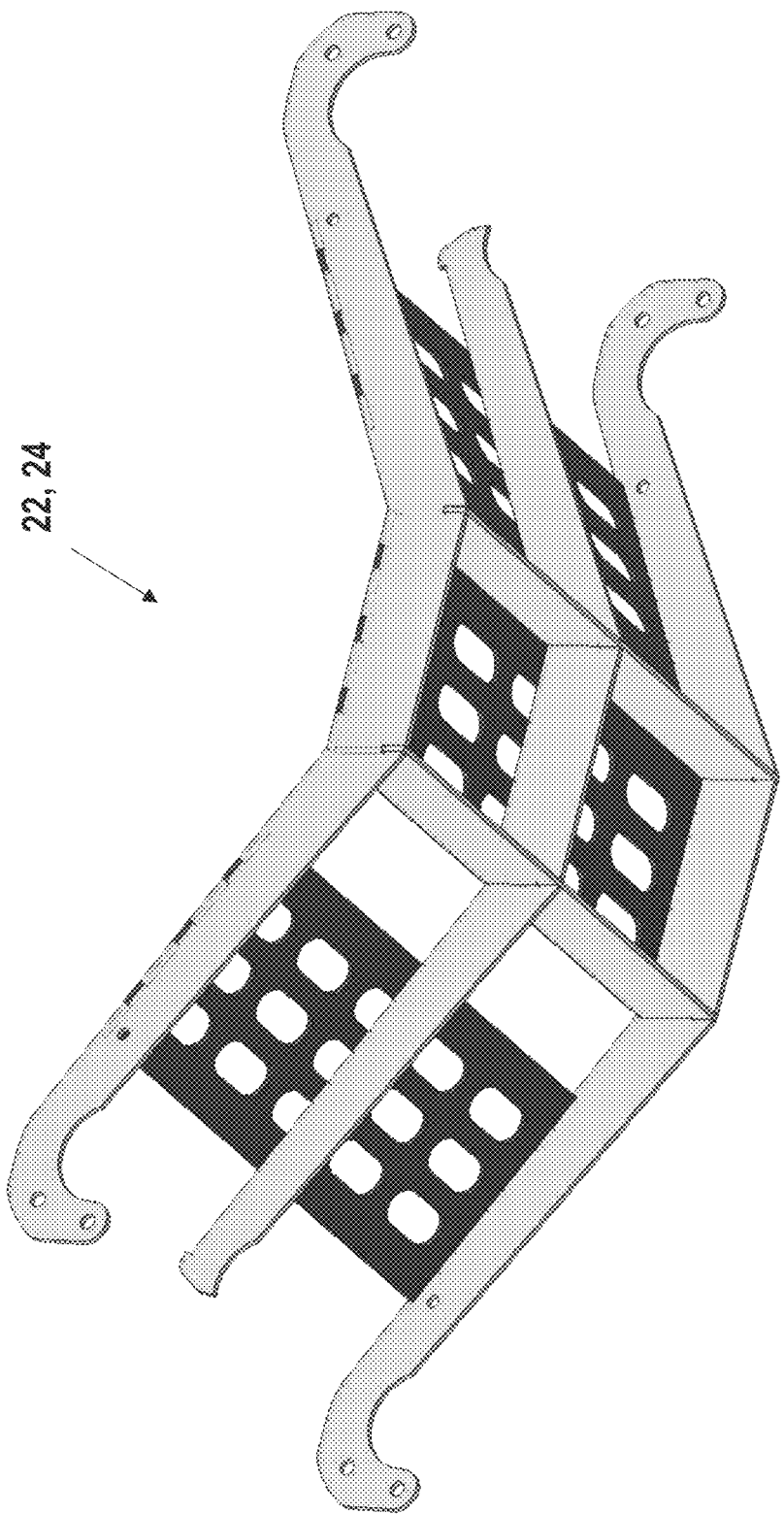
FIG. 13 is a bottom perspective view of a front or rear insert in accordance with one embodiment.
Figure 14:
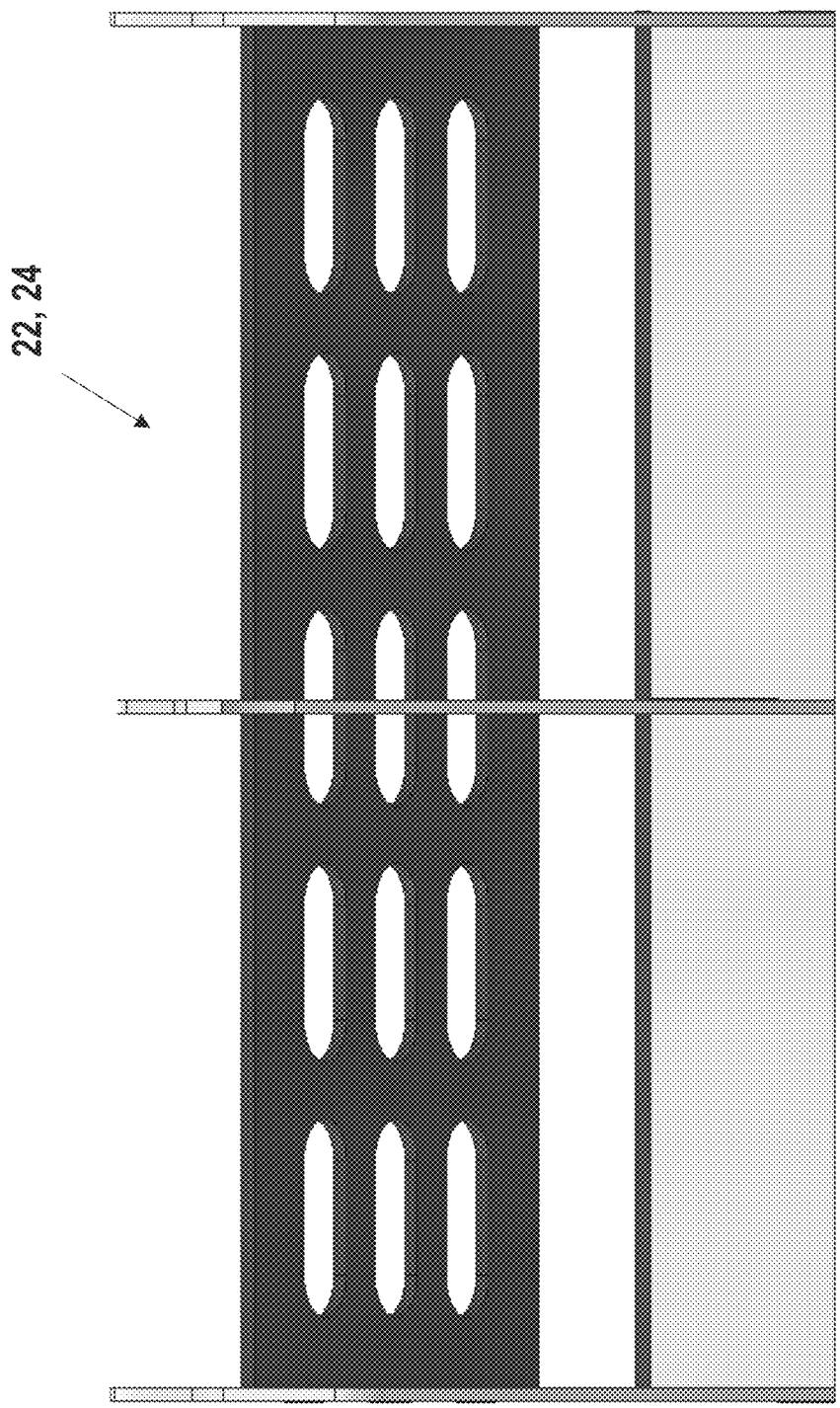
FIG. 14 is a side elevation view of the front or rear insert in FIG. 13 in accordance with one embodiment.
Figure 15:
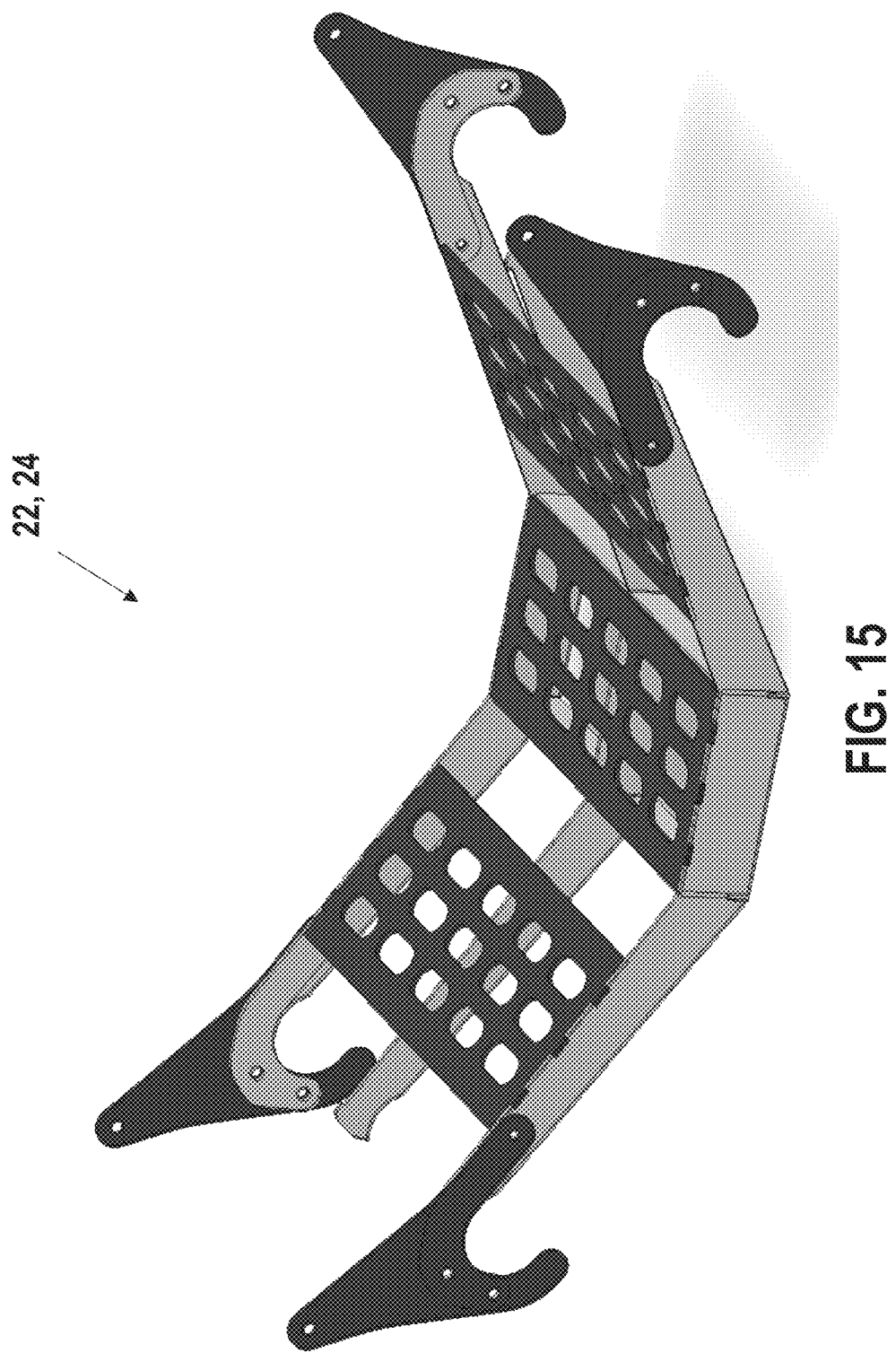
FIG. 15 is a top perspective view of a front or rear insert in accordance with one embodiment.
Figure 16:
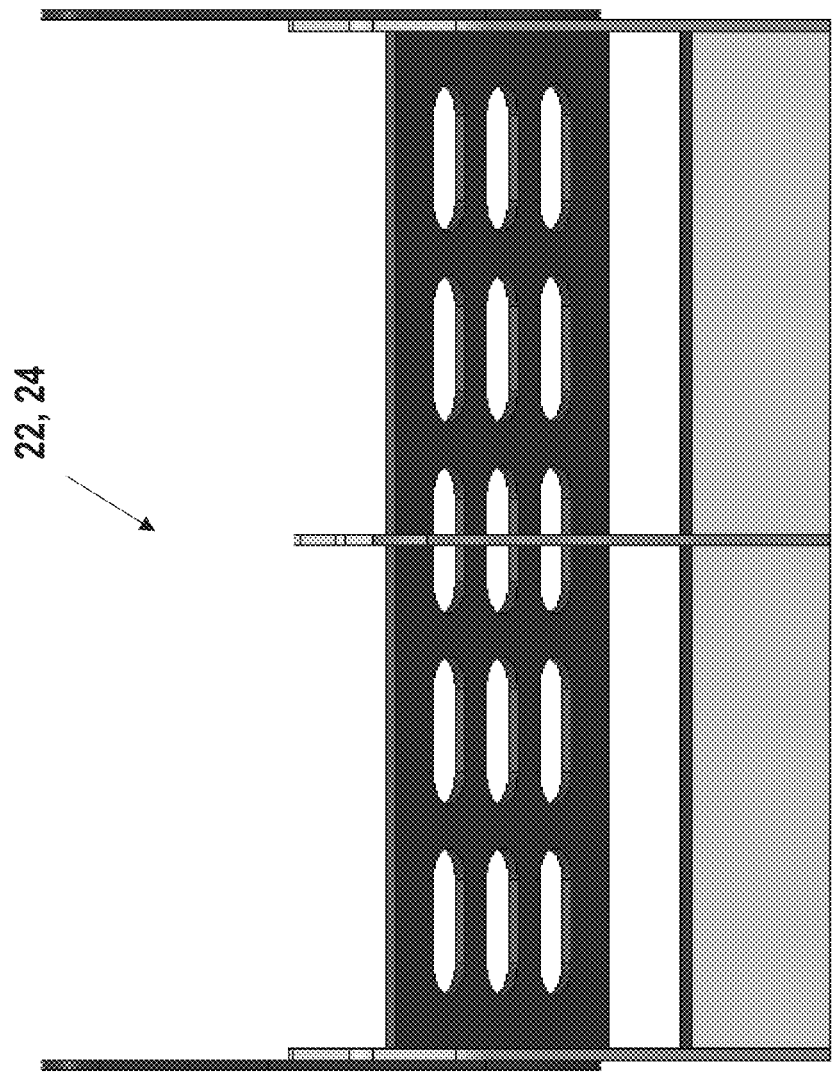
FIG. 16 is a side elevation view of the front or rear insert in FIG. 15 in accordance with one embodiment.
Figure 17:
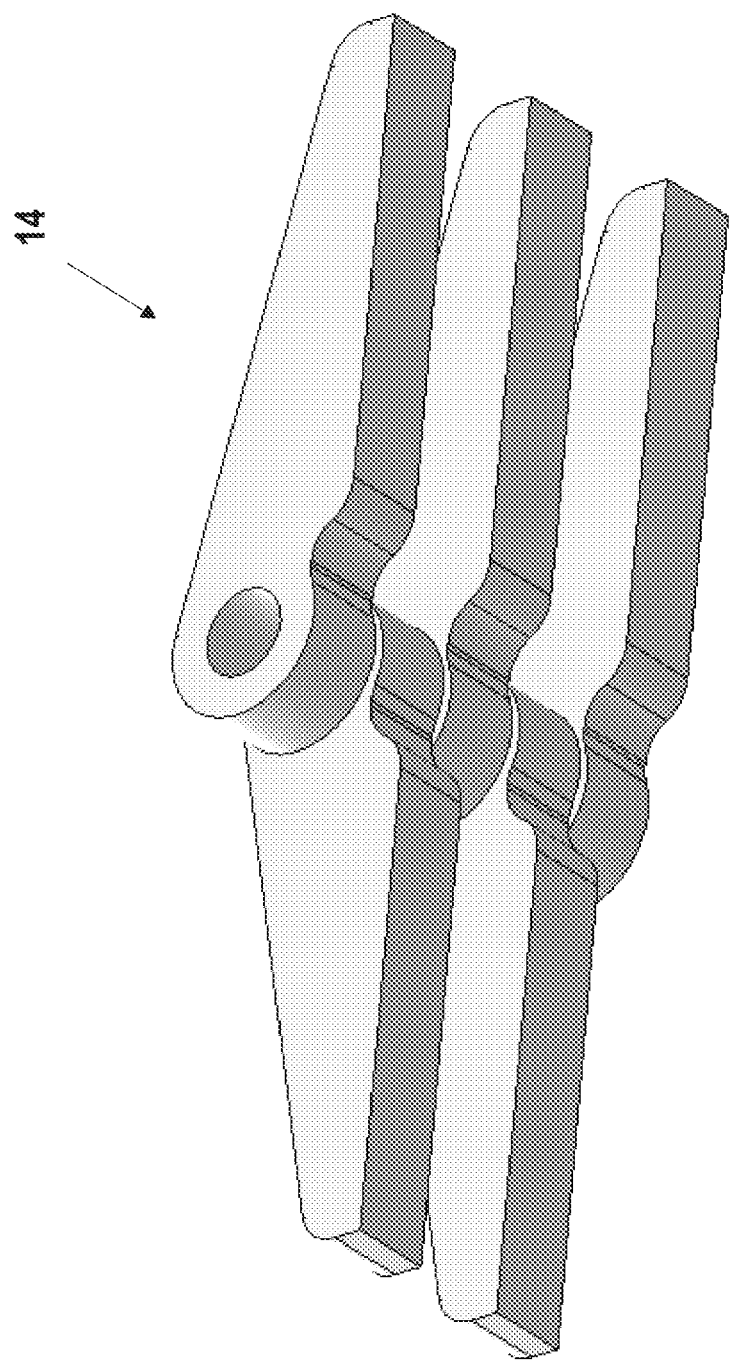
FIG. 17 is a perspective view of a hinge in accordance with one embodiment.
Figure 18:
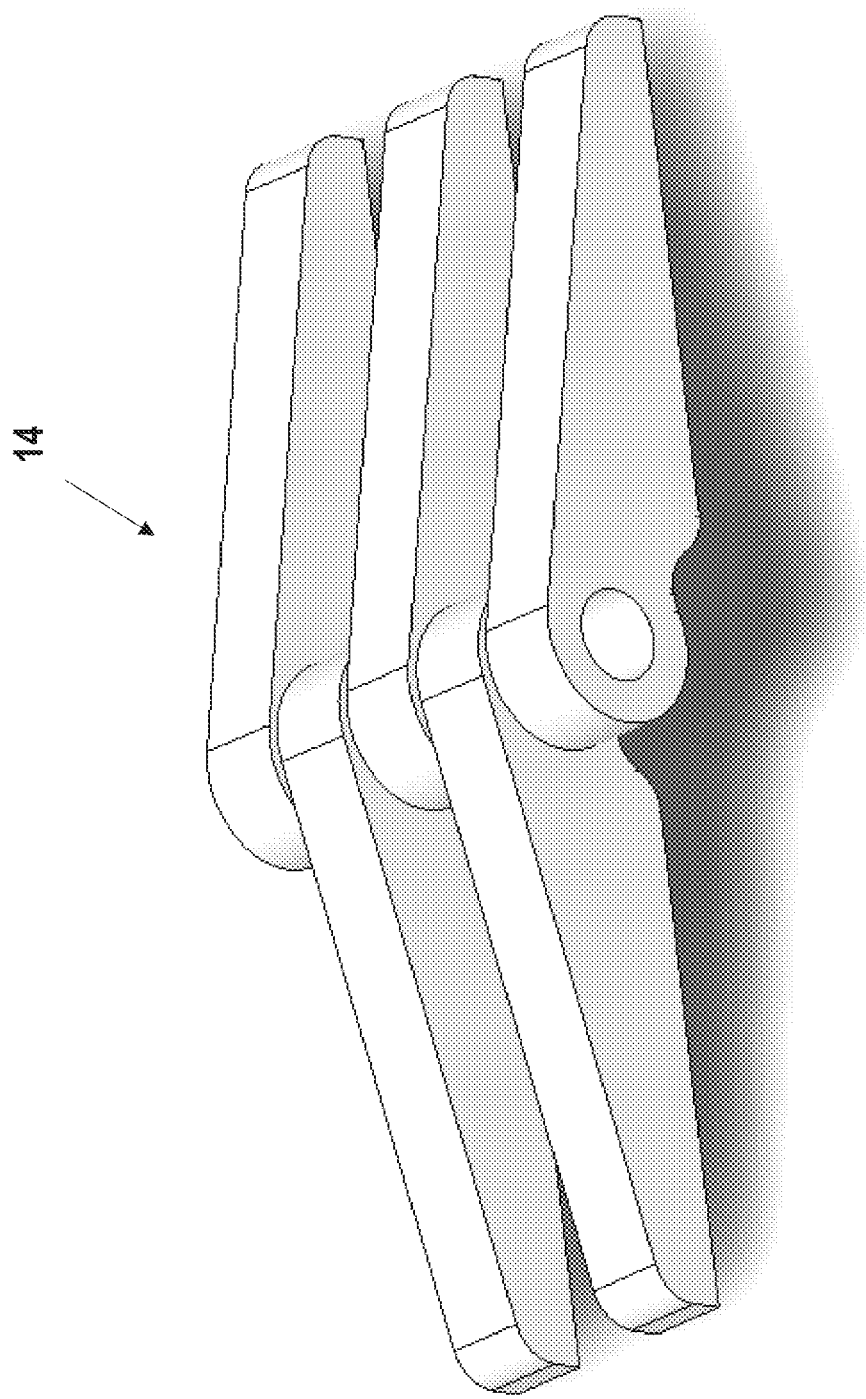
FIG. 18 is a further perspective view of the hinge in FIG. 17 in accordance with one embodiment.
Figure 19:
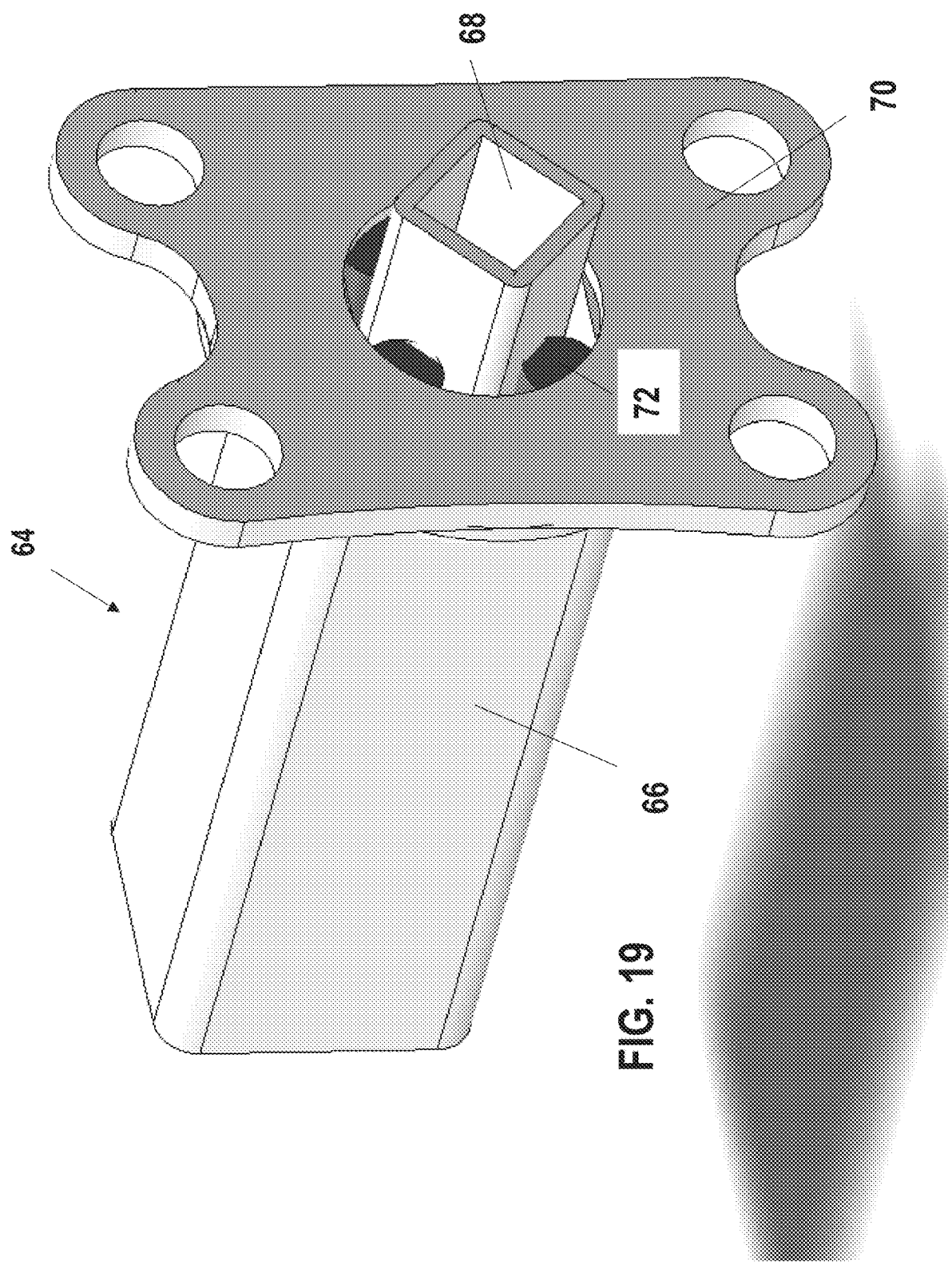
FIG. 19 is a perspective view of a torsion axle in accordance with one embodiment.
Figure 20:
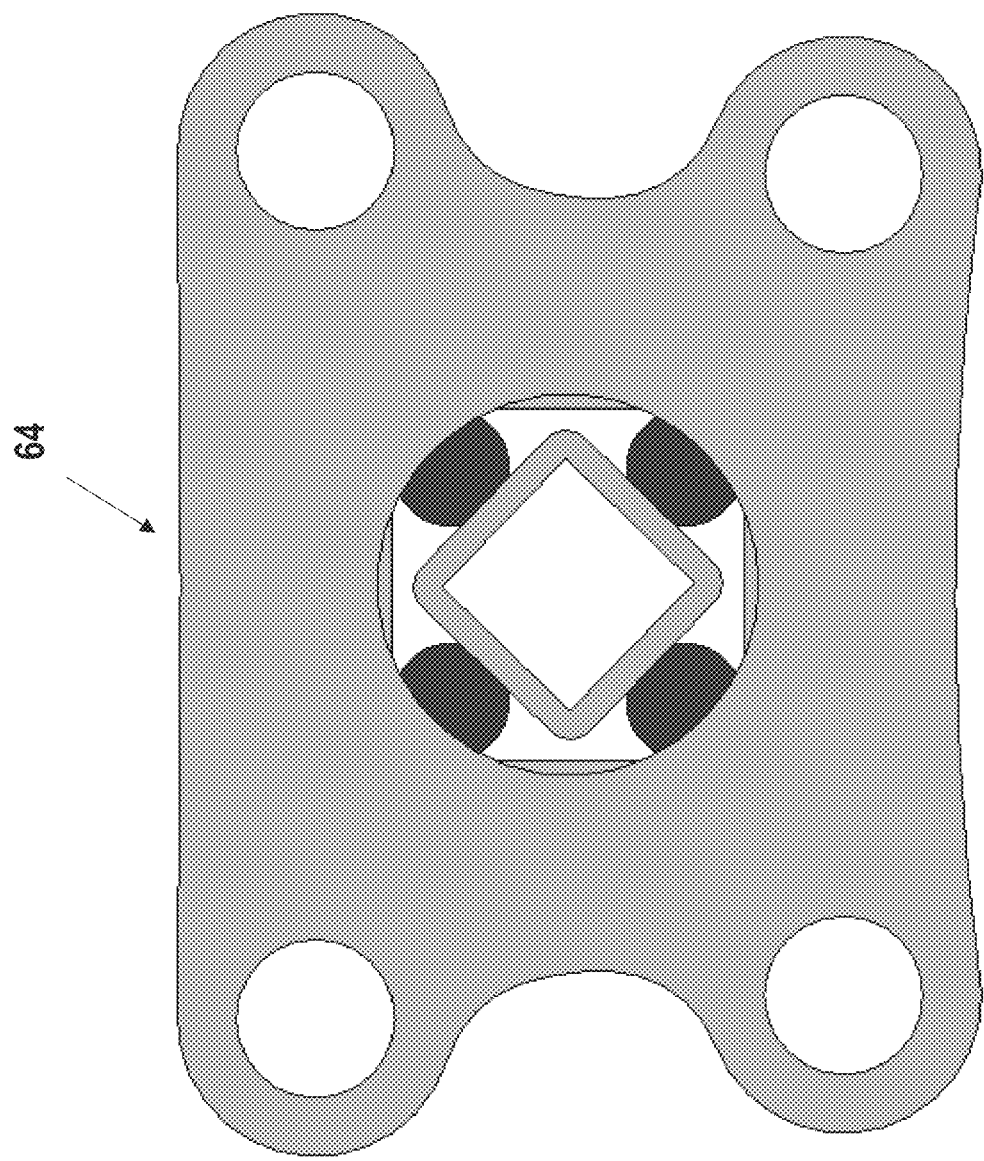
FIG. 20 is a side elevation view of the torsion axle in FIG. 19 in accordance with one embodiment.
Figure 21:
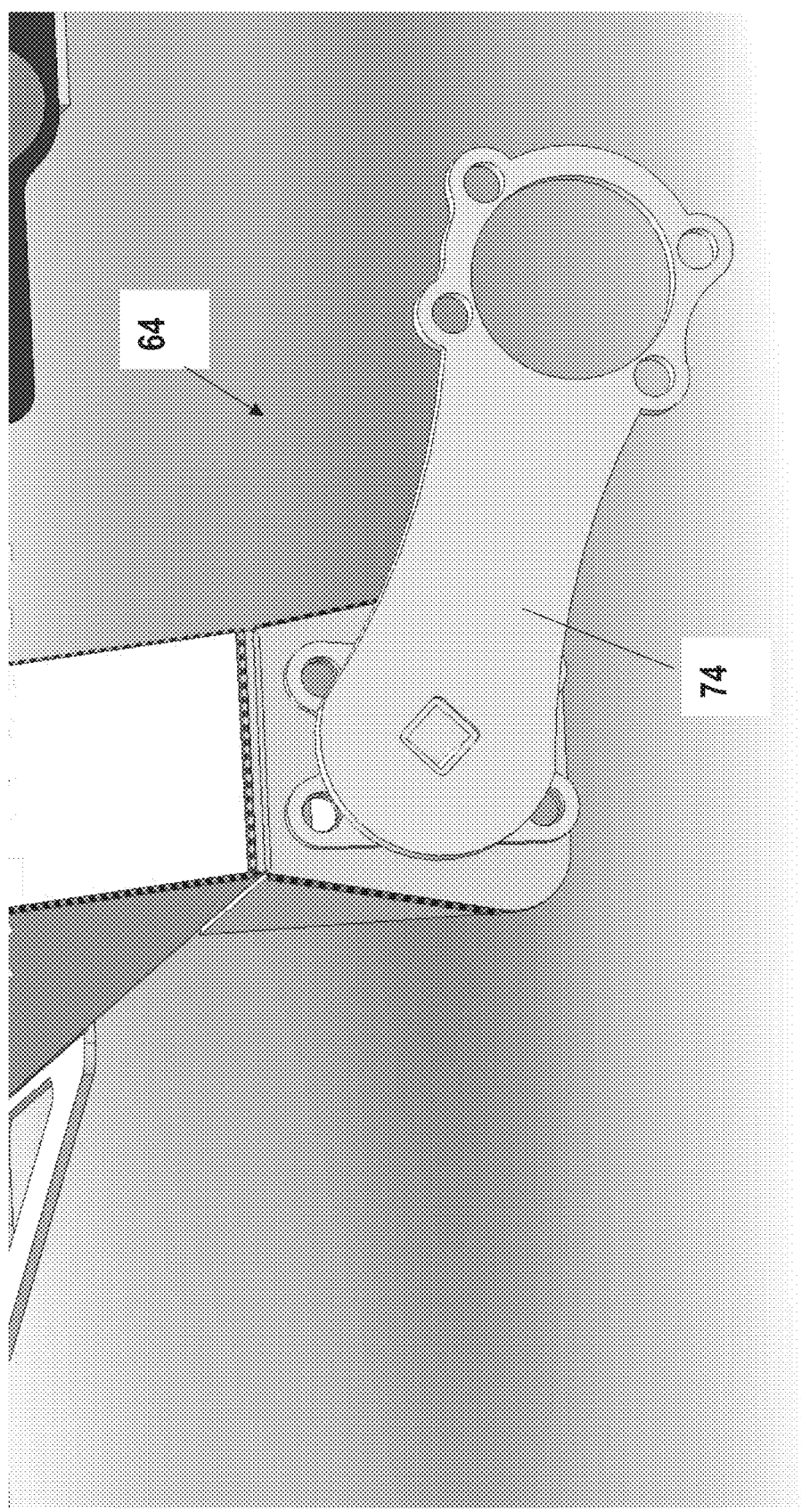
FIG. 21 is a further perspective view of the torsion axle in FIG. 19 in accordance with one embodiment.
Figure 22:
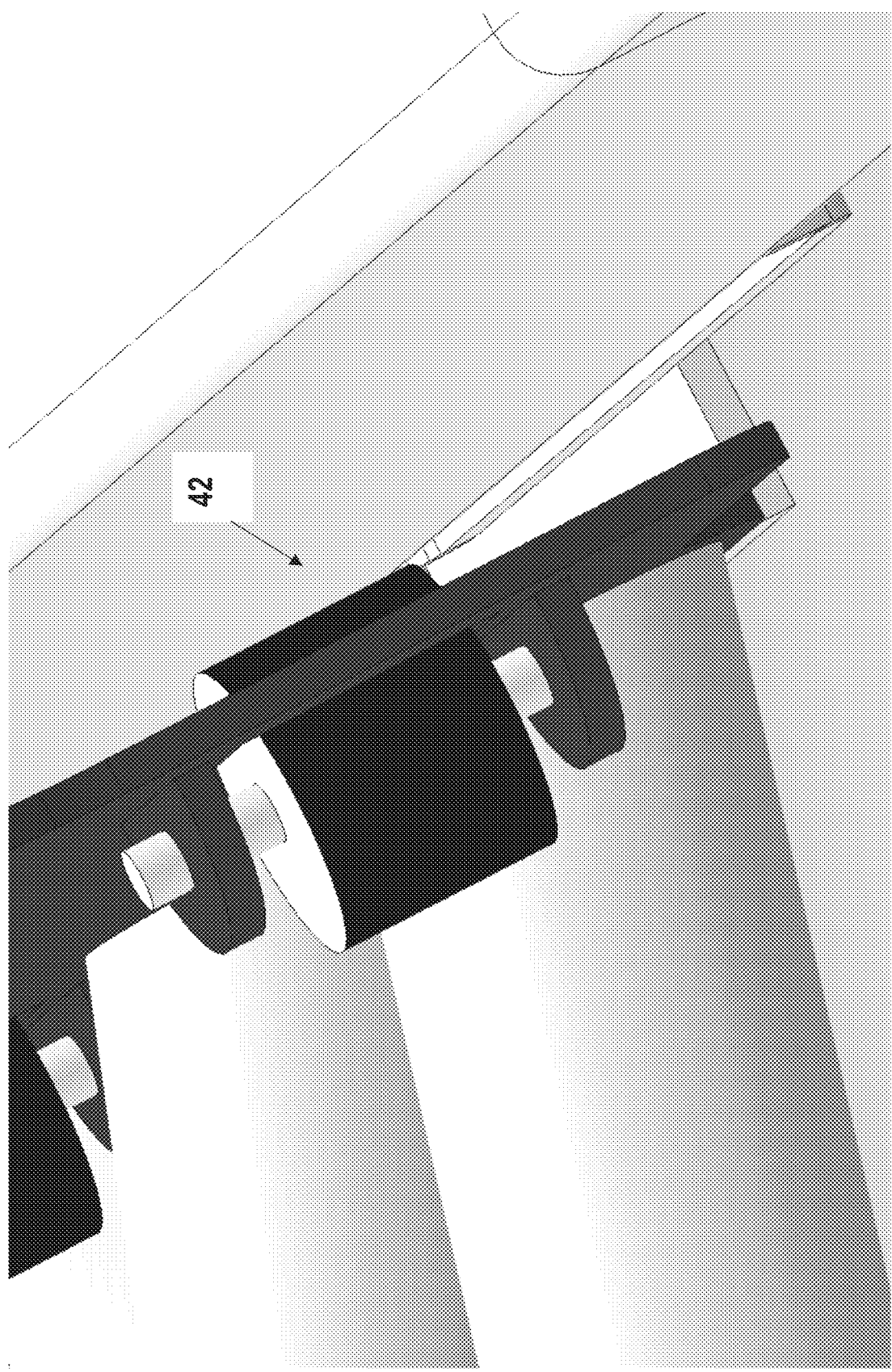
FIG. 22 is a perspective view of a side roller in accordance with one embodiment.
Figure 23:
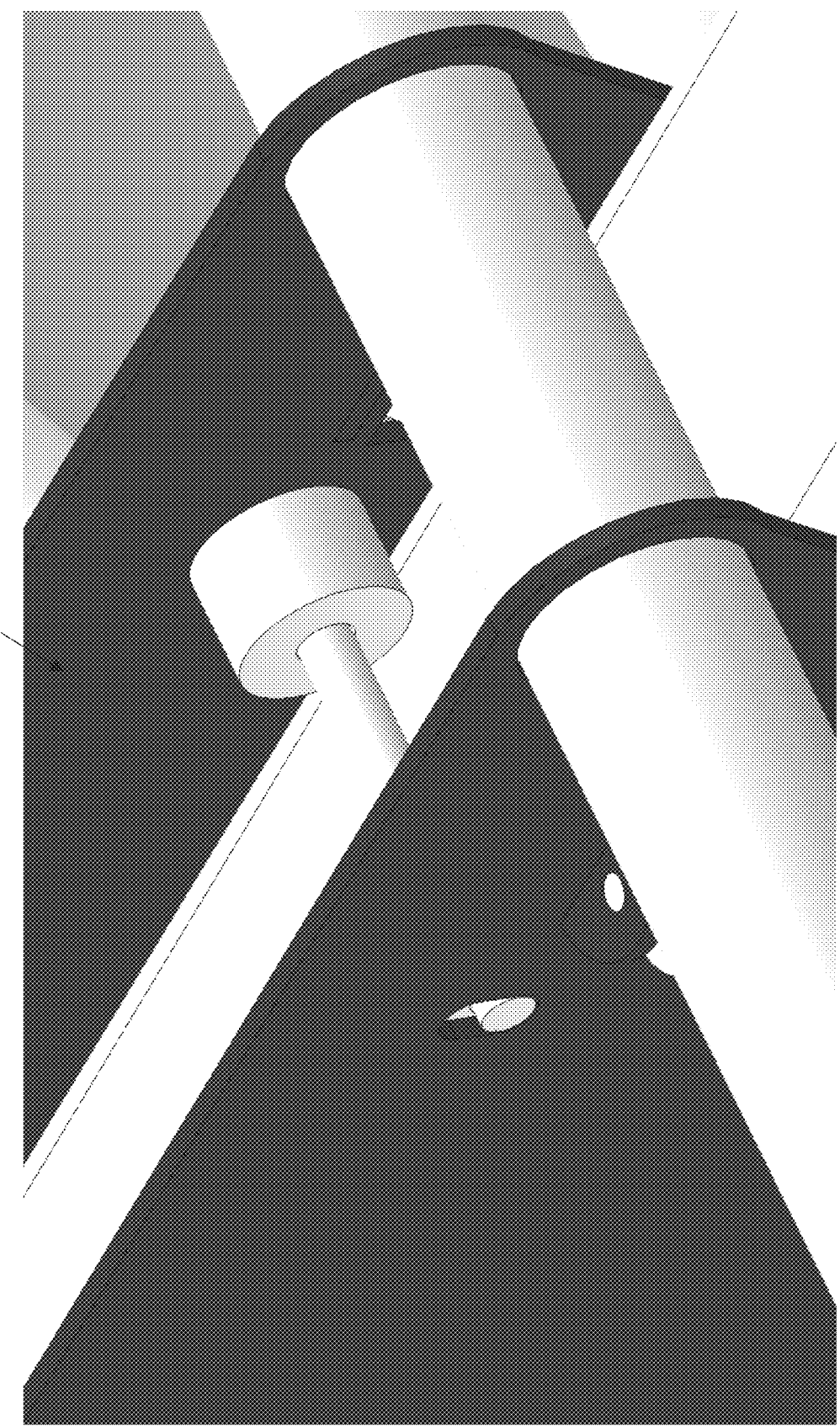
FIG. 23 is a perspective view of a top roller in accordance with one embodiment.
Figure 24:
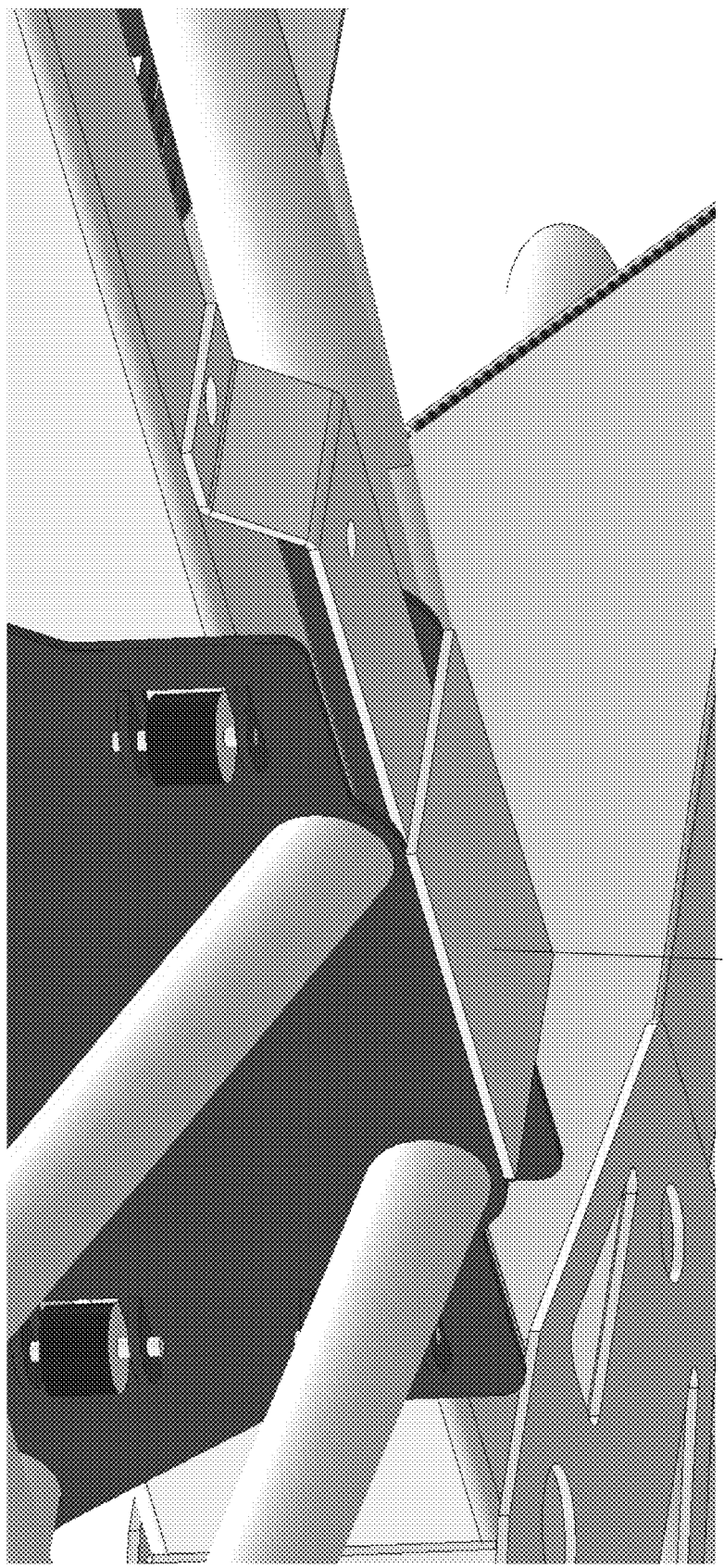
FIG. 24 is a perspective view of a bottom plate in accordance with one embodiment.
Figure 25:
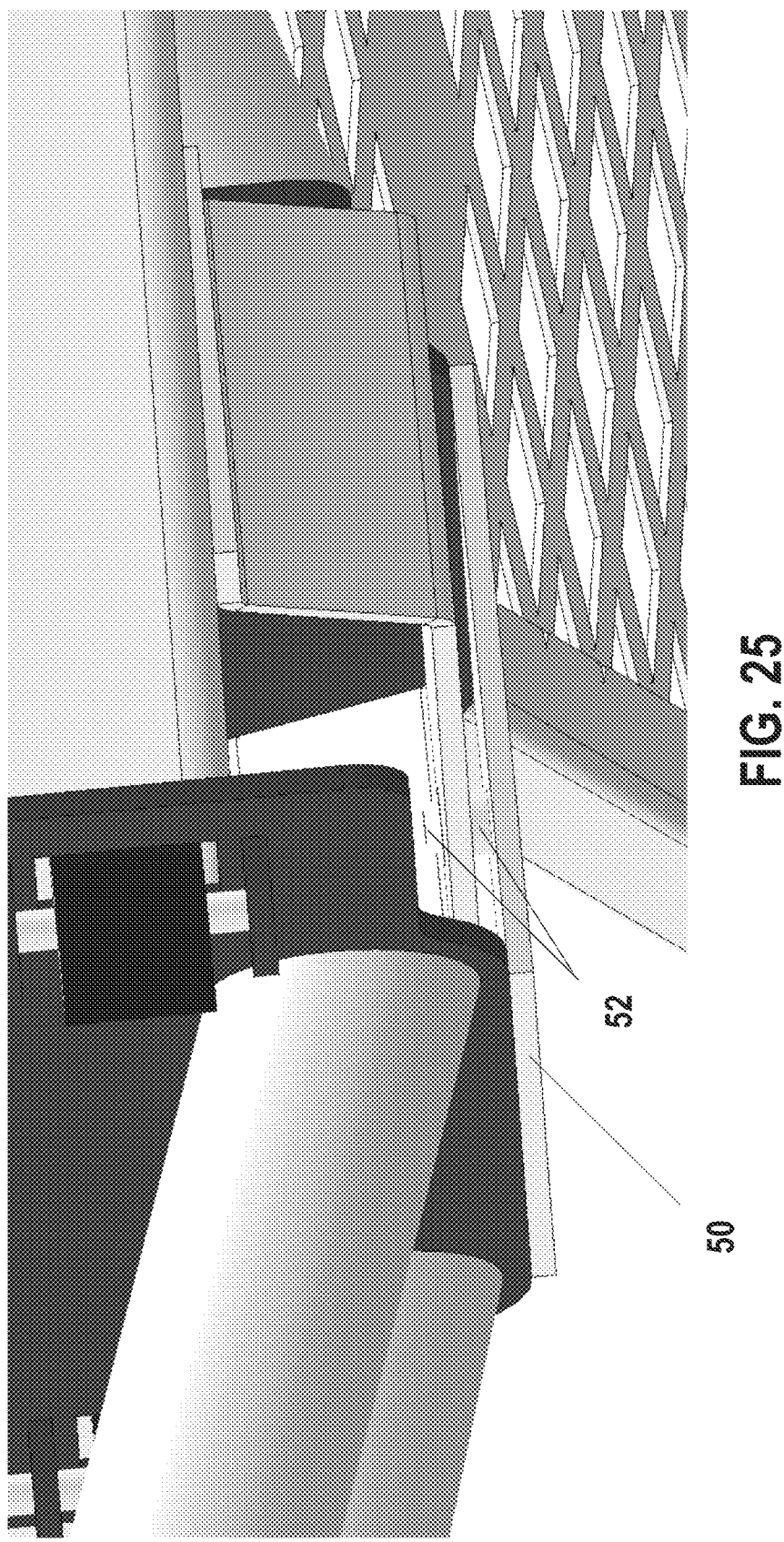
FIG. 25 is a further perspective view of the bottom plate in FIG. 24 and a detent in accordance with one embodiment.
Figure 27A:
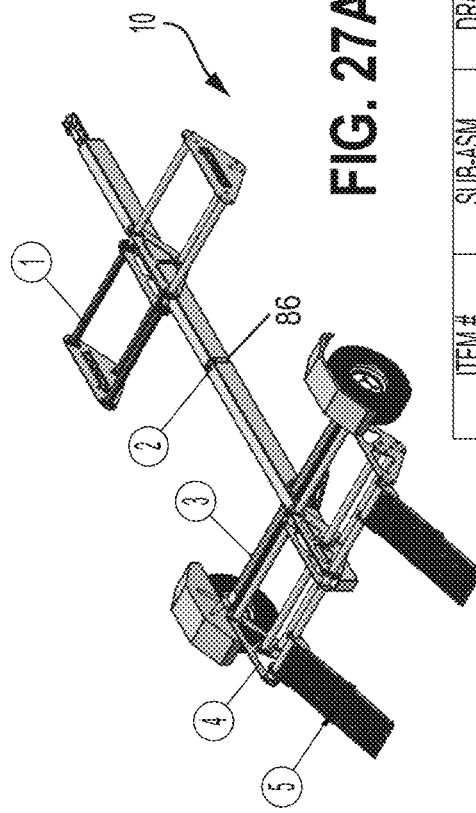
FIGS. 27A-27C are various views of a trailer system in accordance with one embodiment.
Figure 27B:
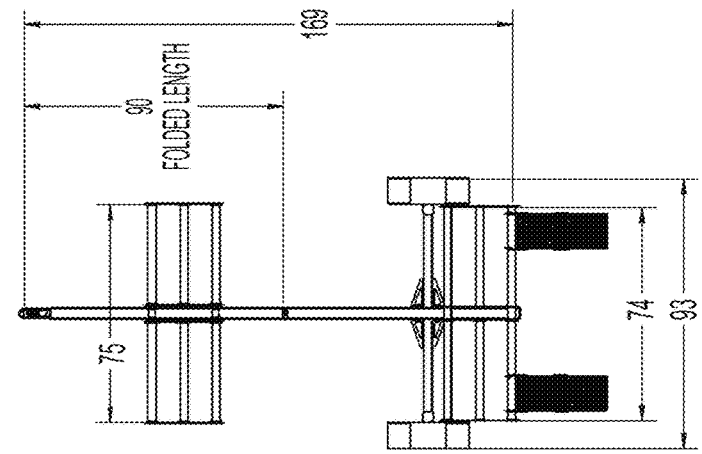
Figure 27C:
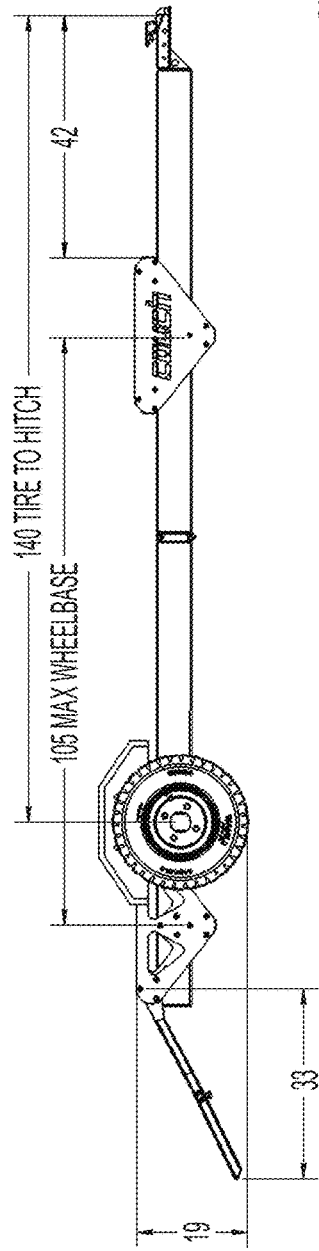
Figure 28:
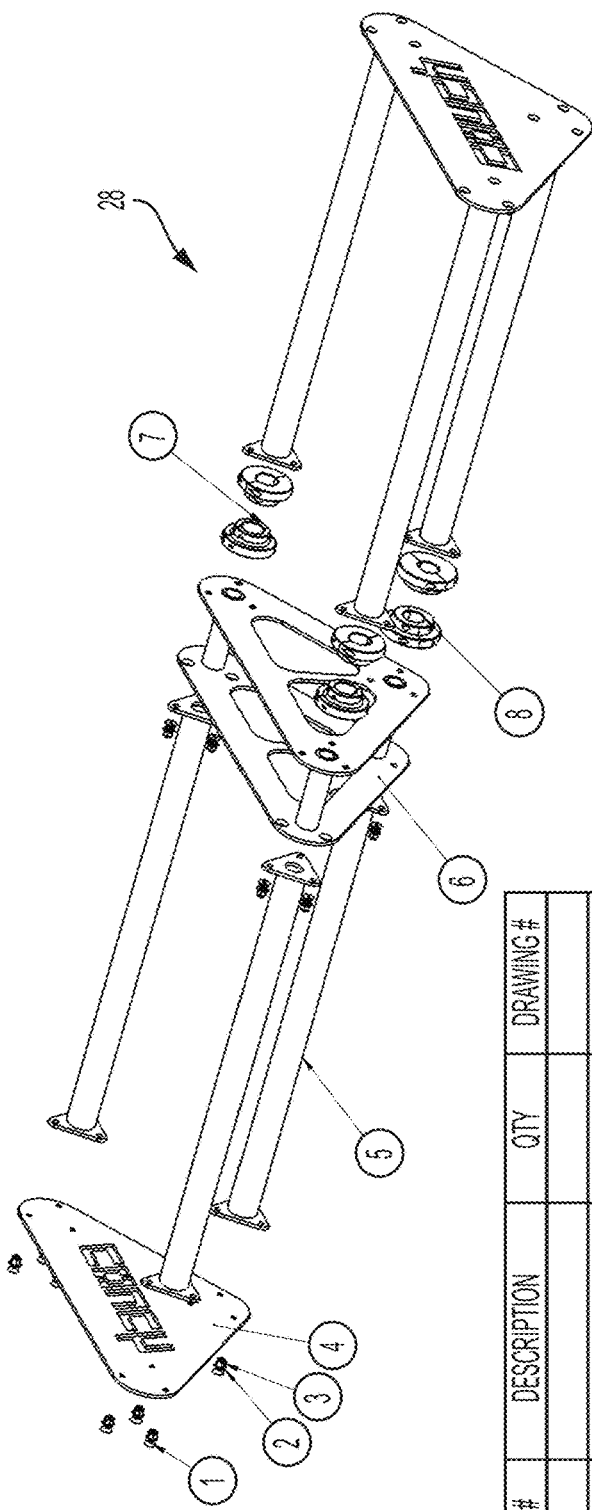
FIG. 28 is a perspective view of a front basket in accordance with one embodiment.
Figure 29A:
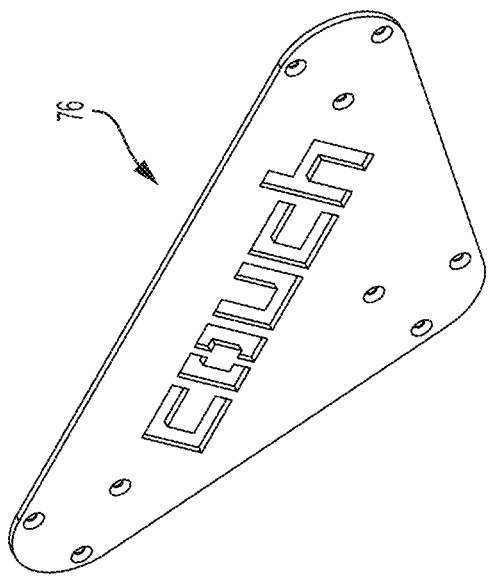
FIGS. 29A and 29B are various views of a front end plate in accordance with one embodiment.
Figure 29B:
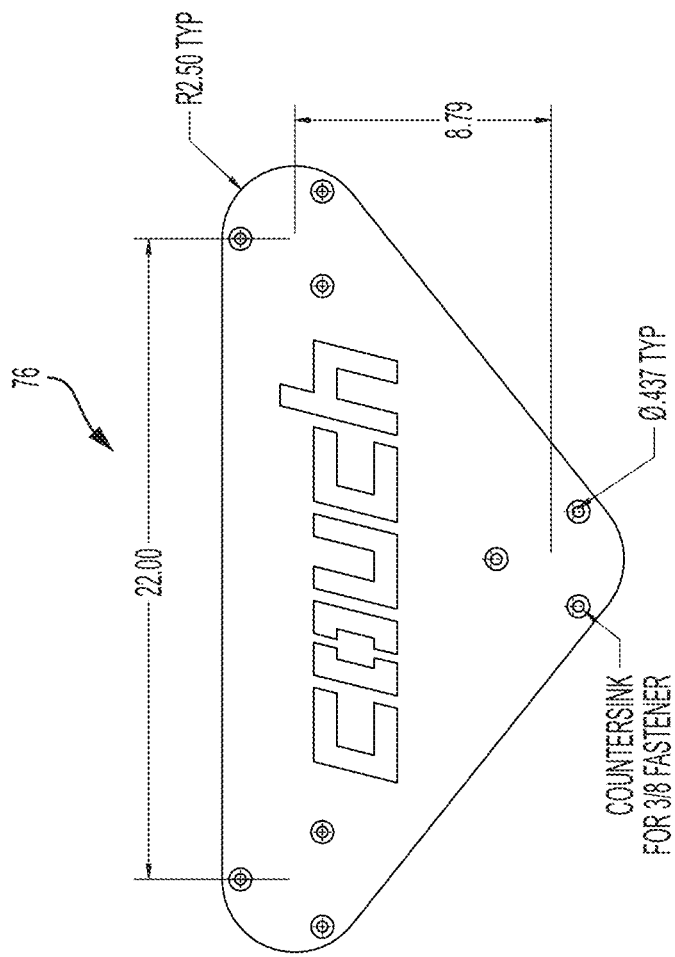
Figure 30A:
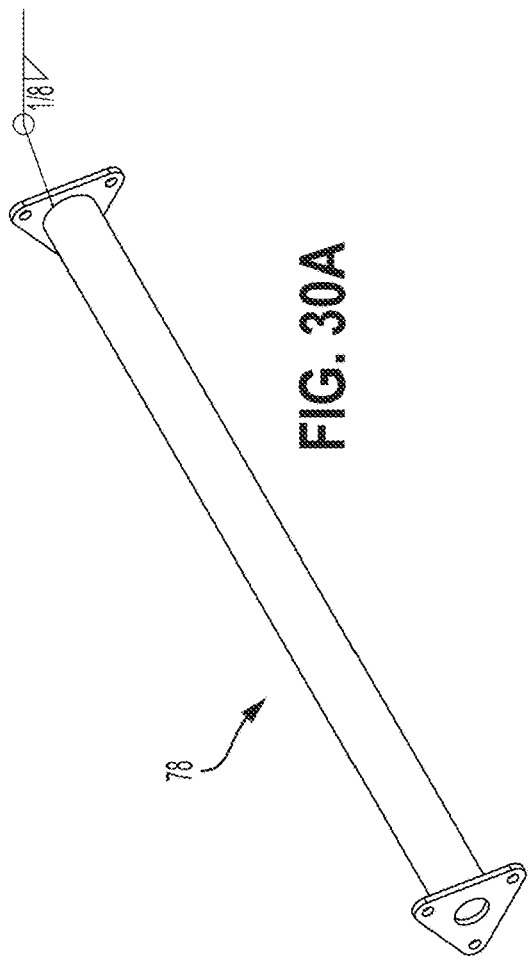
FIGS. 30A-30C are various views of a front tube in accordance with one embodiment.
Figure 30B:
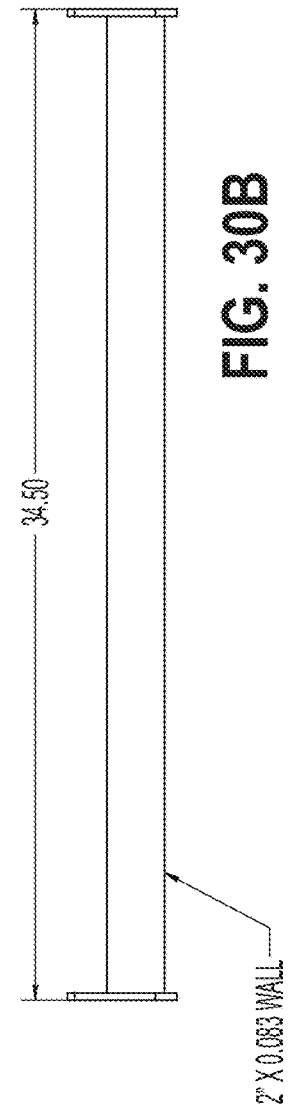
Figure 30C:
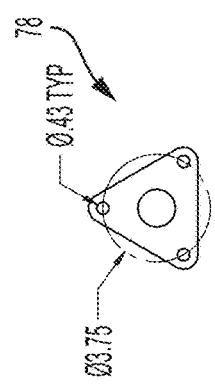
Figure 31A:
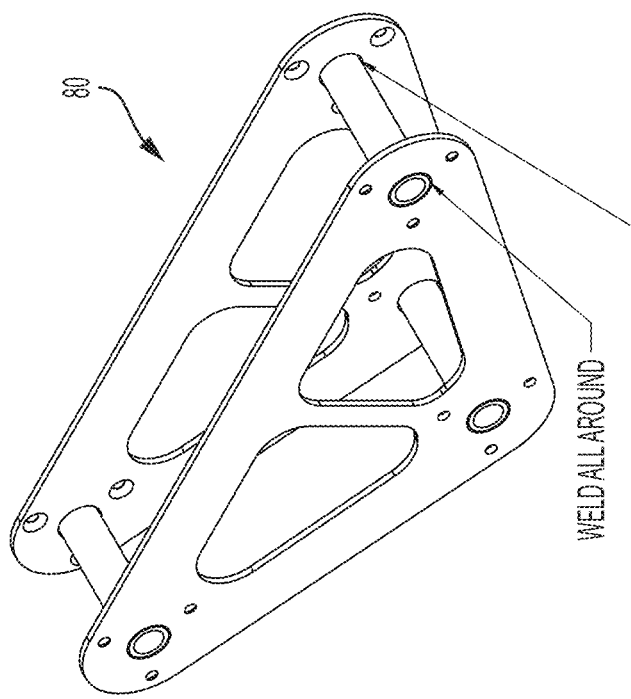
FIGS. 31A-31C are various views of a front center portion in accordance with one embodiment.
Figure 31B:
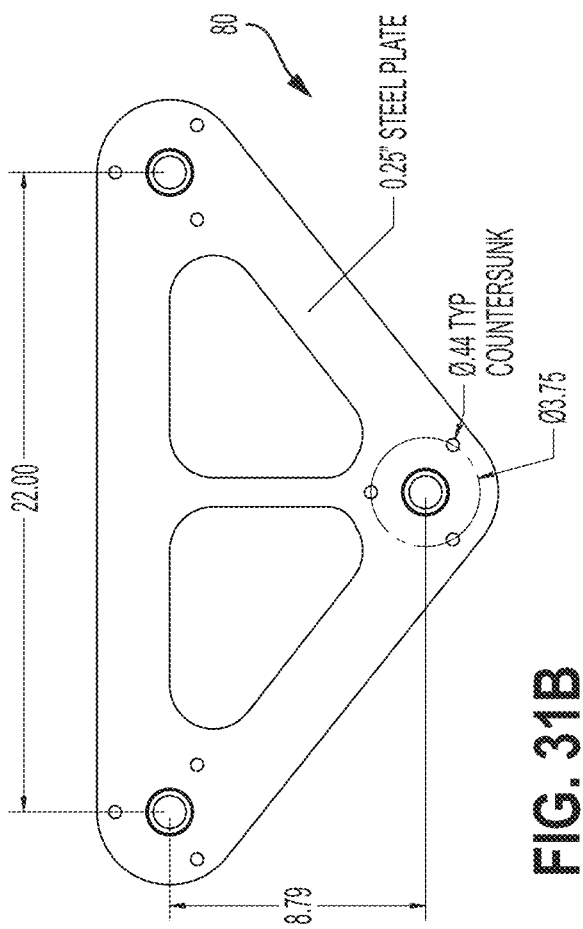
Figure 31C:
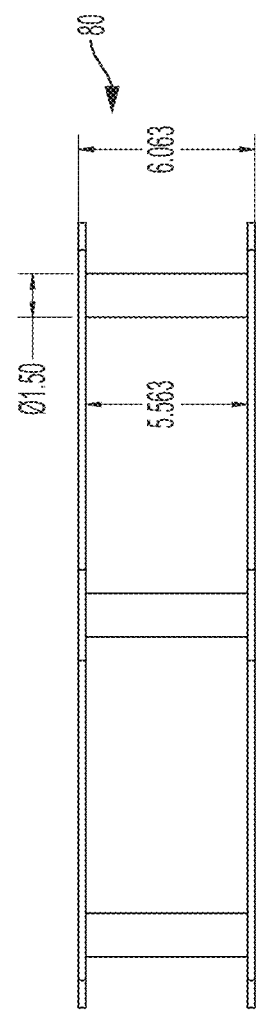
Figure 32A:
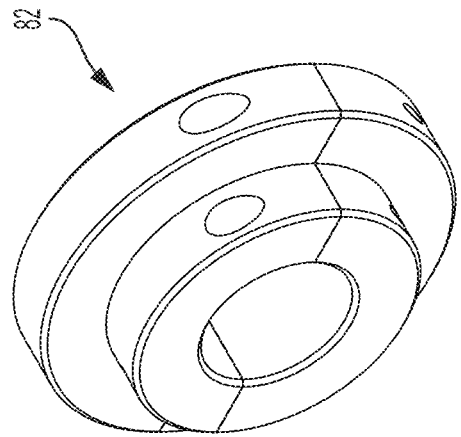
FIGS. 32A-32D are various views of a front bottom roller in accordance with one embodiment.
Figure 32B:
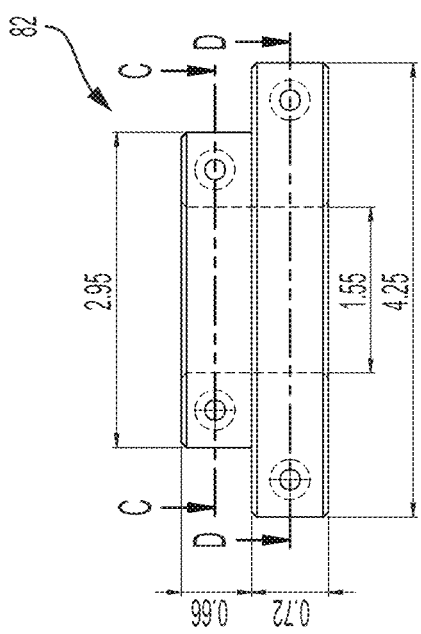
Figure 32C:
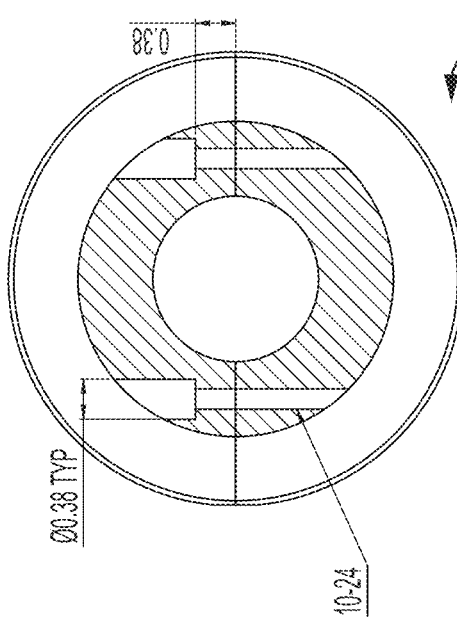
Figure 32D:
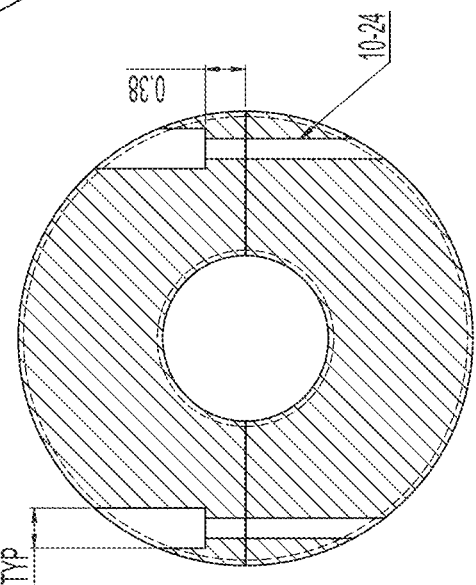
Figure 33A:
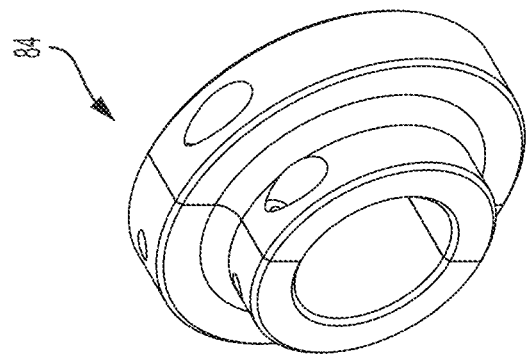
FIGS. 33A-33D are various views of a front top roller in accordance with one embodiment.
Figure 33D:
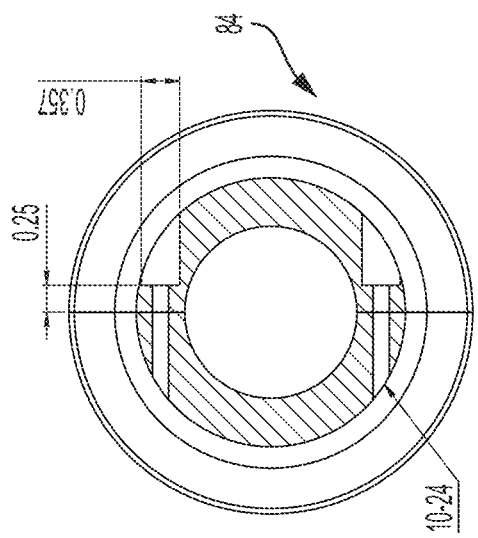
Figure 33B:
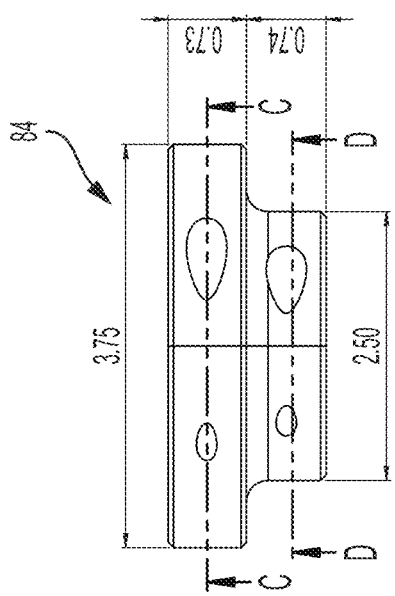
Figure 33C:
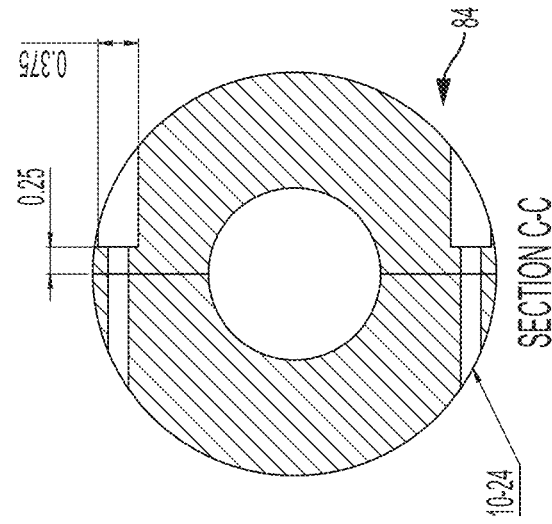
Figure 34:
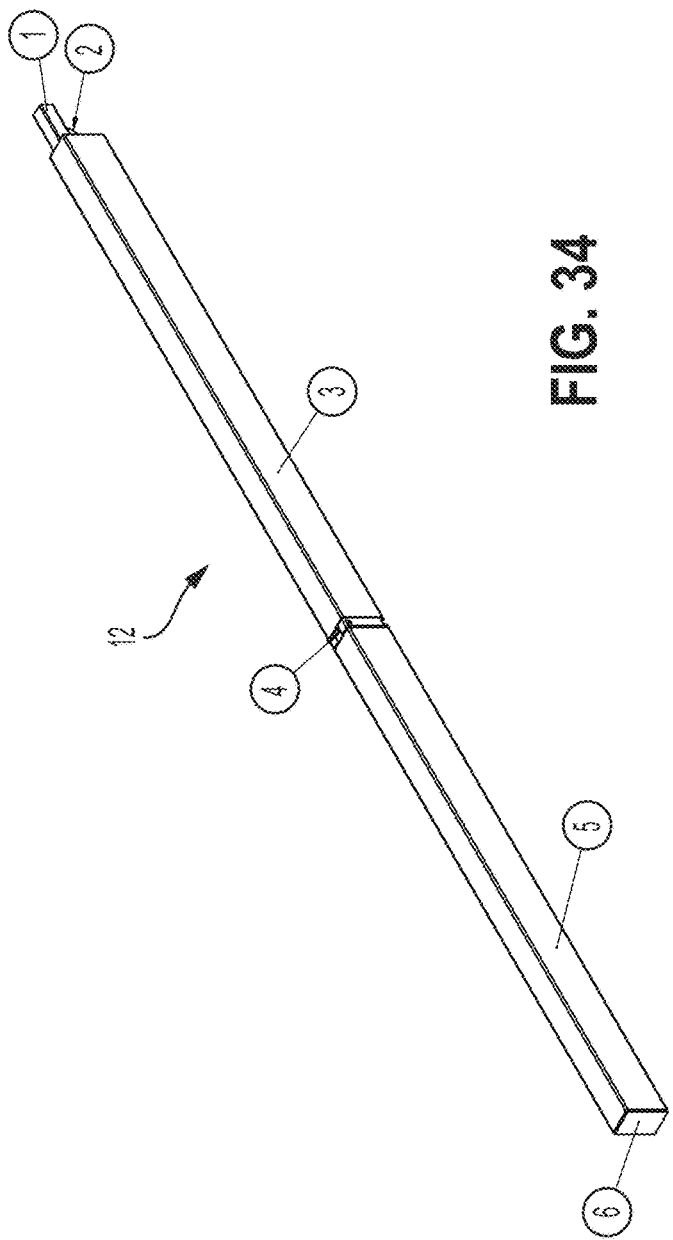
FIG. 34 is a perspective view of a center rail in accordance with one embodiment.
Figure 37:
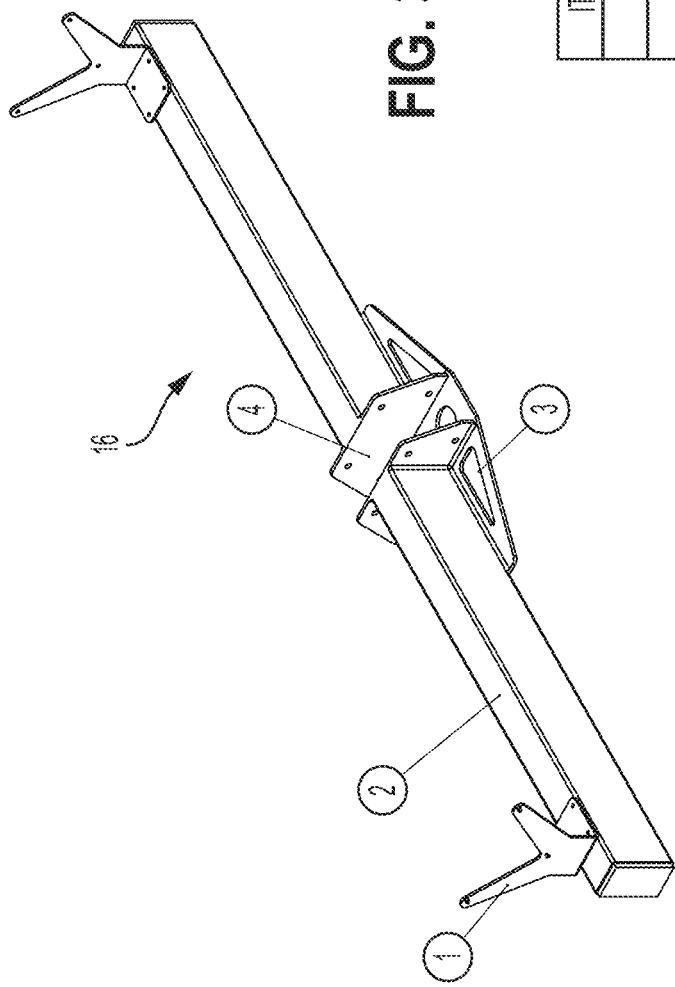
FIG. 37 is a perspective view of an axle in accordance with one embodiment.
Figure 38A:
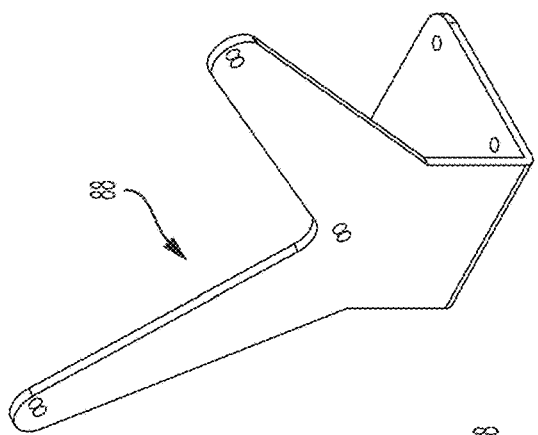
FIGS. 38A-38D are various views of an axle bracket in accordance with one embodiment.
Figure 38B:
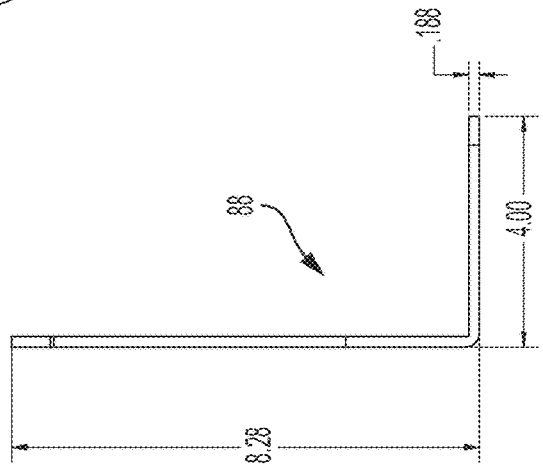
Figure 38C:
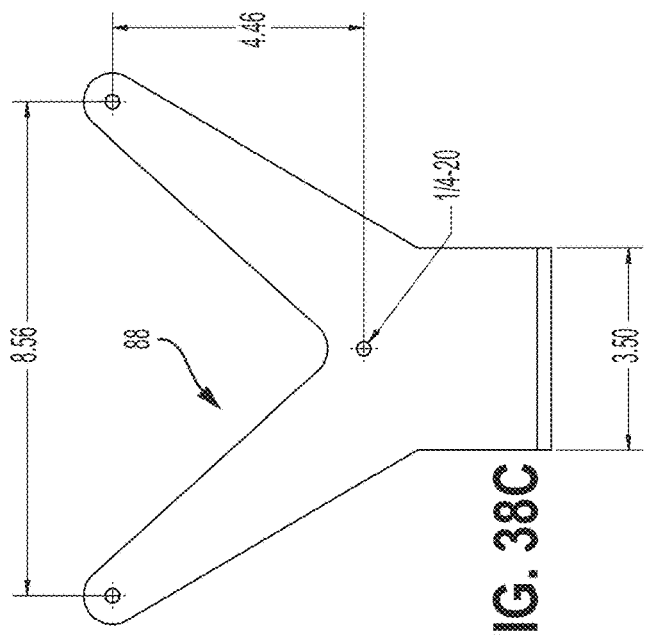
Figure 38D:
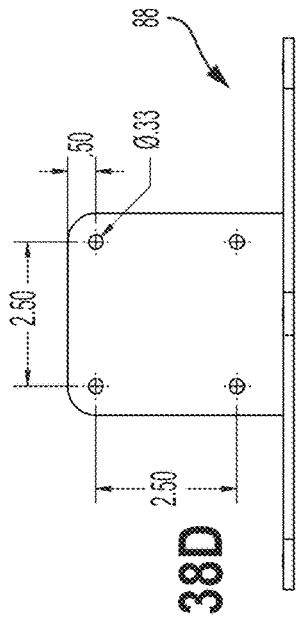
Figure 40:
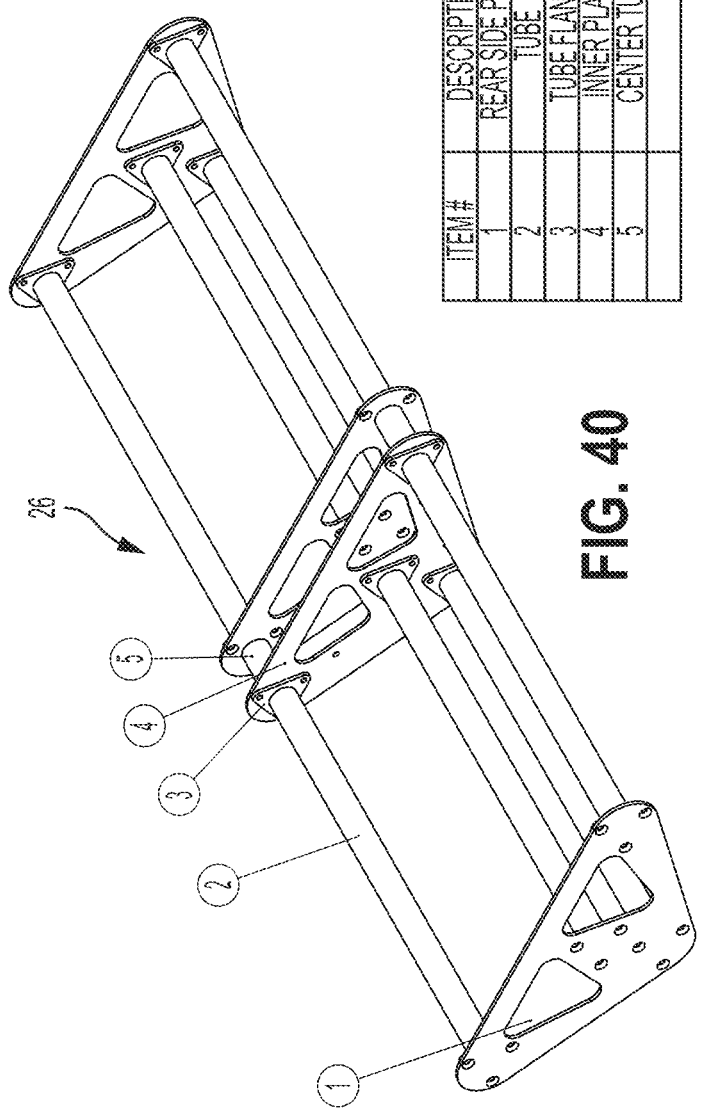
FIG. 40 is a perspective view of a rear basket in accordance with one embodiment.
Figure 43:
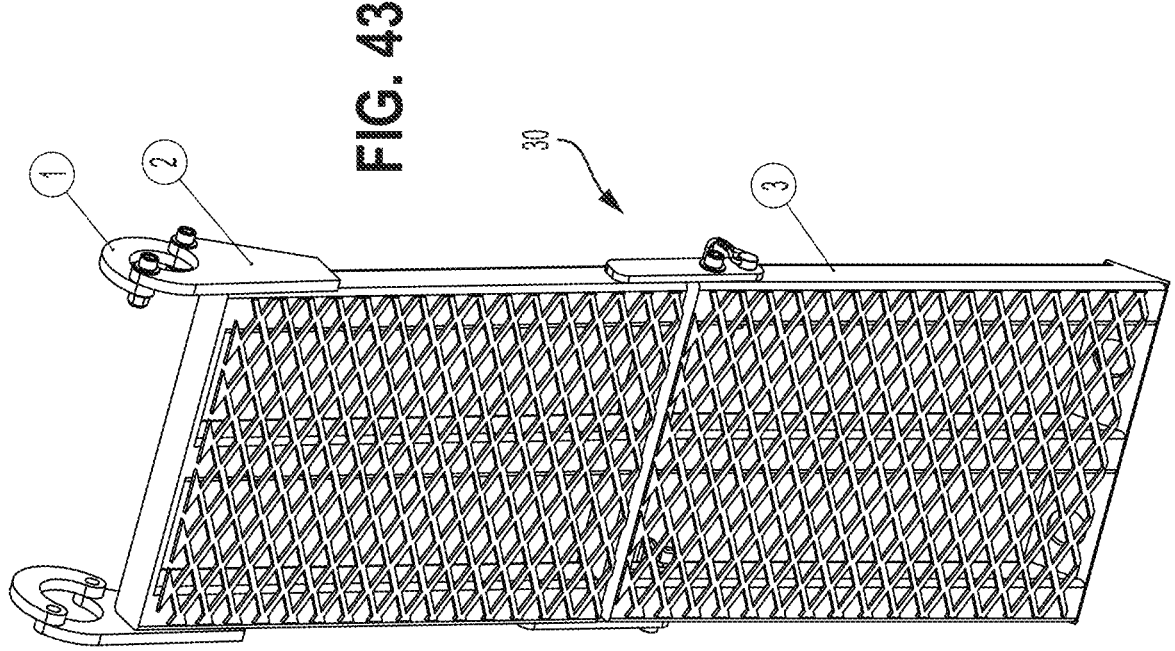
FIG. 43 is a perspective view of a ramp in accordance with one embodiment.
Figure 44A:
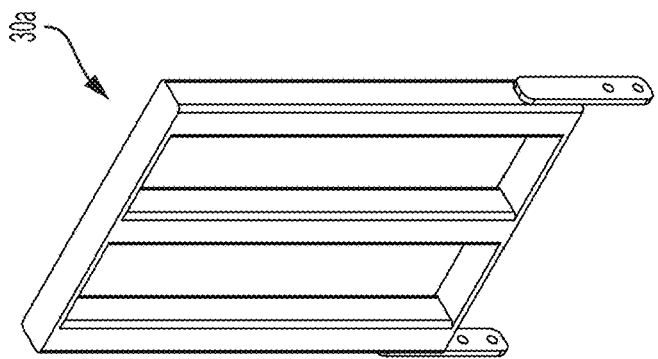
FIGS. 44A-44C are various views of a first ramp portion in accordance with one embodiment.
Figure 44B:
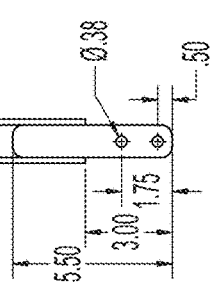
Figure 44C:
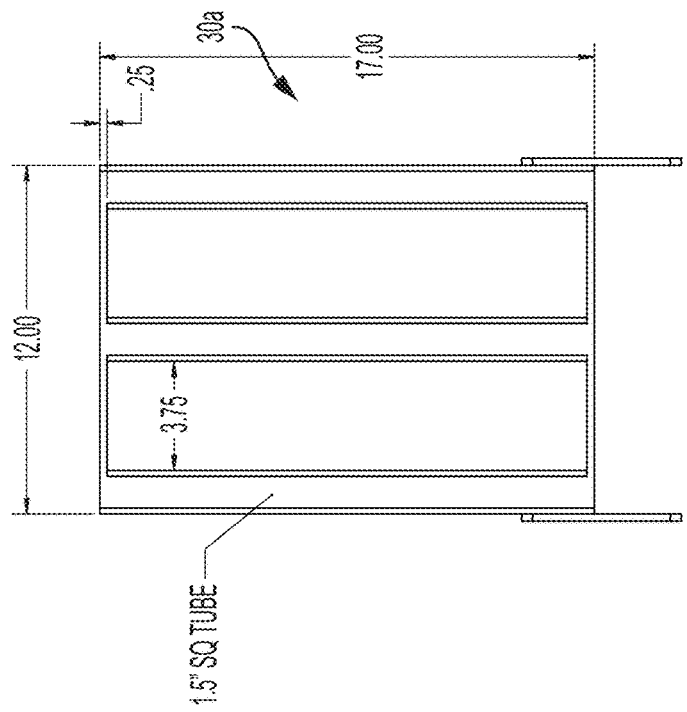
Figure 45A:
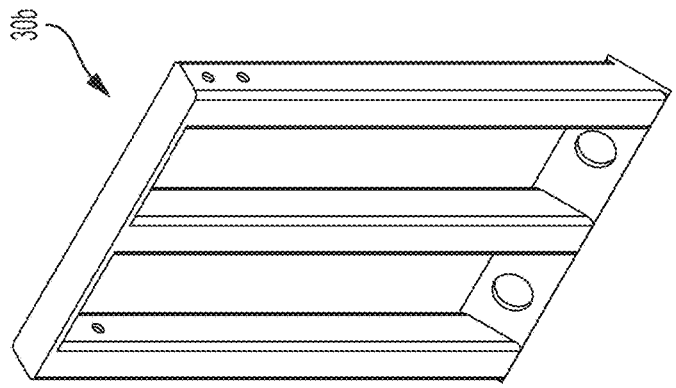
FIGS. 45A-45C are various views of a second ramp portion in accordance with one embodiment.
Figure 45B:
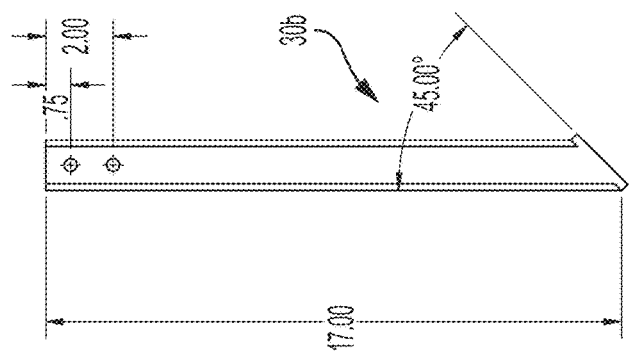
Figure 45C:
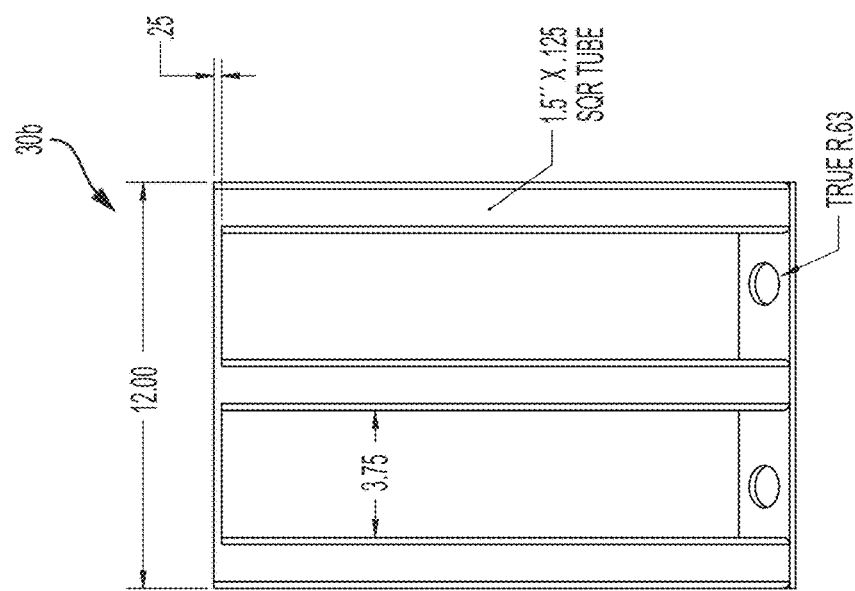
Figure 46:
FIGS. 46-53 show a sequence of loading a vehicle onto a trailer system in accordance with one embodiment.
Figure 47:
Figure 48:
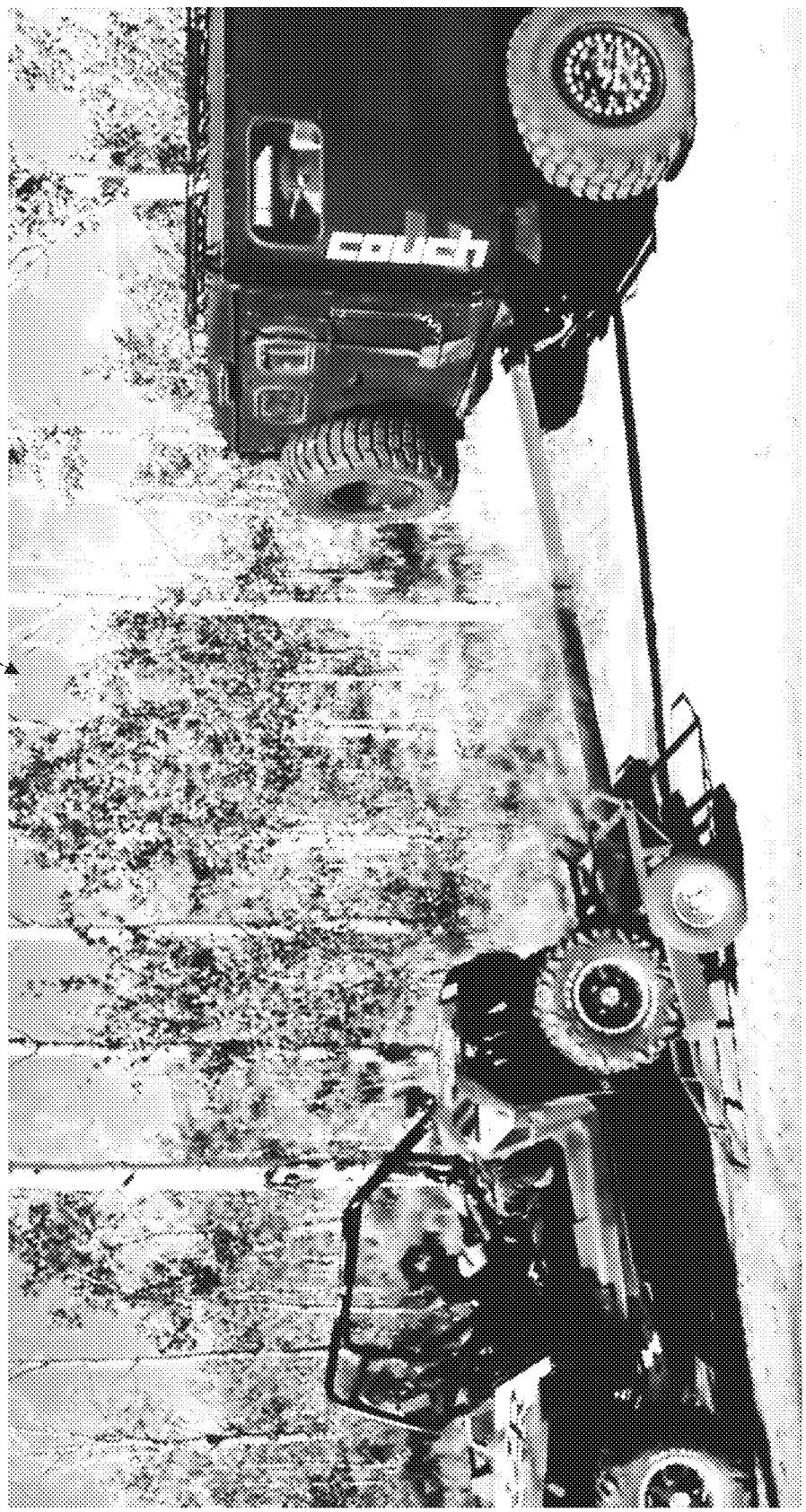
Figure 49:
Figure 50:
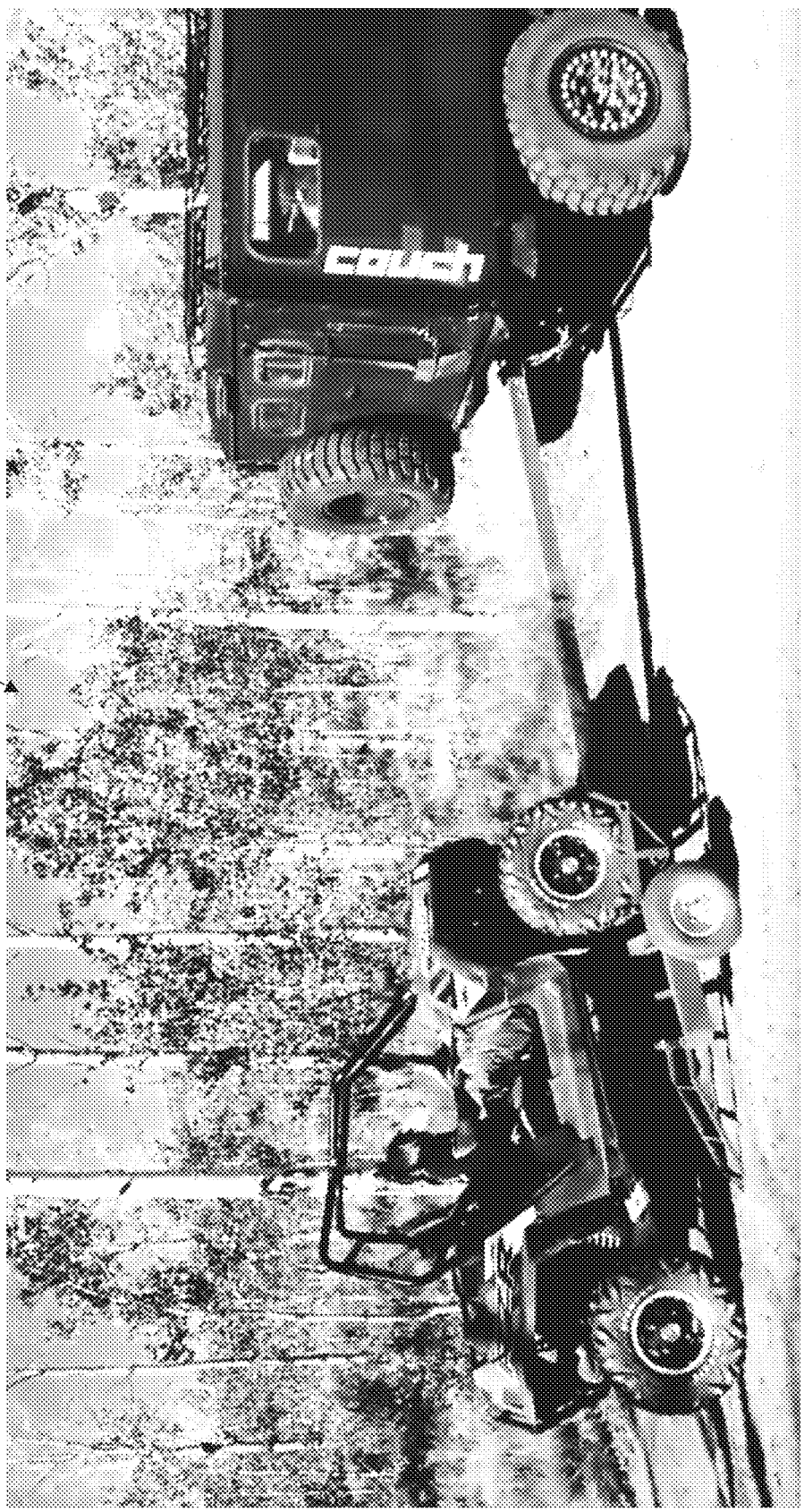
Figure 51:
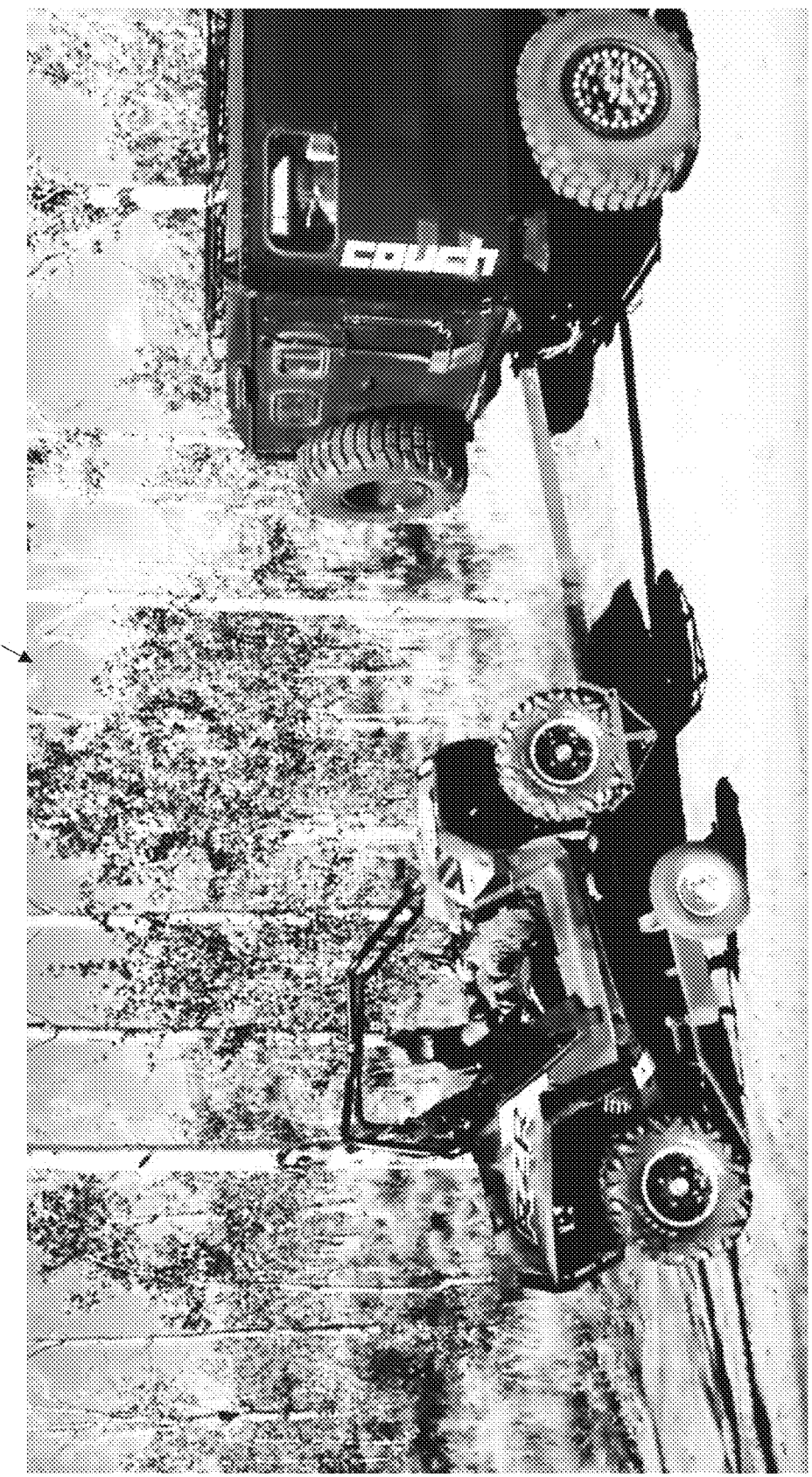
Figure 52:
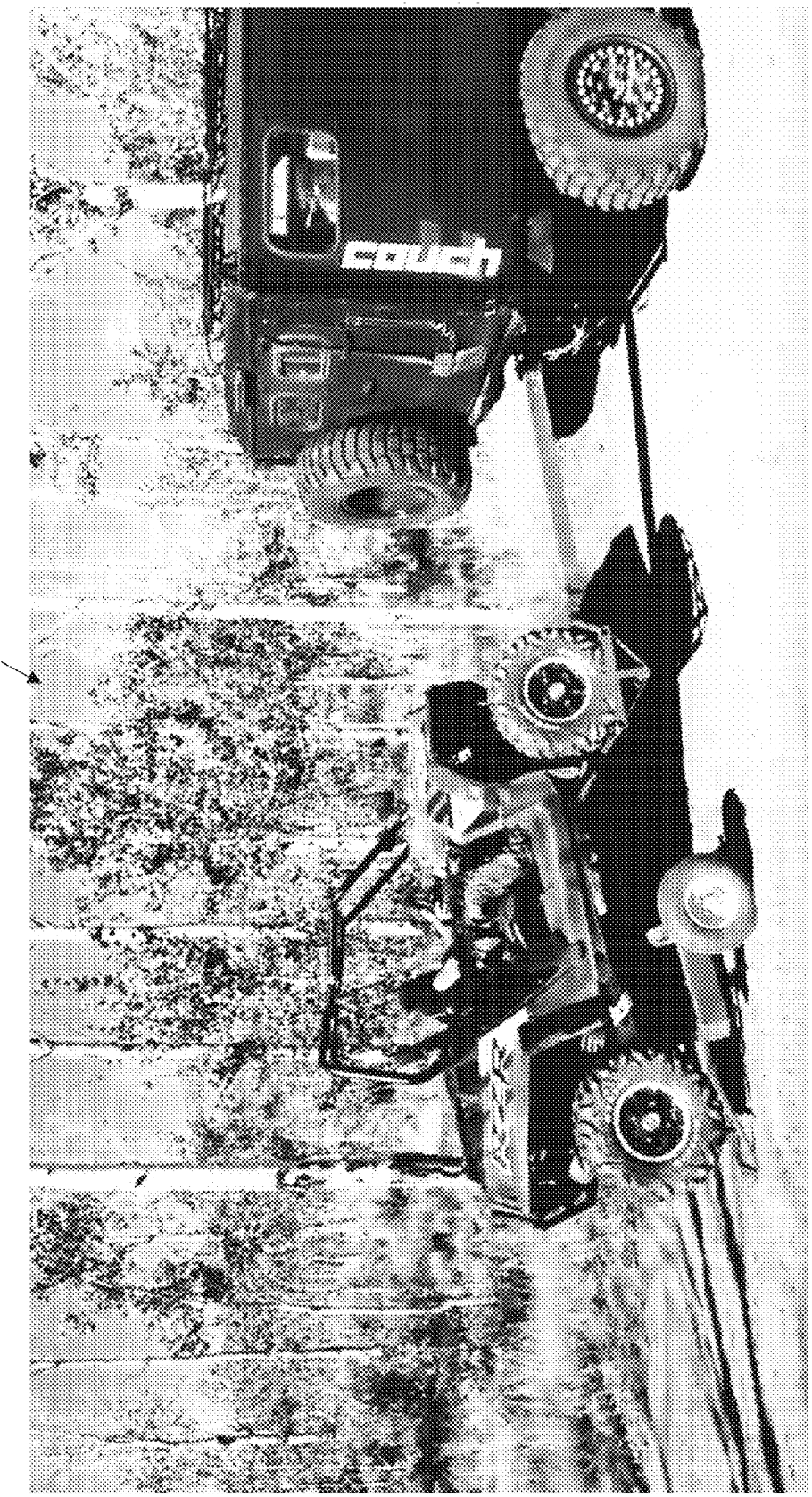
Figure 53:
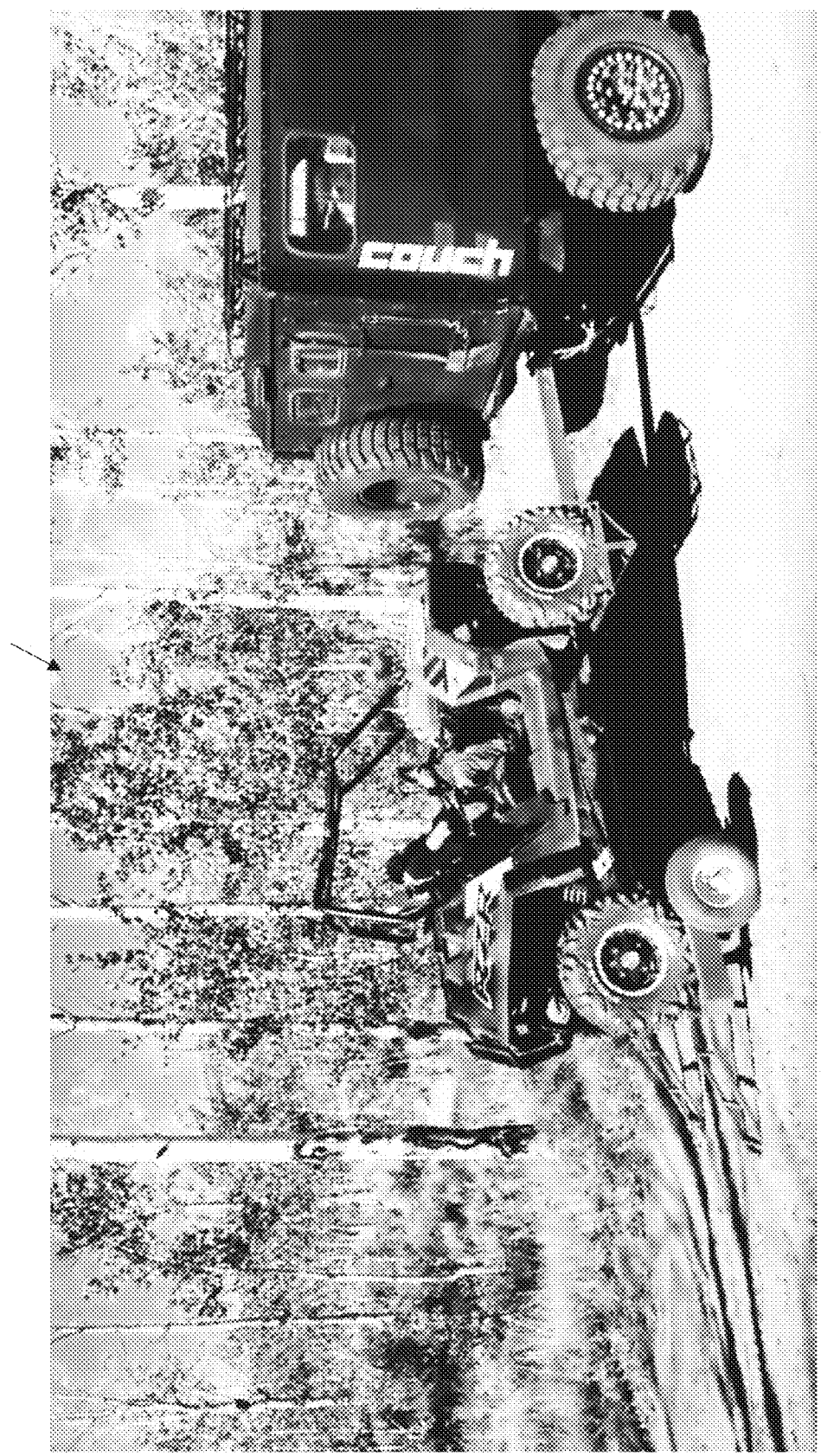
Figure 54:
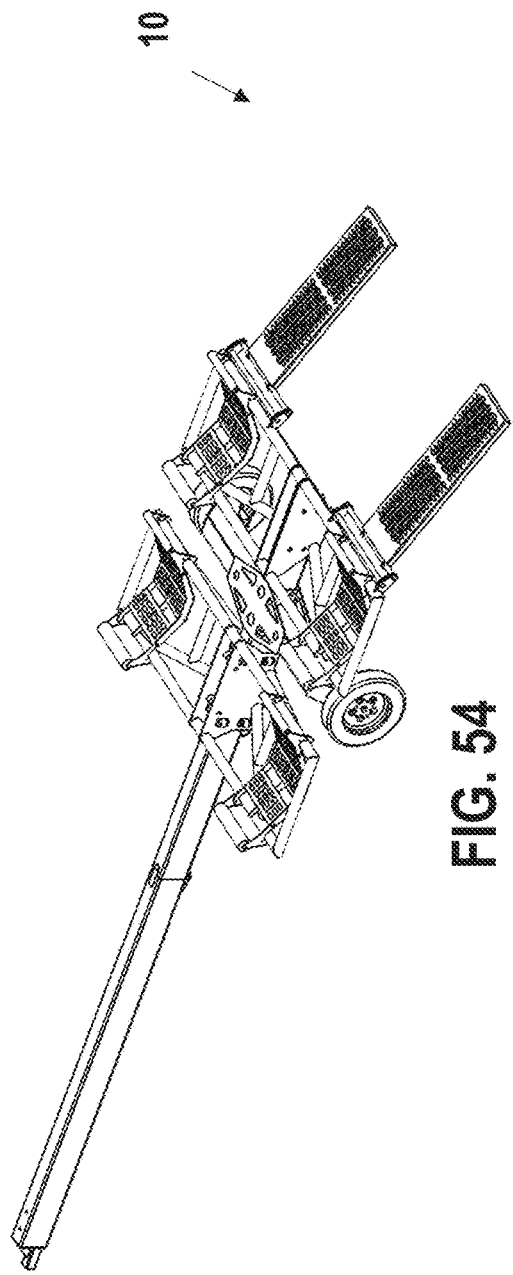
FIG. 54 is a perspective view of a trailer system in accordance with one embodiment.
Figure 55:
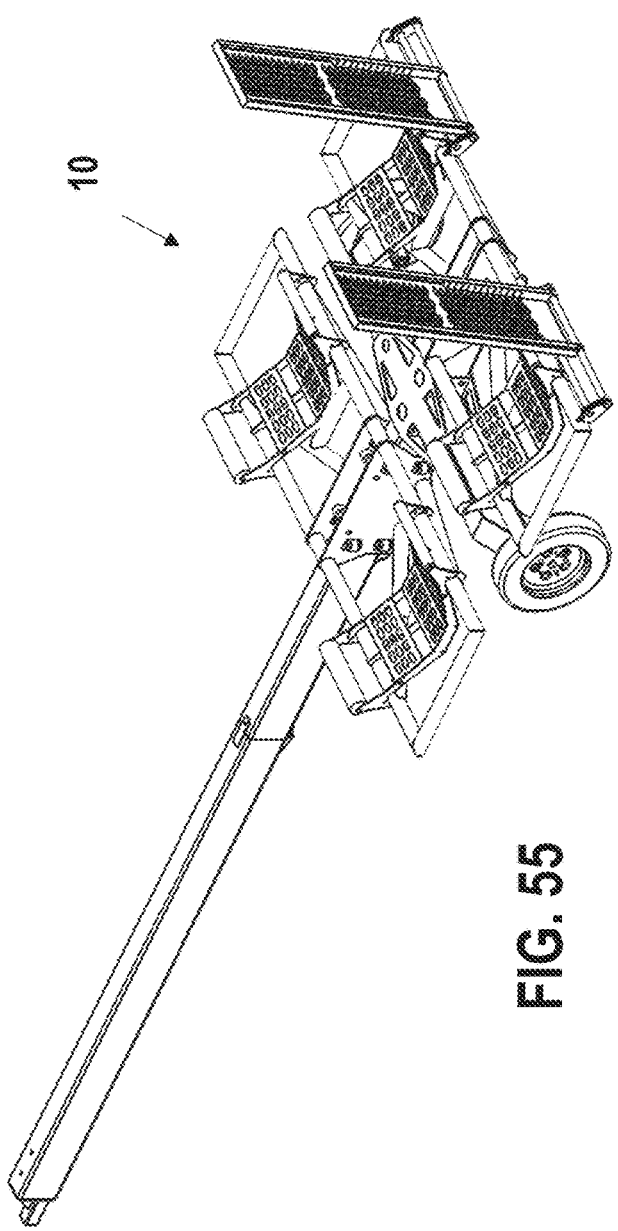
FIG. 55 is a perspective view of the trailer system in FIG. 54 with the ramps lifted in accordance with one embodiment.
Figure 61:
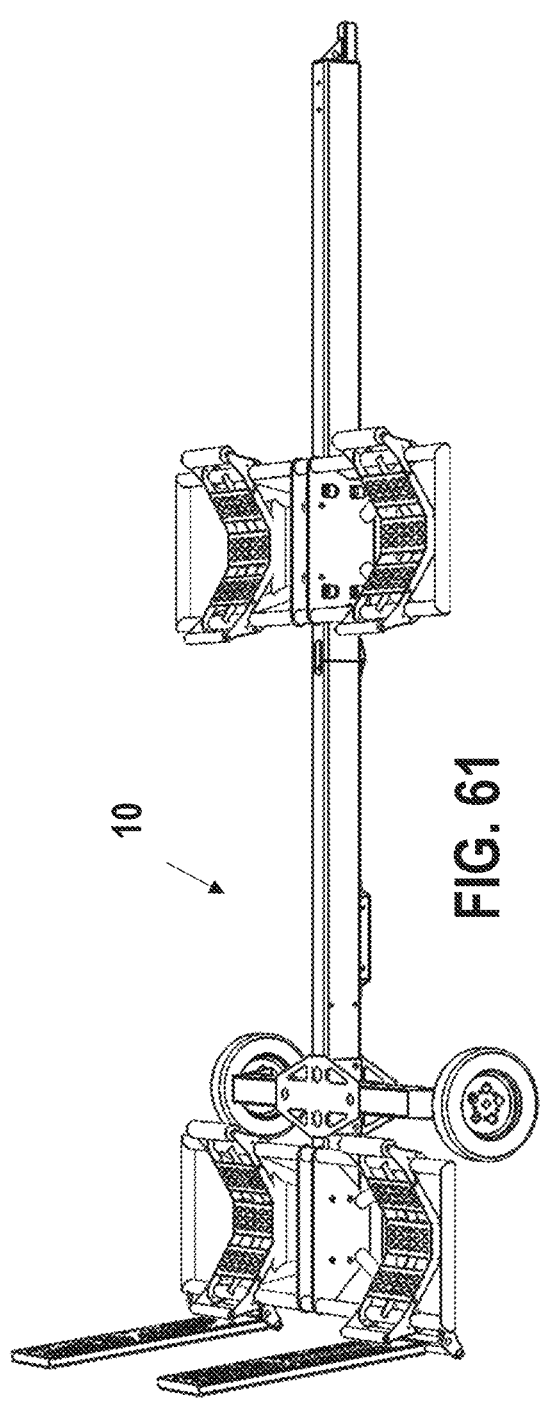
FIGS. 61-62 are further perspective views of the trailer system in FIG. 60 in accordance with one embodiment.
Figure 62:
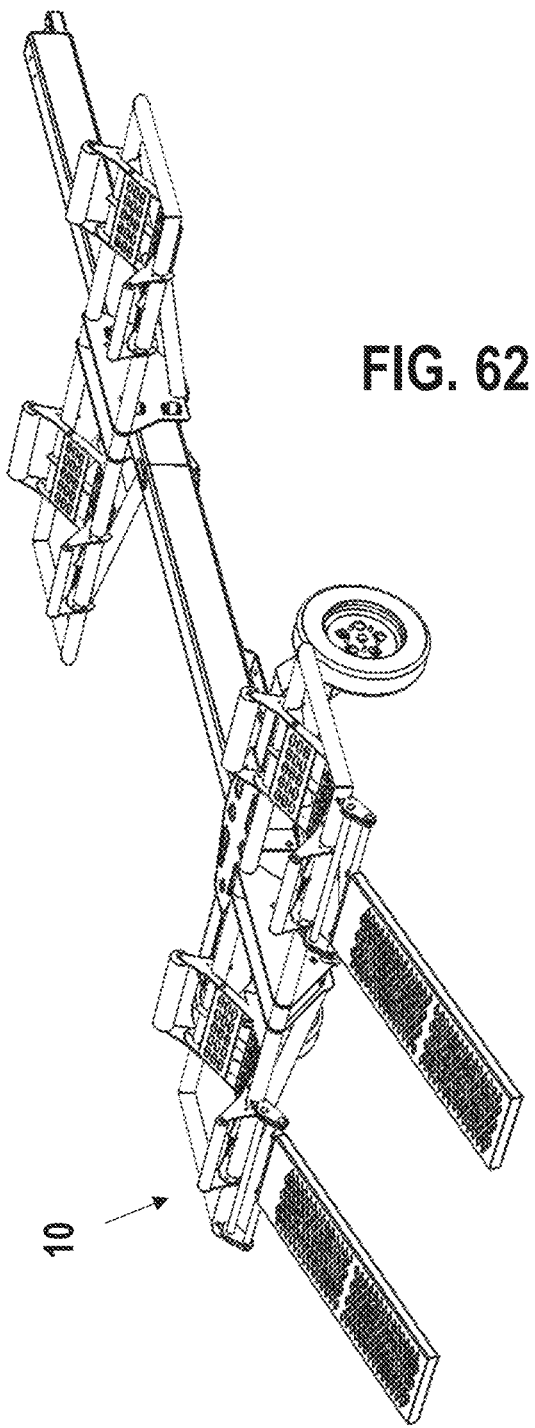
Figure 64:
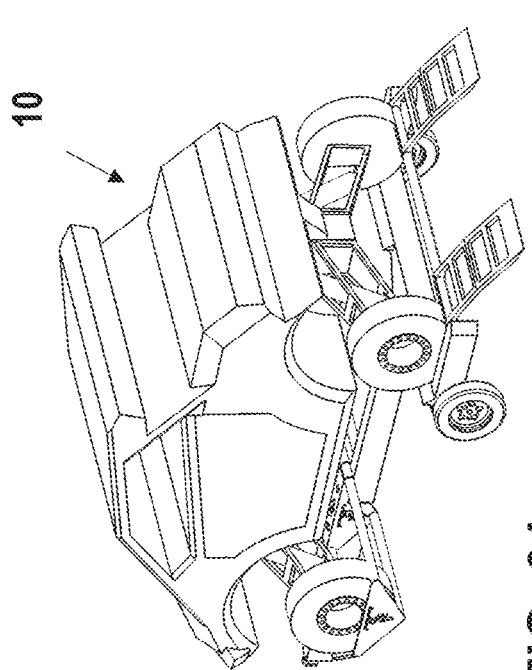
FIG. 64 is a perspective view of the vehicle and trailer system in FIG. 63 in accordance with one embodiment.
Figure 66:
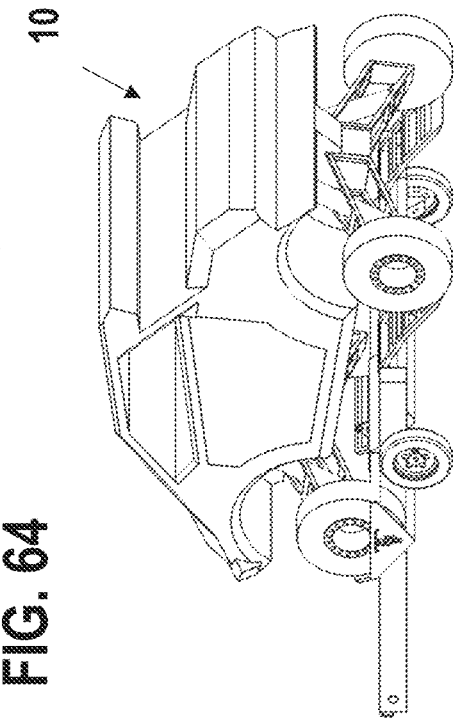
FIG. 66 is a perspective view of the vehicle and trailer system of FIG. 65 in accordance with one embodiment.
Figure 63:
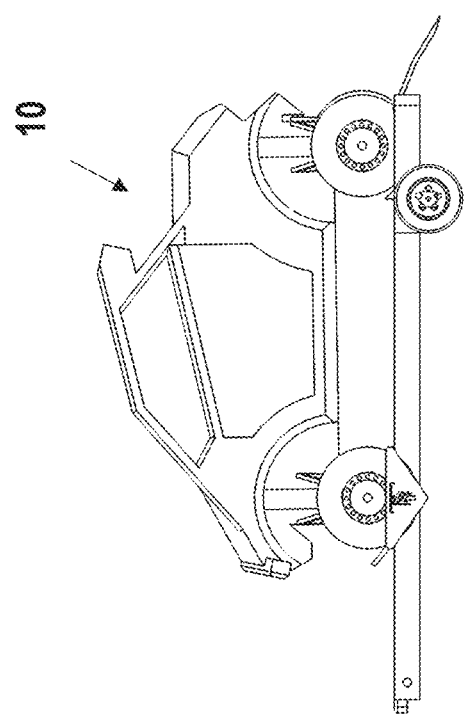
FIG. 63 is a side elevation view of a vehicle loaded onto a trailer system in accordance with one embodiment.
Figure 65:
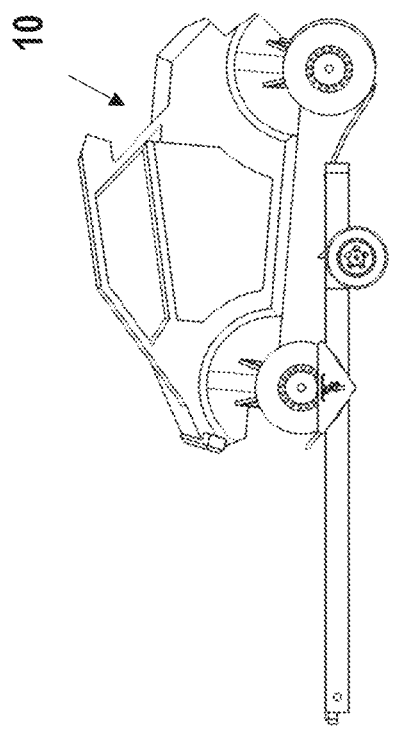
FIG. 65 is a side elevation view of the vehicle exiting the trailer system in FIG. 63 in accordance with one embodiment.
Figure 68:
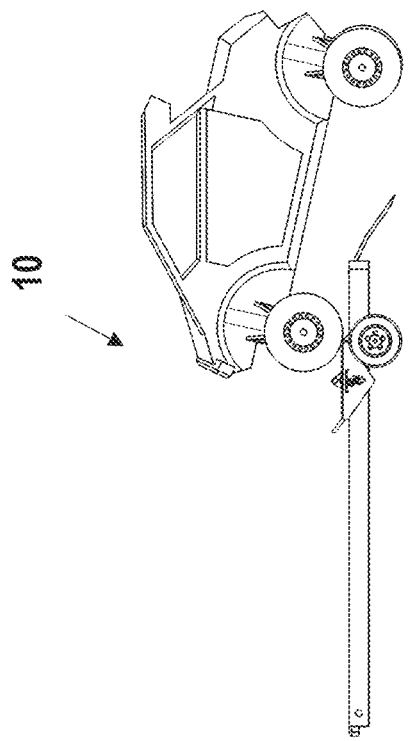
FIG. 68 is a side elevation view of the vehicle exiting the trailer system in FIG. 63 in accordance with one embodiment.
Figure 67:
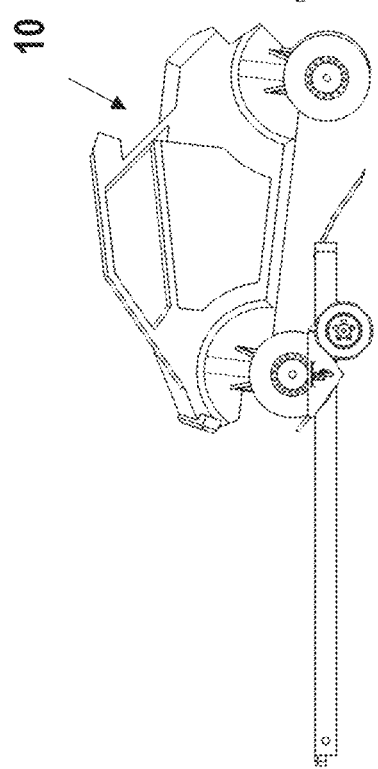
FIG. 67 is a side elevation view of the vehicle exiting the trailer system in FIG. 63 in accordance with one embodiment.
Figure 69:
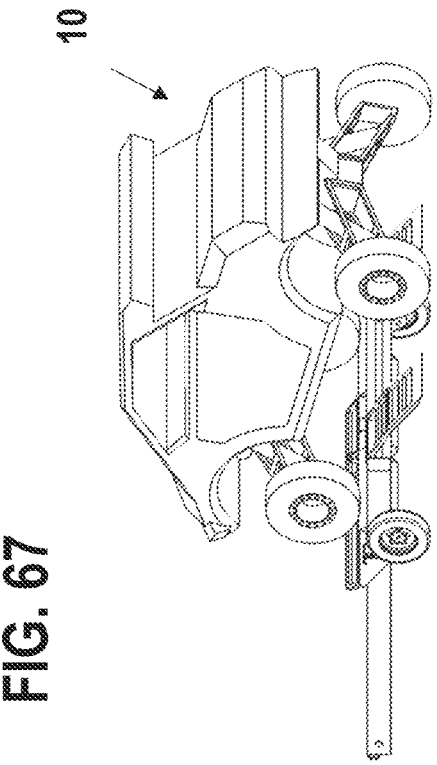
FIG. 69 is a perspective view of the vehicle and trailer system of FIG. 68 in accordance with one embodiment.
Figure 71:
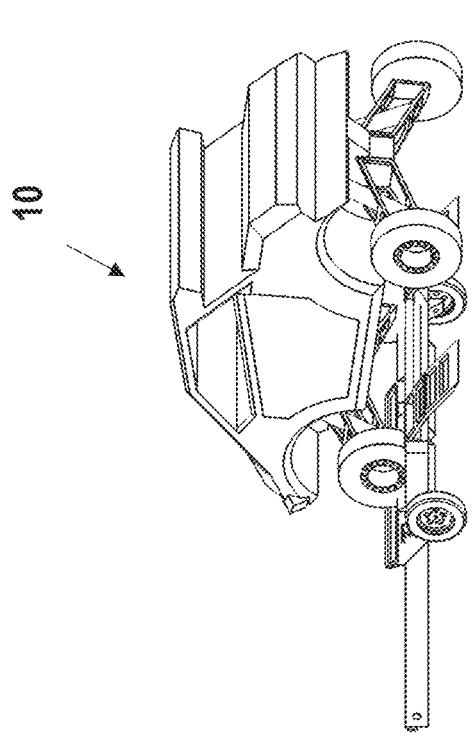
FIG. 71 is a perspective view of the vehicle and trailer system of FIG. 70 in accordance with one embodiment.
Figure 70:
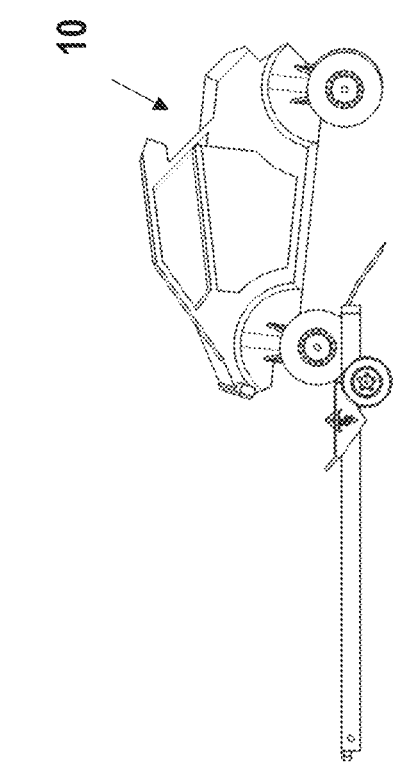
FIG. 70 is a side elevation view of the vehicle exiting the trailer system in FIG. 63 in accordance with one embodiment.
Figure 73:
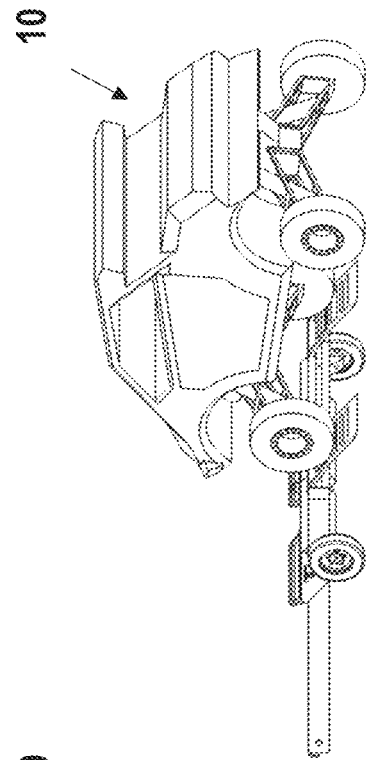
FIG. 73 is a perspective view of the vehicle and trailer system of FIG. 72 in accordance with one embodiment.
Figure 72:
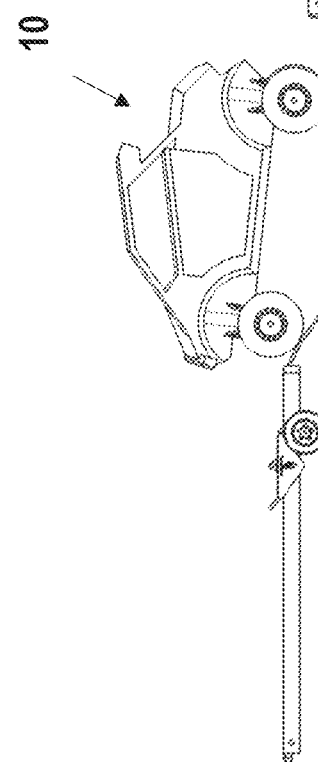
FIG. 72 is a side elevation view of the vehicle exiting the trailer system in FIG. 63 in accordance with one embodiment.
Figure 76:
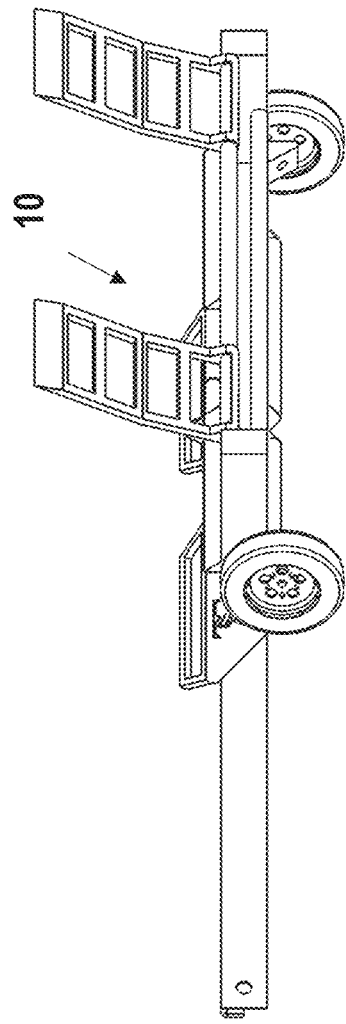
FIG. 76 is a perspective view of the trailer system in FIG. 75 in accordance with one embodiment.
Figure 77:
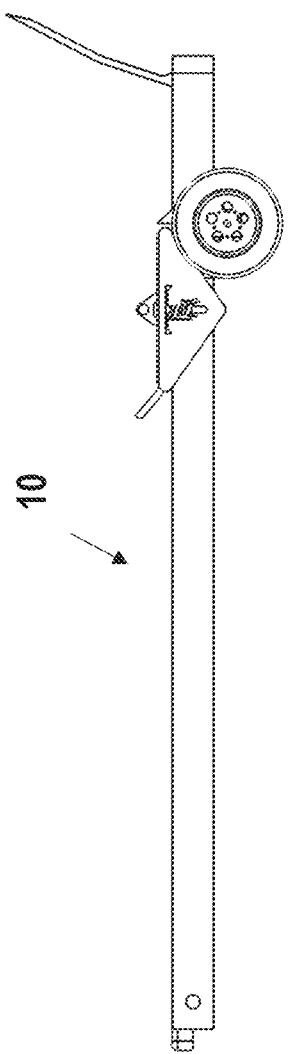
FIG. 77 is a side elevation view of the trailer system in FIG. 75 in accordance with one embodiment.
Figure 78:
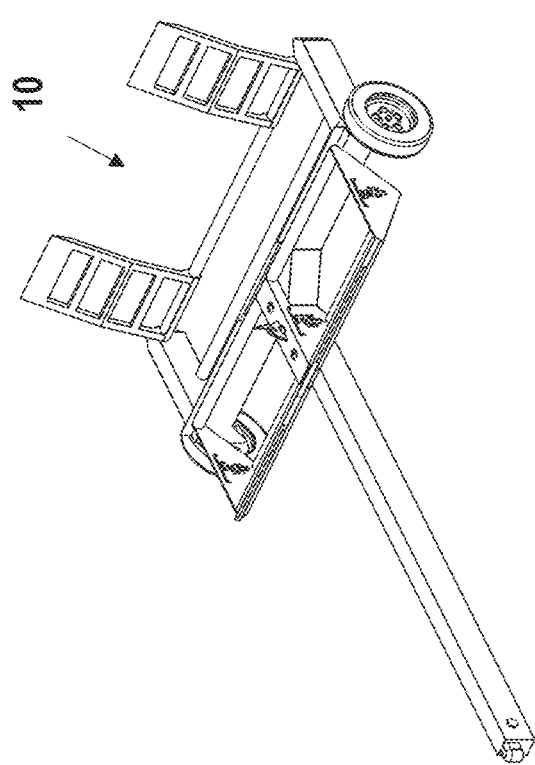
FIG. 78 is a perspective view of the trailer system in FIG. 75 in accordance with one embodiment.
Figure 79:
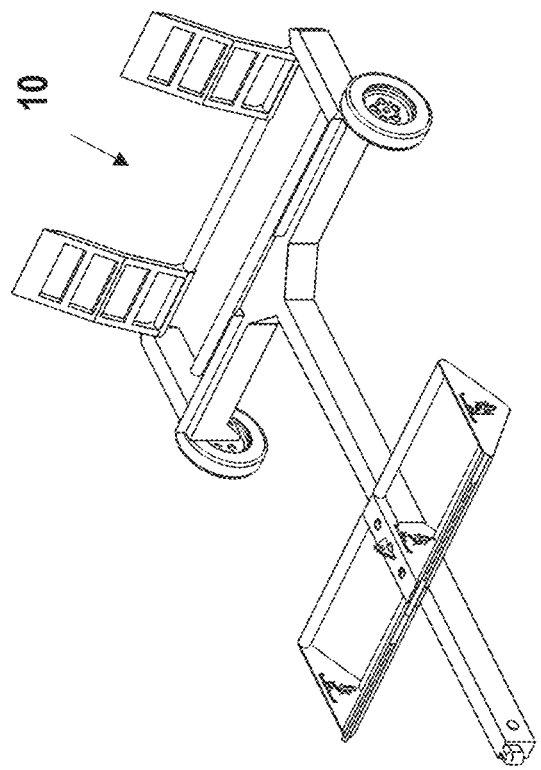
FIG. 79 is a perspective view of the trailer system in FIG. 74 in accordance with one embodiment.

Now referring to FIGS. 8-10, additional views of the trailer system 10 are provided. Now referring to FIGS. 11-12, additional views of the axle 16 are provided. Now referring to FIGS. 13-16 additional views of the front and rear inserts 22, 24 are provided. Now referring to FIGS. 17 and 18, additional views of the hinge 14 are provided. Now referring to FIGS. 19-21, additional views of a torsion axle 64 are provided where the torsion axle 64 comprises a tube 66, a beam 68, a hub 70, dampeners 72, and an arm 74. Now referring to FIG. 22, an additional view of a side roller 22 is provided. Now referring to FIG. 23, an additional view of a top roller 44 is provided. Now referring to FIGS. 24-26, additional views of a bottom plate 50 and detent 52 are provided.

Now referring to FIGS. 27A-45C, various views of a trailer system 10 and various components are provided. The trailer system 10 comprises ramp parts 30a, 30b, a front end plate 76, a front tube 78, a front center portion 80, a front bottom roller 82, a front top roller 84, a hinge part 86, including first and second hinge parts 86a, 86b, an axle bracket 88, a rear side plate 90, and a rear inner plate 92.

Now referring to FIGS. 46-53, various views of a trailer system 10 are provided. These views show a sequence of a vehicle entering the trailer system 10 and a front basket of the trailer system 10 moving from a first position to a second position.

Now referring to FIGS. 54-62, various views of a trailer system 10 are provided. These views show a front basket moving between first and second positions as well as the center rail folding upon itself such that the trailer system 10 is a storage configuration.

Now referring to FIGS. 63-73, various views of a trailer system 10 are provided. These views show a vehicle exiting a trailer system 10 with the front basket moving from a second position to a first position.

Now referring to FIGS. 74-79, various views of a trailer system 10 are provided. These views show a trailer system 10 with a front basket moving between first and second positions.

The description of the trailer system has been presented for purposes of illustration and description, but is not intended to be exhaustive or limiting of the trailer system to the form disclosed. Many modifications and variations will be apparent to those of ordinary skill in the art. The embodiments described and shown in the figures were chosen and described in order to best explain the principles of the trailer system, the practical application, and to enable those of ordinary skill in the art to understand the trailer system.

While various embodiments have been described in detail, it is apparent that modifications and alterations of those embodiments will occur to those skilled in the art. Moreover, references made herein to "the trailer system" or aspects thereof should be understood to mean certain embodiments of the trailer system and should not necessarily be construed as limiting all embodiments to a particular description. It is to be expressly understood that such modifications and alterations are within the scope and spirit of the present disclosure, as set forth in the following claims.

What is claimed is:

1. A trailer system for receiving a vehicle, comprising:
a center rail having a first section rotatably connected to a second section;
a first basket connected to the first section of the center rail, the first basket defining a first receiving volume;
a second basket slidably connected to the center rail, the second basket defining a second receiving volume;
wherein, in a first position, the second basket is positioned on the first section of the center rail between the first basket and the second section; and
wherein, in a second position, the second basket is positioned on the second section of the center rail.

2. The trailer system of claim 1, further comprising:
a lock plate connected to the second section of the center rail; and
a pin that extends through the lock plate and into the first section of the center rail to secure the first and second sections along a common longitudinal axis.

3. The trailer system of claim 1, further comprising:
an insert that is positioned in the second basket and that at least partially defines the second receiving volume, wherein the insert is configured receive a wheel and is positionable in a plurality of locations in the second basket.

4. The trailer system of claim 3, further comprising:
a roller located at a front end of the insert, wherein the roller is configured to rotate against a spinning wheel.

5. The trailer system of claim 1, further comprising:
an aperture in the center rail; and
a detent that extends from the second basket and into the aperture to selectively lock the second basket in the first position, wherein the second basket deflects relative to the center rail to remove the detent from the aperture and allow the second basket to move to the second position.

6. The trailer system of claim 5, further comprising:
a first center plate of the second basket positioned on one side of the center rail;
a second center plate of the second basket positioned on an opposing side of the center rail; and
a top roller that extends between the first and second center plates and that contacts a top surface of the center rail, wherein the top roller has a downward bias so the second basket deflects relative to the center rail when a force overcomes the downward bias of the top roller and remove the detent from the aperture.

7. The trailer system of claim 6, further comprising:
at least one side roller that is positioned in the first center plate and that contacts a first side surface of the center rail; and at least one side roller that is positioned in the second center plate and that contacts a second side surface the center rail.

8. The trailer system of claim 1, further comprising:
a hinge connected to an end of the first section and connected to an end of the second section to provide the rotatable connection between the first and second sections.

9. A trailer system for receiving a vehicle, comprising:
a center rail extending along a longitudinal axis, the center rail having an aperture;
a rear basket connected to the center rail, the rear basket defining a rear receiving volume;
a front basket slidably connected to the center rail, the front basket defining a front receiving volume, wherein the front basket has a detent configured to extend into the aperture of the center rail, and the front basket is deflectable in a downward direction that is substantially perpendicular to the longitudinal axis of the center rail;
wherein, in a first position along the center rail, the front basket is fixed in position on the center rail and the detent extends into the aperture; and
wherein, in a second position along the center rail, the front basket is deflected in the downward direction and the detent is removed from the aperture.

10. The trailer system of claim 9, wherein the front basket comprises:
a first center plate positioned on one side of the center rail;
a second center plate positioned on an opposing side of the center rail; and
a top roller that extends between the first and second center plates and that contacts a top surface of the rail, wherein the top roller has a bias in the downward direction and is deflectable so that the front basket is deflectable in the downward direction.

11. The trailer system of claim 10, wherein the front basket further comprises:
a first elongated slot in the first center plate, wherein one end of the top roller is positioned in the first elongated slot; and
a second elongated slot in the second center plate, wherein an opposing end of the top roller is positioned in the second elongated slot.

12. The trailer system of claim 9 wherein the front basket further comprises:
a bottom plate extending between the first and second center plates, wherein the detent extends from the bottom plate.

13. The trailer system of claim 9, further comprising:
a hinge that rotatably connects an end of a first section of the center rail to an end of a second section of the center rail, wherein the front basket passes the hinge between the first position and the second position.

14. The trailer system of claim 10, wherein the front basket further comprises:
a first plurality of side rollers of the first center plate, wherein each roller of the first plurality of rollers rotates in a direction substantially perpendicular to both a rotational direction of the top roller and the longitudinal axis of the center rail; and
a second plurality of side rollers of the second center plate, wherein each roller of the second plurality of rollers rotates in a direction substantially perpendicular to both a rotational direction of the top roller and the longitudinal axis of the center rail.

15. A method for receiving a vehicle on a trailer, comprising:
providing a trailer having a center rail, a first basket connected to the center rail, and a second basket slidably connected to the center rail;
moving a first wheel of a vehicle into a first receiving volume of the first basket;
moving the first wheel of the vehicle into a second receiving volume of the second basket; and
sliding the second basket along the center rail from a first position to a second position where a second wheel of the vehicle moves into the first receiving volume of the first basket.

16. The method of claim 15, further comprising:
removing a detent of the second basket from an aperture in the center rail to allow the second basket to slide along the center rail from the first position to the second position.

17. The method of claim 16, further comprising:
providing a top roller of the second basket that contacts a top surface of the center rail, wherein the top roller has a bias in a downward direction; and
deflecting the second basket relative to the center rail in the downward direction to overcome of the bias of the top roller and remove the detent from the aperture.

18. The method of claim 15, further comprising:
providing a hinge connected to first and second sections of the center rail, wherein the hinge allows the first and second section to fold against each other; and
sliding the second basket past the hinge as the second basket slides from the first position to the second position.

19. The method of claim 15, further comprising:
rotating, by the first wheel, a roller of the second basket as the second basket slides from the first position to the second position.

20. The method of claim 15, further comprising:
rotating a ramp connected to the first basket; and
securing the ramp against the second wheel in the first receiving volume of the first basket.

* * * * *